US007620658B2

(12) United States Patent
Benson et al.

(10) Patent No.: US 7,620,658 B2
(45) Date of Patent: Nov. 17, 2009

(54) CONFIGURATION OF A DIRECTORY SYSTEM

(75) Inventors: Max L. Benson, Redmond, WA (US); Jie Liu, Woodinville, WA (US); Matthias Leibmann, Woodinville, WA (US); Derek Murman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1181 days.

(21) Appl. No.: 10/669,612

(22) Filed: Sep. 24, 2003

(65) Prior Publication Data

US 2005/0065977 A1 Mar. 24, 2005

(51) Int. Cl.
G06F 7/00 (2006.01)
G06F 17/30 (2006.01)
G06F 17/00 (2006.01)
G06F 12/00 (2006.01)

(52) U.S. Cl. ...................... 707/200; 707/102
(58) Field of Classification Search ......... 707/100–102, 707/104.1, 201, 103 R, 200, 203; 709/227
See application file for complete search history.

(56) References Cited

U.S. PATENT DOCUMENTS

| | | | |
|---|---|---|---|
| 4,648,036 A | 3/1987 | Gallant | |
| 4,999,766 A | 3/1991 | Peters et al. | |
| 5,838,923 A | 11/1998 | Lee et al. | |
| 5,862,323 A | 1/1999 | Blakley, III et al. | |
| 5,884,328 A | 3/1999 | Mosher, Jr. | |
| 5,893,116 A | 4/1999 | Simmonds et al. | |
| 6,067,551 A | 5/2000 | Brown et al. | |
| 6,105,062 A | 8/2000 | Andrews et al. | |
| 6,185,574 B1 | 2/2001 | Howard et al. | |
| 6,202,085 B1 * | 3/2001 | Benson et al. | 709/205 |
| 6,269,406 B1 | 7/2001 | Dutcher et al. | |
| 6,343,287 B1 | 1/2002 | Kumar et al. | |
| 6,370,541 B1 | 4/2002 | Chou et al. | |
| 6,381,734 B1 | 4/2002 | Golde et al. | |
| 6,487,558 B1 * | 11/2002 | Hitchcock | 707/200 |
| 6,496,837 B1 | 12/2002 | Howard et al. | |
| 6,523,042 B2 | 2/2003 | Milleker et al. | |
| 6,523,046 B2 | 2/2003 | Liu et al. | |
| 6,542,515 B1 | 4/2003 | Kumar et al. | |
| 6,581,074 B1 | 6/2003 | Wong et al. | |
| 6,618,732 B1 | 9/2003 | White et al. | |
| 6,651,047 B1 | 11/2003 | Weschler, Jr. | |

(Continued)

OTHER PUBLICATIONS

Robertson, George et al., "Polyarchy Visualization: Visualizing Multiple Intersecting Hierarchies," CHI 2002, Apr. 20-25, 2002, Minneapolis, Minnesota, USA, 8 pages.

(Continued)

Primary Examiner—Wilson Lee
Assistant Examiner—Merilyn P Nguyen
(74) Attorney, Agent, or Firm—Lee & Hayes, PLLC

(57) ABSTRACT

Exemplary techniques are described for configuring a metadirectory system used to interact with a collection of connected directory sources via a respective collection of management agents. The techniques can involve importing new management agents to the metadirectory system, updating existing management agents, or configuring the entire metadirectory system (which can involve adding or updating plural management agents). Techniques are provided for ensuring that the configuration of the metadirectory system provides partitions which conform to expected partitions associated with existing management agents and/or connected directory sources.

27 Claims, 17 Drawing Sheets

U.S. PATENT DOCUMENTS

| | | | |
|---|---|---|---|
| 6,757,720 | B1 | 6/2004 | Weschler, Jr. |
| 6,823,336 | B1 | 11/2004 | Srinivasan et al. |
| 6,834,286 | B2 | 12/2004 | Srinivasan et al. |
| 6,859,217 | B2 | 2/2005 | Robertson et al. |
| 6,912,520 | B2 | 6/2005 | Hankin et al. |
| 6,961,734 | B2 | 11/2005 | Kauffman |
| 6,973,466 | B2 * | 12/2005 | Kaler et al. ................. 707/203 |
| 6,983,227 | B1 | 1/2006 | Thalhammer-Reyero |
| 6,990,513 | B2 | 1/2006 | Belfiore et al. |
| 7,310,650 | B1 | 12/2007 | Felsted et al. |
| 2001/0034733 | A1 | 10/2001 | Prompt et al. |
| 2001/0044805 | A1 | 11/2001 | Multer et al. |
| 2001/0051948 | A1 | 12/2001 | Srinivasan et al. |
| 2002/0030703 | A1 | 3/2002 | Robertson et al. |
| 2002/0059425 | A1 * | 5/2002 | Belfiore et al. .............. 709/226 |
| 2002/0156792 | A1 | 10/2002 | Gombocz et al. |
| 2003/0101194 | A1 | 5/2003 | Rys et al. |
| 2003/0105654 | A1 | 6/2003 | MacLeod et al. |
| 2003/0131025 | A1 | 7/2003 | Zondervan et al. |
| 2003/0135517 | A1 | 7/2003 | Kauffman |
| 2003/0140210 | A1 | 7/2003 | Testardi |
| 2003/0145003 | A1 | 7/2003 | Yellepeddy et al. |
| 2003/0163438 | A1 | 8/2003 | Barnett et al. |
| 2003/0208490 | A1 | 11/2003 | Larrea et al. |
| 2003/0236865 | A1 * | 12/2003 | Anthe et al. ................. 709/220 |
| 2004/0064502 | A1 | 4/2004 | Yellepeddy et al. |
| 2004/0122844 | A1 | 6/2004 | Malloy et al. |
| 2004/0230559 | A1 | 11/2004 | Newman et al. |
| 2004/0249828 | A1 * | 12/2004 | Childress et al. ............ 707/100 |
| 2005/0188367 | A1 | 8/2005 | Oberholtzer |

OTHER PUBLICATIONS

Steen et al., "Master Thesis in Computer Engineering; Integrating ABB Aspect Directory with Microsoft Active Directory", 2001, 76 pages.

Steen et al. "Integrating ABB Aspect Directory with Microsoft Active Directory", Thesis Paper, The Department of Computer Science and Electronics, Malardalens Hogeskola University, 2001, pp. 44-58.

Zhou, "Directory Integration and the Metadirectory", 1999, pp. 1-12.

McCauley, et al, "Nets Users Guide", retrieved Aug. 21, 2008 at <<http://web.archive.org/web/20020224144453/http://www.open.com.au/nets/user.html>> Revision 2.2, Feb. 24, 2002, pp. 1-83.

* cited by examiner

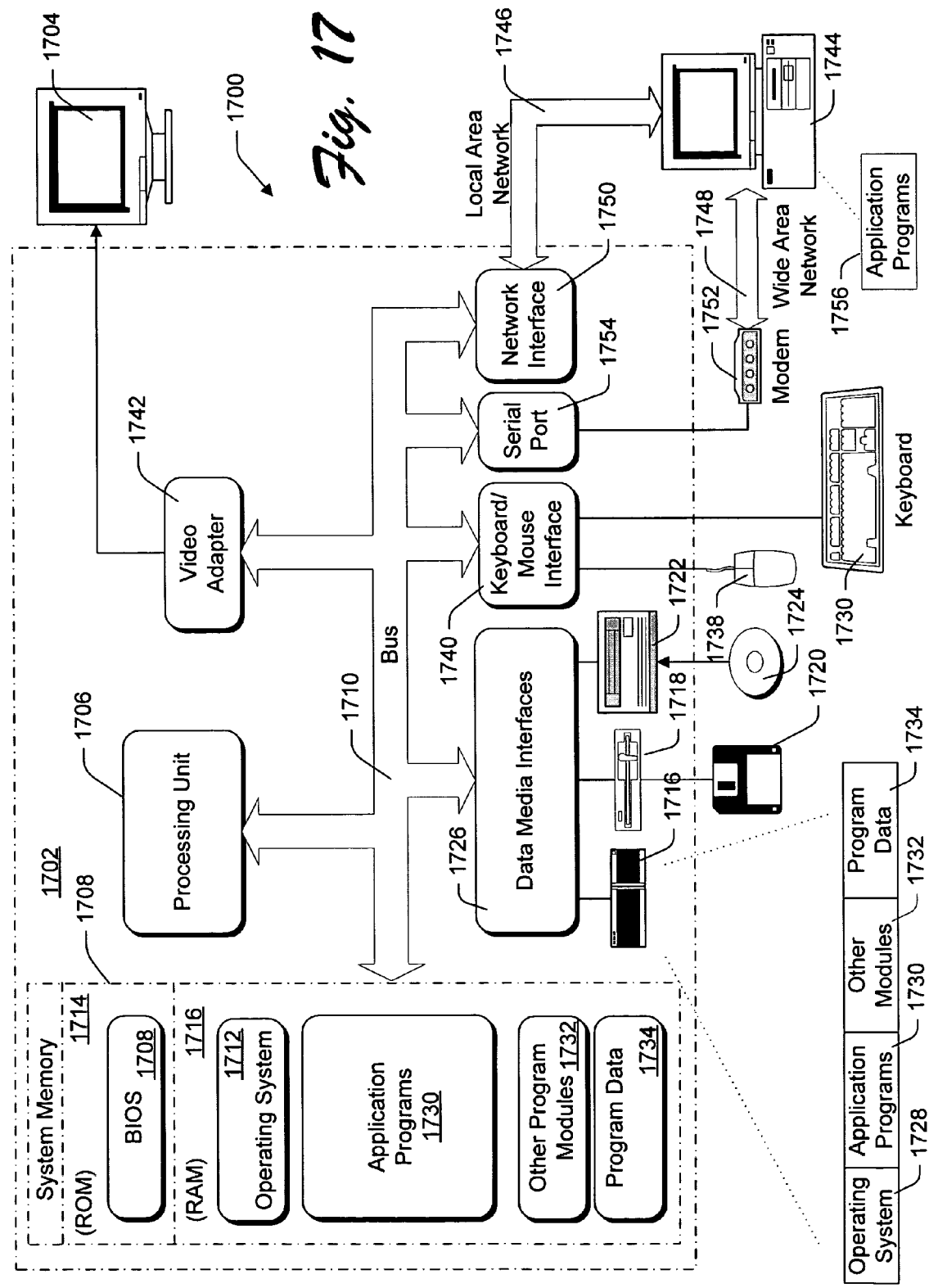

CONFIGURATION OF A DIRECTORY SYSTEM

CROSS-REFERENCE TO RELATED APPLICATION

The present application is related to co-pending U.S. patent application Ser. No. 10/434,726, entitled "Relational Directory," by Kim Cameron, Max L. Benson, Matthias Leibmann, Mark Brown, and James Booth; U.S. patent application Ser. No. 10/434,725, entitled "Attribute Value Selection for Entity Objects," by Kim Cameron, Max L. Benson, Matthias Leibmann, Edward H. Wayt, Kevin Miller and James Booth; U.S. patent application Ser. No. 10/435,720, entitled "Associating and Using Information in a Metadirectory," by Max L. Benson; U.S. patent application Ser. No. 10/435,712, entitled "Preview Mode," by Kim Cameron, Max L. Benson, Derek Murman, Edward H. Wayt, Jeffrey Bisset, Jie Liu, and Jing Wu; U.S. patent application Ser. No. 10/435,708, entitled "Rules Customization and Related Methods," by Kim Cameron, Matthias Leibmann, Max L. Benson, Jing Wu, Michael Jerger, Edward H. Wayt, and Kenneth Mark; U.S. patent application Ser. No. 10/434,411, entitled "Automated Information Management and Related Methods," by Stephen Siu, Max L. Benson, and James Booth; and U.S. patent application Ser. No. 10/435,113, entitled "Declarative Rules for Metadirectory," by Kim Cameron, Max L. Benson, and James H. Booth, all of which are assigned to the assignee of the present application and filed on May 8, 2003.

TECHNICAL FIELD

The described subject matter relates generally to configuring a data processing system, and in a more particularly implementation, to configuring a directory system, such as a metadirectory system.

BACKGROUND

Companies and other organizations typically maintain information about many different aspects of the organization in order to ensure efficient operation. This organizational information (or organizational data) describes people, resources, applications, and the like, which make up the organization. For example, organizational information descriptive of an employee may include his/her name, job title, salary, telephone number, and/or internet protocol (IP) address. Organizational information describing an application may include the application's name and associated services provided by the application. Organizational information describing a resource may describe the resource as a network device (e.g., a printer), the name of the device, and capabilities provided by the network device. Many other types of organizational information may be maintained.

The organizational information is typically maintained in a number of remote data storage repositories, such as databases, directories, text files, and so on. For example, the human resources (HR) department may have a data repository of all employees in the company, with employee information. The information technology (IT) department may have a data repository of all email accounts and internet protocol (EP) addresses associated with employees, applications, resources, etc. Data in the repositories frequently overlaps, meaning that some information may be common among more than one repository. In a typical organization, each of the data repositories is independently maintained by the department that owns the repository. For example, the HR department maintains its own employee information, while the IT department maintains its own network information.

Because each of the various remote data repositories is independently maintained by the department that owns the data repository, and there may be data common among them, inconsistencies may arise among the data repositories. For example, the HR department repository may have employee "John Smith," and may list an email address of "johns@company.com"; the IT department may initially have John Smith's email address as "johns@company.com," but may change the address to "johns@company.com" when another employee, "John Simpson," joined the company. Thus, when the IT department changes John Smith's email address in the IT repository, the email address is no longer consistent with John Smith's email address in the HR department repository. For many other reasons, information stored in data repositories may become inconsistent within an organization. Thus, organizations typically attempt to manage their various data repositories so as to keep the information in them consistent, as well as up-to-date, accurate, and readily available.

One technique for managing an organization's data repositories and their associated organizational information involves linking the multiple remote repositories, while allowing each department to independently modify its own repository. A so-called metadirectory system employs such a technique. A metadirectory system is essentially a directory of directories or repositories. In traditional metadirectories, data from each of a number of repositories is received by an associated interface that negotiates between the remote repository and a central repository. The central repository includes data representing a combination of data in all the remote repositories. Each of the interfaces typically executes scripts in response to specified events, such as the hiring/firing of an employee, or the changing of an IP or email address.

Each of the individual remote repositories may employ complex data structures, schemas, and protocols for managing its stored information. The metadirectory system itself therefore may also need to employ a highly complex strategy in order to interact with these separate remote repositories. The complexity of the metadirectory system introduces a number of challenges. Those developing the metadirectory system face a first challenge in designing a metadirectory system that meets the myriad of requirements imposed by the separate data repositories. Developers face a second challenge in subsequently maintaining the metadirectory system so that it continues to meet the changing needs of the business for which it was developed. For instance, changes in the design of a remote repository may require a developer to make corresponding changes in the metadirectory system to ensure that the metadirectory system continues to interact with the remote repository in a desired manner. Alternatively, the business may decide to add a new remote repository or delete a previously used remote repository, which again requires changes to the metadirectory system. As used herein, the task of changing the metadirectory system in any manner is referred to as configuring the metadirectory system.

Configuring the metadirectory system is typically a very burdensome task, as a developer should take great care to ensure that the changes made to one part of the metadirectory system do not adversely affect another part of the metadirectory system. This task is all the more troubling in view of the fact that many businesses regard the integrity of their data repositories as essential to the success of their businesses. Thus, mistakes made in changing the metadirectory system can have the effect of literally crippling the business, resulting in loss of productivity and money. Needless to say, for example, a business will not look too favorably on a developer who introduces errors in a payroll system due to an errant update operation made to the metadirectory system.

In the computer fields, developers commonly test an upgrade on a test (or lab) system prior to implementing the upgrade on the working system used by the business. This working system is commonly called the production system of the business. The test system typically includes the same functionality as the production system, and may have access to all of the repositories used by the business, or some representative sample thereof. In using this approach, the developers aim to detect and remedy any errors in the upgrade prior to it being installed on the production system.

Nevertheless, it is not a simple task to apply this strategy to the configuration of metadirectory systems. This difficulty ensues, in part, from the sheer complexity of the metadirectory system. Even after reaching some assurance that the update is working properly on the test system, a developer may nevertheless introduce errors in duplicating the upgrade in the production system. This is because it is a difficult task to accurately "fit" an upgraded piece of the metadirectory system into its proper "location" in the metadirectory system. The developer must worry about how the upgraded piece impacts and interacts with other pieces that have not been changed, and make appropriate modifications to ensure that the system runs smoothly following an upgrade. Further, there is a possibility that assumptions made in developing a new configuration on the test system do not completely match the conditions present in the production system, potentially resulting in a faulty upgrade. Again, the consequences of a misstep in performing this task can be severe.

Accordingly, there is a need in the art for a reliable and efficient technique for configuring data processing systems, such as metadirectory systems.

SUMMARY

According to one exemplary implementation, a technique is described for configuring a data processing system that interacts with multiple data sources via a set of respective management agents. The technique includes: (a) creating configuration information used for modifying the data processing system; (b) exporting the configuration information to a storage location; (c) importing the configuration information from the storage location to the data processing system; and (d) applying the configuration information to modify the data processing system by making a change to the set of management agents.

Related infrastructures, data processing systems, apparatuses, computer readable media, data structures, etc. are also described herein.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein:

FIG. 17 shows an exemplary computing environment for implementing a metadirectory system and/or configuration logic used to configure a metadirectory system.

DETAILED DESCRIPTION

Various methods are illustrated as being implemented in a suitable computing environment. Although not required, various exemplary methods will be described in the general context of computer-executable instructions, such as program modules, being executed by a computer server and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including hand-held devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks." Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

The term "configuring" is used broadly herein. The term configuring may encompass any change made to a data processing system, including the introduction of a new part of the data processing system, the deletion of an existing part of the data processing system, or the modification of an existing part of the data processing system. Further, the term configuring may specifically target one or more parts of the data processing system, or may globally affect the entire data processing system. The term configuring also extends to an initial configuration of the data processing system.

Figure 1:
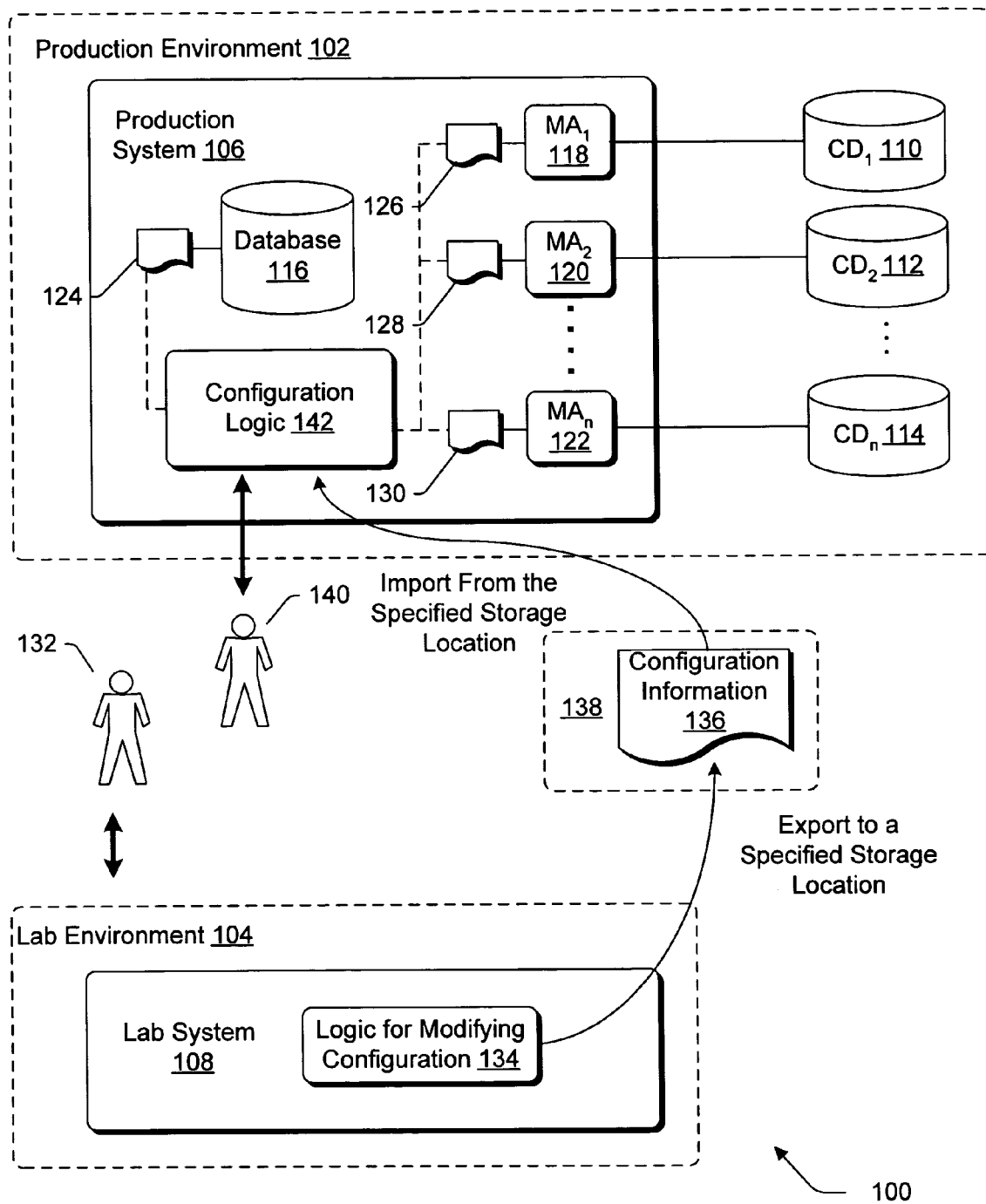
FIG. 1 shows an exemplary infrastructure for configuring a metadirectory system.

This disclosure includes the following sections:

A. Overview of Techniques and Systems for Configuring a Metadirectory System
B. Overview of an Exemplary Metadirectory System
B.1. Exemplary Architecture of the Metadirectory System
B.2. Exemplary <mv-data> and <ma-data> Formats
C. Exemplary Techniques and Systems for Configuring the Metadirectory System
C.1. Overview of Export/Import Processes
C.2. Export Processes
C.3. Import Processes
C.4. UI Functionality
D. Exemplary Computer Environment for Implementing the Configuration Techniques
E. Appendix: Exemplary Schemas and Rules
E.1. Join Rules
E.2. Projection Rules
E.3. Stay Disconnector Rules
E.4. Import Attribute Flow XML Format and Runtime Behavior
E.5. Export Attribute Flow XML
E.6. Run Configuration XML Format A. Overview of Techniques and Systems for Configuring a Metadirectory System FIG. 1 shows an environment 100 in which the configuration techniques described herein can be employed. The environment 100 includes a production environment 102 and a lab environment 104. The production environment 102 generally refers to the infrastructure used to manage a business's data on a day-to-day basis—that is, in the normal course of the business's operations. The lab environment 104 generally refers to infrastructure that does not typically play a part in the day-to-day operations of the business. Hence, the lab environment 104 may represent equipment that is operated by users "off-line" with respect to the normal course of the business's operations. In other implementations, the production environment 102 and lab environment 104 can utilize the same equipment, yet share such equipment for normal business use and off-line testing tasks.

The production environment 102 and the lab environment 104 can include any type or combination of data processing equipment. The production environment 102 is shown as including a production system 106, and the lab environment 104 is shown as including a lab system 108. In one implementation, these systems (106, 108) can represent any kind of computing system, such as a server system (e.g., a computing system running Windows Server 2003 produced by Microsoft Corporation of Redmond, Wash.). Alternatively, each of these systems (106, 108) can represent a collection of computing devices coupled together via a network. Accordingly, the system entities shown in FIG. 1 are intended to represent any kind of computing functionality for performing the functions to be described below.

FIG. 1 shows that production system 106 is coupled to a collection of connected directory (CD) sources (110, 112, . . . 114) (also referred to herein as remote repositories, or RR's). Such connected directory sources can represent any type of repository of information used within the business. Exemplary CD's can include Network Operating Systems and Directory Services (Microsoft Windows NT®, Active Directory®, Active Directory Application Mode, Novell eDirectory, SunONE/iPlanet directory, X.500 systems and other metadirectory products), E-mail Systems (Lotus Notes & Domino, Microsoft Exchange 5.5, etc.), Application Systems (PeopleSoft, SAP, ERP, telephone switches, XML & DSML based systems, etc.), Database Systems (Microsoft SQL Server, Oracle, IBM DB2, Informix, Sybase, OLE/DB based systems, etc.), File-based Systems (DSMLv2, LDIF, delimited, fixed width, attribute value pairs, etc.). This is merely an illustrative and non-limiting list of possible CD's. More generally, this disclosure makes reference to various commercial systems in order to provide a concrete example of one implementation of a metadirectory system; however, the configuration techniques are not limited to the use of the specific metadirectory system and associated commercial systems described herein.

Although not shown, the lab system 108 can also couple to the CD's (110, 112, 114), or couple to some portion thereof, or couple to some copy or version thereof. However, as stated above, the lab system 108 is not intended to interact with these CD's (110, 112, 114) on a day-to-day basis to perform business transactions.

Information stored in the various CD's can be managed as objects having attributes. In the context of a business, such objects typically store identity information regarding individuals, applications, and resources associated with the business. Information associated with people can include name, mailbox, salary, job title, and so forth. Information regarding applications can include network addresses, lists of services, and so forth. Information regarding resources can include printers, network resources, and so forth. A data store used to manage these objects is referred to as a directory.

Both the production system 106 and lab system 108 can include functionality for implementing the role of a metadirectory. A metadirectory refers to a special form of a directory that can integrate and synchronize information that is stored in multiple CD's. By way of overview, the basic goal of a metadirectory system is to manage and coordinate identity information from the multiple CD's (110, 112, . . . 114). This provides numerous benefits. For instance, each of the CD's may maintain duplicative information regarding various individuals, assets, or other entities. There may be inconsistencies in this duplicative information. The metadirectory system allows the business to provide a unified view that can cull information from multiple CD's regardless of the compatibility of the CD's. This provides a convenient interface through which users can access and manage information in the CD's. Further, in the case of conflicting information, the metadirectory system provides a mechanism for identifying a version of duplicative information that is to serve as authoritative within the business. Further still, the metadirectory system provides a mechanism for propagating changes made to information in one CD to counterpart duplicative information stored in another CD. The metadirectory system described herein provides yet further benefits, as will be described below. In one exemplary implementation, the unique configuration functionality described herein can be implemented using Microsoft's Identity Integration Server (MIIS) system.

The production system 106 shown in FIG. 1 includes a high-level depiction of certain features provided by a metadirectory system. The production system 106 includes a database 116 for storing the metadirectory. In one implementation, the database 116 can be implemented using Microsoft SQL Server 2000 database. The database 116 can be implemented on the same server that implements other functional aspects of the metadirectory service, or can be implemented on a different server. Various indicia can be used to identify objects stored in the database 116, including Global Unique Identifiers (GUIDs), Distinguishing Names (DN's), and so forth. Objects may also be assigned an object class and an object type.

As will be described in detail in Section B, a core portion of the database 116 stores a so-called metaverse (MV). The metaverse is a storage area that contains the aggregated identity information from multiple connected directory sources, providing a single global, integrated view of all combined objects. The metaverse objects are based on the identity information that is retrieved from the CD's.

A collection of management agents (MA's) (118, 120, . . . 122) are coupled to respective CD's (110, 112, . . . 114). Generally, an MA moves data from a CD to the metadirectory in the database 116. Further, when data in the metadirectory is modified, the MA can also export the data out to the CD to keep the CD synchronized with the metadirectory. In one exemplary implementation, the MA's are uniquely designed to handle the requirements of particular CD's. An exemplary set of CD-specific MA's can be designed to interact with the following CD's: Active Directory (AD), Active Directory Application Mode, Attribute-value pair text files, Delimited text files, Directory Services Markup Language (DSML) 2.0, Exchange 5.5, Exchange 5.5 Bridgehead, Exchange 2000 Global Address List (GAL) synchronization, fixed-width text files, LDAP Data Interchange Format (LDIF), Lotus Notes 4.6/5.0, Novell eDirectory, Sun/iPlanet/Netscape directory 4.x/5.x (with "changelog" support) (referred to simply as an iPlanet directory for ease of reference below), Microsoft SQL Server 7.0 & 2000, Microsoft Windows NT4 Domains, and Oracle 8i/9i. This is merely an illustrative and non-limiting listing of possible CD-specific MA's.

A collection of rules governs the operation of the metadirectory service provided by the production system 106. These rules can be global or local. Global rules apply to all objects in the metaverse. Local rules are specific to a particular management agent. For instance, rules 124 govern the behavior of the metaverse stored in the database 116. Rules (126, 128, . . . 130) govern the behavior of respective MA's (118, 120, . . . 122). For instance, rules may be specified that govern the import and export behavior particular to an MA. Section B provides additional details regarding the role of rules in the metadirectory service.

The rules can be declaratively based (e.g., based on a mark-up language, such as XML). A schema can be specified that governs the permissible form of a rule. The schema itself can be declaratively specified (e.g., using XML). The declarative rules can also include extensions that make reference to other rule-based functionality. Custom extensions can be created using any .NET programming language, such as Microsoft Visual Basic, C#, and so forth. These rules can be implemented as a Microsoft .NET Framework class library, or dynamic link library (DLL). To facilitate illustration, the rules (124-130) are shown as separate from the database 116. However, these rules can be stored in the database 116 along with the object which they control.

Although not illustrated, the lab system 108 can include similar metadirectory functionality to the production system 106.

With the above introduction to an exemplary metadirectory system, an overview is now provided of techniques and systems used to configure such a metadirectory system. The task of configuring the metadirectory system can entail any change to the production environment. In one implementation, a user might want to configure the production system 106 by initially defining all of the rules used to govern its behavior. In another case, the production system 106 may already include an operational metadirectory system, but the user wishes to completely reconfigure it by revising all or some of its existing rules. In another case, the user may wish to simply add another MA (and associated rule set) to the production system 106 to address the introduction of a new CD in the business. Alternatively, the user may wish to delete an MA from the production system 106. Still alternatively, the user may wish to modify an existing MA (and its associated rule set) provided in the production system. This is a limited sampling of the actions encompassed by the term "configuration" as used herein.

Presume, to facilitate discussion, that lab system user 132 wishes to initiate a configuration session using the lab system 108. The lab system 108 is generically shown in FIG. 1 as including logic for modifying the metadirectory's configuration (134). Such logic 134 can represent any combination of software and/or firmware used to change the rules that govern the operation of the metadirectory system implemented on the production system 106. Such logic 134 can represent an interface utility provided by the metadirectory itself, e.g., with appropriate user interface (UI) functionality that allows the user to view and modify rules.

The operations performed using the lab system 108 produce configuration information 136. Such configuration information 136 may comprise one or more configuration files. These configuration files, in turn, can include information that will prompt the production system 106 to change its rules that govern the operation of the metadirectory service. In one case, a single file can be generated that will prompt the creation or modification of one MA provided in the production system 106, as well as handle any metaverse changes required by these MA-related changes. In another case, the configuration information 136 can include a suite of files that govern the configuration of the entire production system 106, or a part thereof. For example, this suite of files can include separate files that affect changes to the MA's (or which introduce new MA's). This suite of files can also include a file that affects changes to the metaverse (MV) provided by the production system 106.

In one implementation, the lab system 108 outputs the configuration information 136 to a storage location 138. The storage location 138 can physically represent a directory location of the user's 132 choosing. The storage location 138 can be physically associated with the lab environment 104, the production environment 106, or some other environment. The outputting of the configuration information from the lab system 108 to the storage location 138 is referred to herein as an export operation. To apply the configuration information 138 to the production environment, a user can retrieve the configuration information 136 from the storage location 138. This retrieval operation is referred to as an importing operation. The lab user 132 can perform both the exporting and importing operations. Alternatively, another user 140 associated with the production environment 102 can initiate the importing operation. The multidirectory service can provide UI specifically tailored to initiate the exporting and importing operations (as will be described with reference to FIGS. 12 and 13). In another implementation, there need not be such a firm separation between exporting and importing; a user can create the configuration information 136 and directly apply it to the production system 106.

In any case, the production system 106 is shown as including configuration logic 142. The configuration logic 142 generally represents any combination of software and/or hardware for handling configuration tasks. For instance, the configuration logic can be implemented as a collection of API's associated with an executive/service level of the metadirectory service. The role of the configuration logic 142 is to process the configuration information 136 provided by the lab system and make the changes in the production system 106 specified by the configuration information 136. More specifically, the configuration logic 142 processes the configuration information 136 in different ways depending on what changes are required by the configuration information 136. The configuration logic 142 can apply a first procedure in the event that the configuration information 136 prompts it to add a new MA to the production system 106. The configuration logic 142 can apply a second procedure in the event that the configuration information 136 prompts it to modify an existing MA already provided by the production system. And the configuration logic 142 can apply a third procedure in the event that the configuration information 136 prompts it to configure (or reconfigure) the entire production system 106, or multiple parts thereof. Section C (below) provides additional details regarding these three procedures.

The configuration logic 142 makes changes to the production system 106 on the basis of the configuration information 136 in the following manner. The production system 106 possesses an existing configuration defined by its existing collection of rules, etc. The configuration information 136 itself also contains a description of a metadirectory configuration, as it was defined in the lab system 108. The existing configuration and the configuration information 136 both include several constituent parts that describe the configuration of different corresponding parts of the metadirectory service. Generally, the configuration logic 142 modifies the existing configuration of the production system 106 by performing a part-by-part modification of the existing configuration based on the configuration information 136.

This part-by-part modification can entail performing a detailed comparison of the existing configuration with the configuration specified in the configuration information 136 to produce a comparison result, and then modifying the existing configuration based on the comparison result. For example, based on the comparison result, the configuration logic 142 can be used to modify the existing configuration by only changing those parts of the configuration that are "new" within the file-specified configuration information 136.

This part-by-part modification can also entail matching information describing the existing configuration with the configuration information 136 to produce a matching result, and determining whether to modify parts of the existing configuration based on the matching result and various rules. These rules can vary depending on the type of MA being modified and its associated CD. This matching can result in replacing certain parts of the existing configuration in the production system 106 with counterpart information provided by the configuration information 136. In other cases, the configuration logic 142 may decide to ignore certain parts of the configuration information 136. More specifically, the configuration information 136 is generated in the lab system 108 based on a model of the production system 106 and its associated CD's. However, the lab environment 104 may differ from the production environment 102 in various respects. This difference can result in the production of configuration files that are not perfectly tailored to the production system 106 in all respects. During the configuration process, the configuration logic 142 can detect these differences by performing the above-described matching, and can determine what changes should be made (or not made) to the production system 106 based on this matching (and based on the above-described rules).

The above-described piecemeal matching particularly comes into play in the handling of MA partitions. Namely, an MA (and associated CD) can include multiple component parts. For instance, an MA associated with a system for an international company might contain different parts associated with separate business divisions in different countries. These parts are referred to as partitions. An exemplary partitioned MA is an LDAP directory with different domains or naming contexts. The configuration logic 142 can perform the above-described piecemeal matching to ensure that the assumptions made by the lab system 108 regarding the CD partitions accurately correspond to the actual partitions associated with the CD's available to the production system 106. This operation may entail matching partition information contained in the configuration information 136 with partition information extracted from the CD or the relevant existing MA (if it exists). In one example, for instance, the lab system 108 may employ a separate copy of an LDAP directory from that which is employed in the production system. This copy may vary slightly from the version used by the production system 106. In this case, the configuration logic 142 performs the above-described piecemeal matching to match up the domains/naming context of the lab LDAP directory with those of the production LDAP directory.

More specifically, the configuration logic 142 can apply an automated routine to attempt to automatically perform the above-described matching operations. In the event that certain partitions cannot be matched, the configuration logic 142 can then activate a UI presentation that allows the user to manually specify partition matches. That is, the user can identify that certain partition information associated with the configuration information 136 pertains to partition information stored in an existing MA or in the CD.

Section C provides additional details regarding other unique features of the configuration process.

The above-described configuration process has a number of benefits. First, this process provides a reliable and convenient technique for transferring configuration information from a lab system to a production system. In contrast, a manual duplication of configuration information might introduce errors in a production system. Second, this process provides a reliable and convenient technique for piecemeal introduction of changes to the production system 106 based on a collection CD-specific rules. In contrast, an indiscriminate en bloc replacement of portions of an existing configuration with a lab-specified configuration can introduce errors in the production system, as the new portions may not "fit" well with existing parts of the production configuration, and might not even accurately reflect the CD environment of the production system. These are merely exemplary benefits; those skilled in the art will recognize additional merits of the configuration techniques described in greater detail below.

The above features and resultant benefits are also applicable to other types of data processing systems besides directory-related systems.

B. Overview of an Exemplary Metadirectory System

B.1. Exemplary Architecture of the Metadirectory System

An appreciation of the above-described configuration process can best be gleaned by an introductory discussion which provides greater detail regarding the metadirectory system itself. However, the details provided herein are merely illustrative and non-limiting. The general principles described herein can be used to configure other kinds of data processing systems, and in, particular, other kinds of directory and multidirectory systems.

Figure 2:
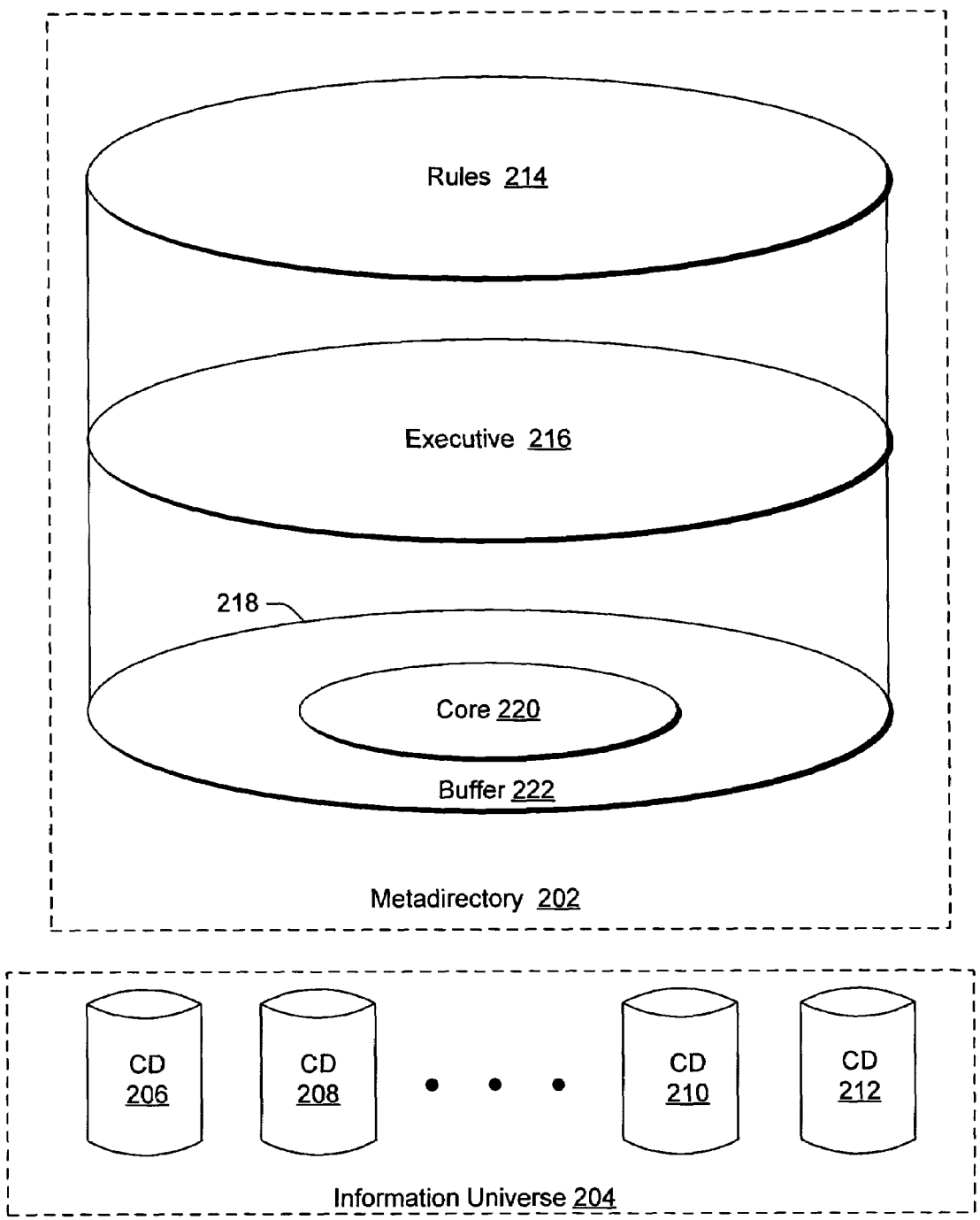
FIG. 2 shows exemplary functionality provided by the metadirectory system organized into a series of layers.

To begin with, FIG. 2 shows a metadirectory system 202 implemented on the production system 106 (of FIG. 1) in production environment 102. The multidirectory system 202 interacts with an information universe 204. The information universe 204 includes a collection of CD's (206, 208, 210, 212) (which may correspond to the same CD sources shown in FIG. 1).

The metadirectory system 202 itself can be conceptualized as including a plurality of functional layers, including a rules layer 214, executive (or service) layer 216, and a storage layer 218. The rules layer 214 can be used to specify the behavior of the metadirectory system 202. For instance, this layer 214 can be used to specify the metaverse and MA rule sets (e.g., rules 124-130) shown in FIG. 1. The executive layer 216 applies the rules in the rules layer 214 to provide a number of services for the metadirectory system 202. The executive layer 216 can also implement a variety of administrative functions that allow a user to interact with the metadirectory system 202. The executive layer 216 optionally includes APIs and/or other interfaces to access hardware and/or software functionality. The storage layer 218 stores objects in the course of providing the metadirectory service.

More specifically, the storage layer 218 is shown as including a core storage area 220 and a buffer area 222. The core storage area 220 can be viewed as an aggregated combination of organizational information from a number of data repositories (e.g., CD's) in the information universe 204. The core storage area 220 also implements the metaverse (MV) aspects of the multidirectory system 202. The buffer storage area 222, in turn, may be used as a staging area, wherein organizational data is received from one or more CD's and processed before affecting a change in the core storage area 220. As will be described in connection with later figures, the buffer area 222 is also referred to as connector space (CS).

The exemplary storage layer 218 can be implemented using any storage mechanism, such as using an SQL database in conjunction with any kind of physical storage medium. In an exemplary implementation, the core 220 and/or the buffer 222 can be configured as respective flat namespaces.

Figure 3:
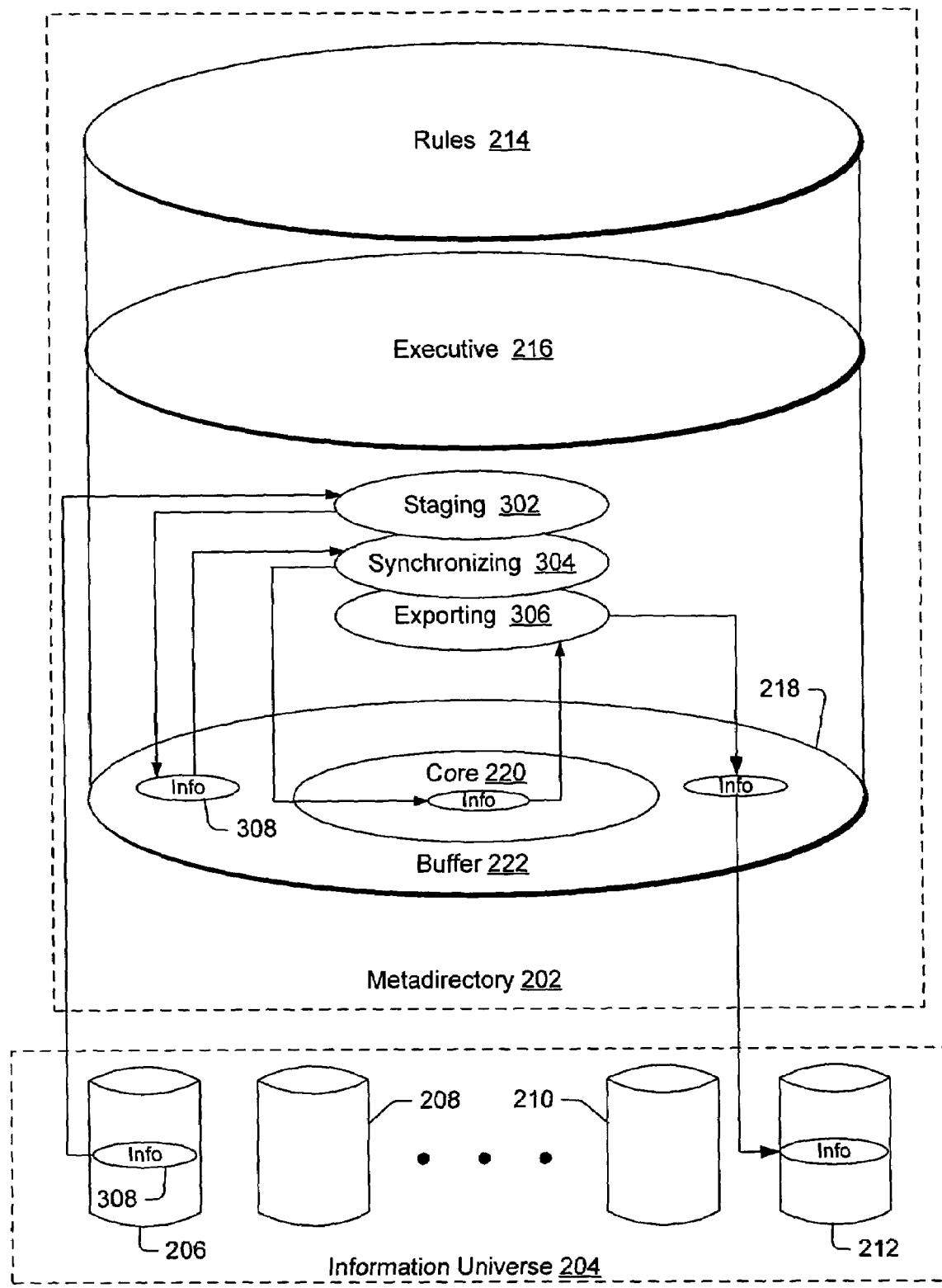
FIG. 3 shows how the functionality of FIG. 2 can be used to implement interaction between the metadirectory system and a collection of connected directory sources.

FIG. 3 illustrates how the metadirectory system 202 can interact with the information universe 204. The metadirectory system 202 illustrated in FIG. 3 shows additional functionality (302, 304, 306) that plays a role in the interaction between the metadirectory system 202 and the CD's in the information universe 204. Namely, the metadirectory system includes staging functionality 302, synchronizing functionality 304, and exporting functionality 306. In the exemplary metadirectory system 202, the staging functionality 302, synchronizing functionality 304, and the exporting functionality 306 may be part of, or work in conjunction with, the executive layer 216, to stage, synchronize, and/or export information between the information universe 204 and the metadirectory system 202.

FIG. 3 specifically illustrates the operation of metadirectory system 202 in one exemplary processing scenario. This exemplary processing scenario corresponds to the case where a change made in one CD (e.g., CD 206) requires a change in another CD (e.g., CD 212). For instance, the metadirectory system 202 may regard an object stored in CD 206 as authoritative, and the counterpart object stored in CD 212 as non-authoritative. Hence, when a change is made to the object in CD 206, the metadirectory system 202 will propagate information from CD 206 to the storage layer 218, and then output to CD 212.

More specifically, information 308 from the CD 206 is communicated to the metadirectory system 202. The exemplary staging functionality 302 buffers the information 308 in the buffer 222 in accordance with rules in the rules layer 214. The synchronizing functionality 304 may synchronize (e.g., reconcile) the information 308 with other information in the metadirectory system 202 according to rules in the rules layer 214. The exemplary synchronizing functionality 304 may include a synchronizing engine that performs various synchronizing functions. From the buffer 222, an association may be made between the information 308 in the buffer 222 and information in the core 220. This may entail moving the information 308 into the core 220. The information 308 can then be moved out of the core 220 again into the buffer 222, where it is prepared to be exported out to the remote repository 212. The exemplary export functionality 306 exports (e.g., propagates) the information out to target CD 212 according to the rules of the rules layer 214, thereby ensuring that CD 206 and CD 212 have consistent information.

As discussed in more detail below, in one implementation, objects in the buffer 222 can constitute connector objects or disconnector objects. A connector object is an object that is linked to an object in the core 220. A disconnector object is an object that is not linked to an object in the core 220. By linking, or not linking, objects in the buffer 222 to objects in the core 220, according to rules in the rules layer 214, unique combinations of data objects and attributes can be designed into the core 220, whereby the core 220 may be considered a rules-directed aggregate of information from the information universe 204. In this exemplary implementation, utilizing connector objects and disconnector objects, the buffer 222 may be referred to as a connector space, and the core 220 may be referred to as an aggregate space.

Rules Layer

Figure 4:
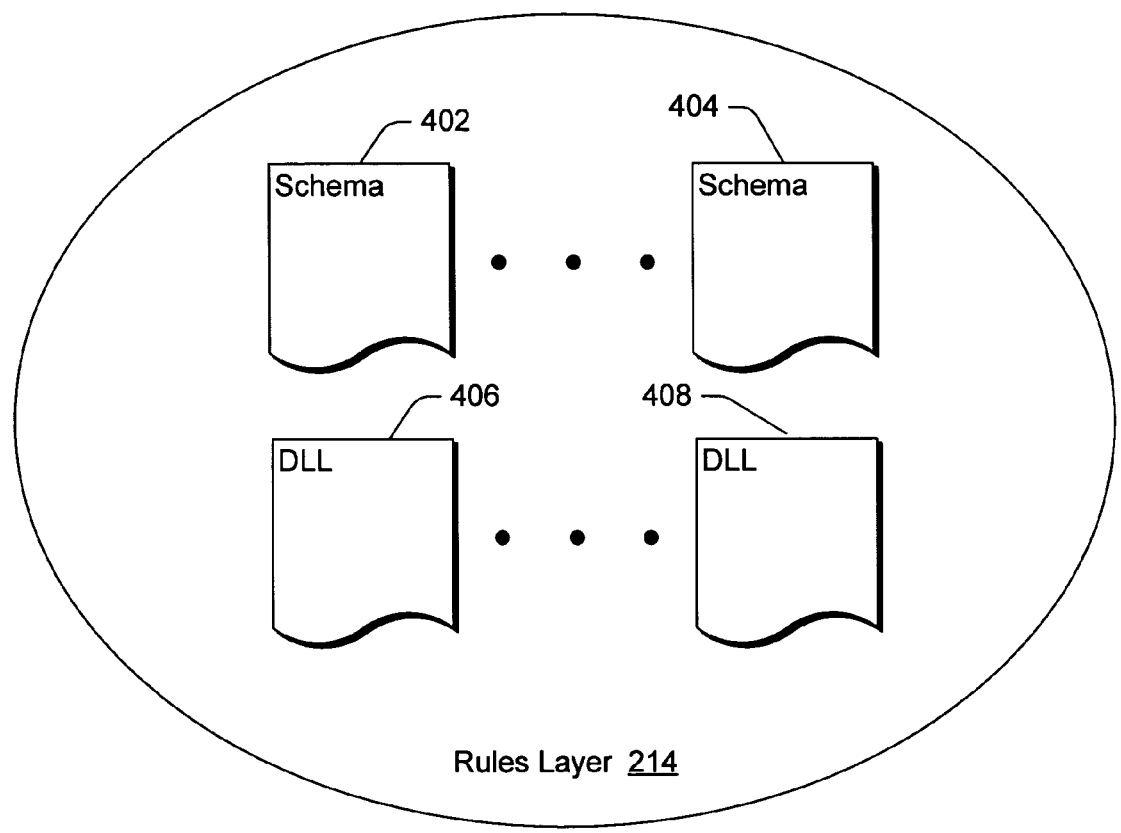
FIG. 4 shows exemplary details of a rules layer shown in FIG. 2.

FIG. 4 illustrates the exemplary rules layer 214 shown in FIGS. 2 and 3. The exemplary rules layer 214 includes declarative rules that may be applied to data from one or more data repositories for aggregating the data. A particular implementation of the rules layer 214 includes one or more schemas (402, . . . 404), and/or one or more dynamic-link libraries (DLLs) (406, . . . 408), which are used to ensure that information flows into, within, and out of, the metadirectory system 202 in accordance with specified metadirectory protocols. The use of schemas (402, . . . 404) represents only one mechanism for assuring conformance to metadirectory policies; other mechanisms besides schemas may be used instead of, or in addition to, schemas without deviating from the functional principles described herein.

Each of the exemplary schemas (402, . . . 404) provides a model or blueprint for describing the structure of information processed by the metadirectory system 202. The schemas (402, . . . , 404) also include criteria specifying how data is processed in the metadirectory system 202. In general, a separate schema may be developed and applied at any place within the metadirectory that information crosses a boundary. For example, with regard to the metadirectory 202 of FIG. 3, an import schema may be applied to the information 308 when the information 308 is received from the remote repository 206. As another example, a core schema may be applied to the information 308 when it is moved from the buffer 222 into the core 220. Schemas (402, . . . 404) may hold information such as system configuration information, data format specifications, and so on. As mentioned above, a markup language, such as XML, can be used to express the schemas (402, . . . 404).

More specifically, in an exemplary implementation, the metadirectory system 202 employs the following schemas: a) a management agent (MA) schema; b) a remote repository schema; c) a connector filter schema; d) a join schema; e) a project schema; f) an export attribute flow schema; g) a run configuration schema; h) a deprovisioning schema; i) an import attribute flow schema; and j) a metadirectory core schema.

The MA Schema (described in more detail below) specifies criteria for MA interactions with its associated CD. The remote repository (RR) schema models the structure of data received and processed by a management agent. For example, the RR schema may define the object types and attributes used by the remote repository. The connector filter schema models a rules engine filter that is employed by a synchronization engine during importing and/or exporting of data objects. The join schema models one or more rules for joining an object in a metadirectory buffer (e.g., the buffer 222 in FIG. 2) with an object in a metadirectory core (e.g., the core 220 in FIG. 2).

The project schema models one or more rules for projecting an object into a metadirectory core (e.g., the core 220 in FIG. 2). The export attribute flow schema models one or more rules for associating an attribute in a metadirectory core (e.g., the core 220 in FIG. 2) with an object in a metadirectory buffer (e.g., the buffer 222 in FIG. 2). The run configuration schema identifies various ways in which an MA is to run, e.g., as specified by a customer.

The import attribute flow schema describes how attribute values should flow from an object in a metadirectory buffer (e.g., the buffer 222 in FIG. 2) to an object in a metadirectory core (e.g., the core 220 in FIG. 2). The core data schema models the layout of the data in the core 220 in terms of different object types and attributes associated with these different object types.

The DLL's (406, . . . 408) include sets of rules and/or specifications for managing data. For instance, an exemplary DLL 406 can include rules extensions that can be used by the metadirectory system 202 to combine data from two source attributes (e.g., surName and givenName) and flow this data to one target attribute (e.g., displayName).

The DLL's are useful in implementing custom rules to supplement the declarative rules governed by the schemas (402, . . . 404).

In an exemplary implementation, the following types of rules may be specified in the rules layer 214, using schemas, or otherwise: a) connector filter rules; b) deprovisioning rules; c) export attribute flow rules; d) import attribute flow rules; e) join rules; f) projection rules; and g) provisioning rules. Other rules may be implemented as may be useful to a particular metadirectory design. Brief descriptions of the rules mentioned above are as follows.

Connector filter rules (also called disconnector rules): These are rules that specify prevention of linking (connecting) objects in the metadirectory buffer to objects in the metadirectory core.

Deprovisioning rules: These are rules that specify how a metadirectory buffer object is processed after it has been disconnected (i.e., unlinked) from a metadirectory core object.

Export attribute flow rules: Export attribute flow refers to the process of flowing attributes of objects in the metadirectory core to objects in the metadirectory buffer. Export attribute flow rules specify the process of export attribute flow.

Import attribute flow rules: Import attribute flow refers to the process of flowing attributes of objects in the metadirectory buffer to objects in the metadirectory core. Import attribute flow rules specify the process of import attribute flow.

Join rules: These are rules that specify the process of linking an object in the metadirectory buffer to an object in the metadirectory core.

Projection rules: These are rules that specify the process of creating an object in the metadirectory core and linking the created object to another object in the metadirectory buffer.

Provisioning rules: Provisioning is the process of creating, renaming, and/or deprovisioning objects in the metadirectory buffer based on a change to an object in the metadirectory core. Provisioning rules specify the process of provisioning.

Executive Layer

Figure 5:
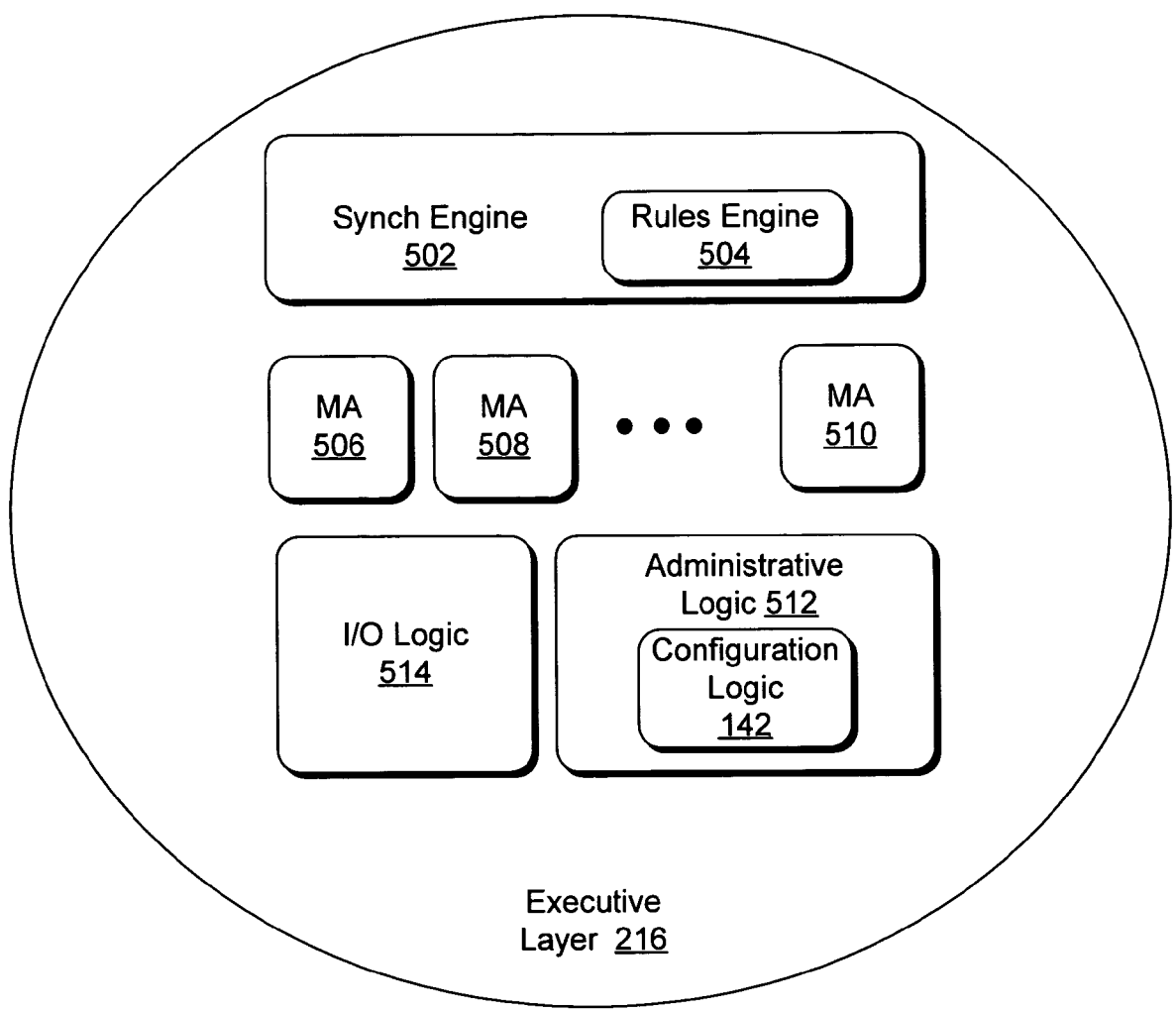
FIG. 5 shows exemplary details of an executive layer shown in FIG. 2.

FIG. 5 is a block diagram illustrating an exemplary executive layer 216 for use in the metadirectory system 202. In general, the executive layer 216 includes hardware, firmware, or computer-executable code modules (or any combination thereof) to implement one or more metadirectory services. The exemplary modules in the executive layer 216 are suitable for execution on a virtual machine, runtime engine, and the like, and are thereby useable in a NET® environment.

The exemplary executive layer 216 includes a synchronization engine 502, which, in turn, includes a rules engine 504. The executive layer 216 also includes one or more management agents (506, 508, . . . 510). The executive layer 216 also includes administrative logic 512, which, in turn, includes the configuration logic 142 introduced in FIG. 1. The executive layer 216 may also include Input/Output (I/O) logic 514.

The exemplary synchronization engine 502 performs synchronization of objects in the metadirectory buffer 222 and/or the metadirectory core 220. Synchronization refers to a process of maintaining consistency among multiple sources of data. In the context of an exemplary metadirectory system, synchronization involves utilizing attribute flow precedence to combine similar data into a final version that is stored in the metadirectory core 220. This data is then exported from the metadirectory core 220 to remote CD's.

The exemplary synchronization engine 502 may include the rules engine 504 as part thereof. An exemplary rules engine 504, in conjunction with the rules in the rules layer 214, provide rules analysis functions that direct the creation of objects and the flow of attributes within the metadirectory system 202. For example, the rules engine 504 may analyze connector filter criteria of a buffer object to determine whether the buffer object should be connected (e.g., joined or projected) to an object in the metadirectory core 220.

The one or more exemplary MA's (506, 508, . . . 510) communicate with CD's to receive data objects, stage the objects, and transfer data objects out to the CD's. The exemplary MA's (506, 508, . . . 510) convert repository information received in one format (e.g., Active Directory®, Oracle®) into an isomorphic form, such that all data in the buffer is in a common form. Each of the exemplary MA's (506, 508, . . . 510) has a user interface (UI) associated with it, whereby a user can access an MA. Via an MA UI, a user may cause the MA to perform a specified run (e.g., execute a task), such as an import run or an export run. The user can also read and update various information (e.g., version, configuration, description) associated with an MA through an MA UI.

Applications may also communicate with MA's via application programming interfaces (APIs) provided by the I/O logic 514. In addition to providing APIs, the exemplary I/O logic 514 performs standard input/output tasks to communicate from the metadirectory to one or more remote CD's. The exemplary I/O logic 514 implements and supports any communications protocols suitable to the design, such as, but not limited to, Distributed Component Object Model (DCOM), Windows® Management Instrumentation (WMI), Hypertext Markup Language (HTML), and Simple Object Access Protocol (SOAP).

Finally, the administrative logic 512 generally represents any functionality by which a user can interact with the metadirectory system 202 and control its operation. For instance, the administrative logic 512 includes user interface logic for providing one or more user interface presentations that allow a user to interact with the metadirectory system 202. Such UI enables a user to access, update, and otherwise interact with the metadirectory modules used in the metadirectory system and the data therein. Reference to various "pages" in the ensuing discussion pertains to various UI presentations that facilitate user interaction with the metadirectory service. The administrative logic 512 also includes the configuration logic 142 as part thereof. The configuration logic coordinates the import configuration tasks described in Section A above, and to be elaborated on in Section C below.

Overview of Operation

Figure 6:
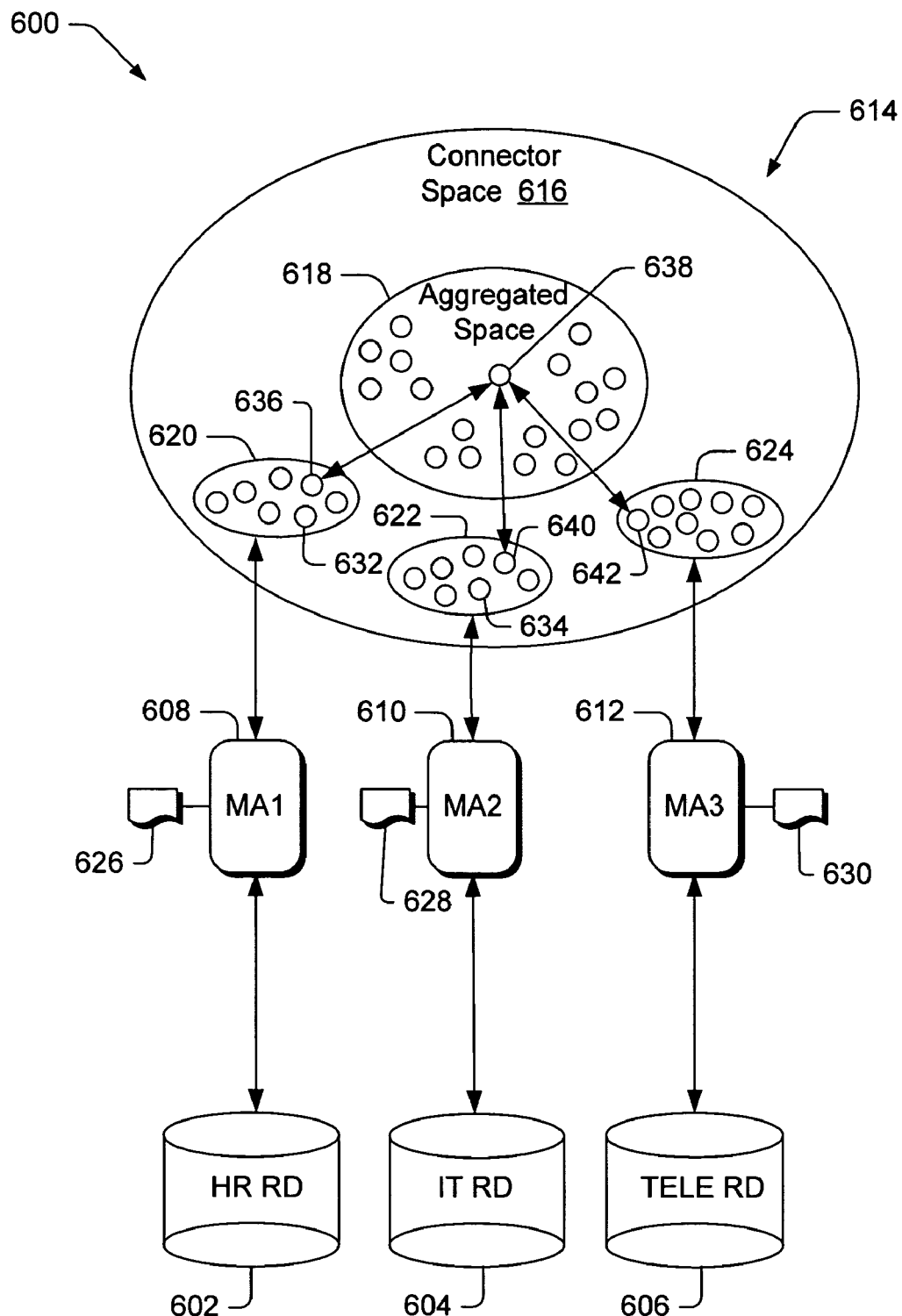
FIG. 6 shows how connector space and aggregated space (provided by a storage layer shown in FIG. 2) can be used to govern interaction between the metadirectory system and the connected directory sources.
Figure 7:
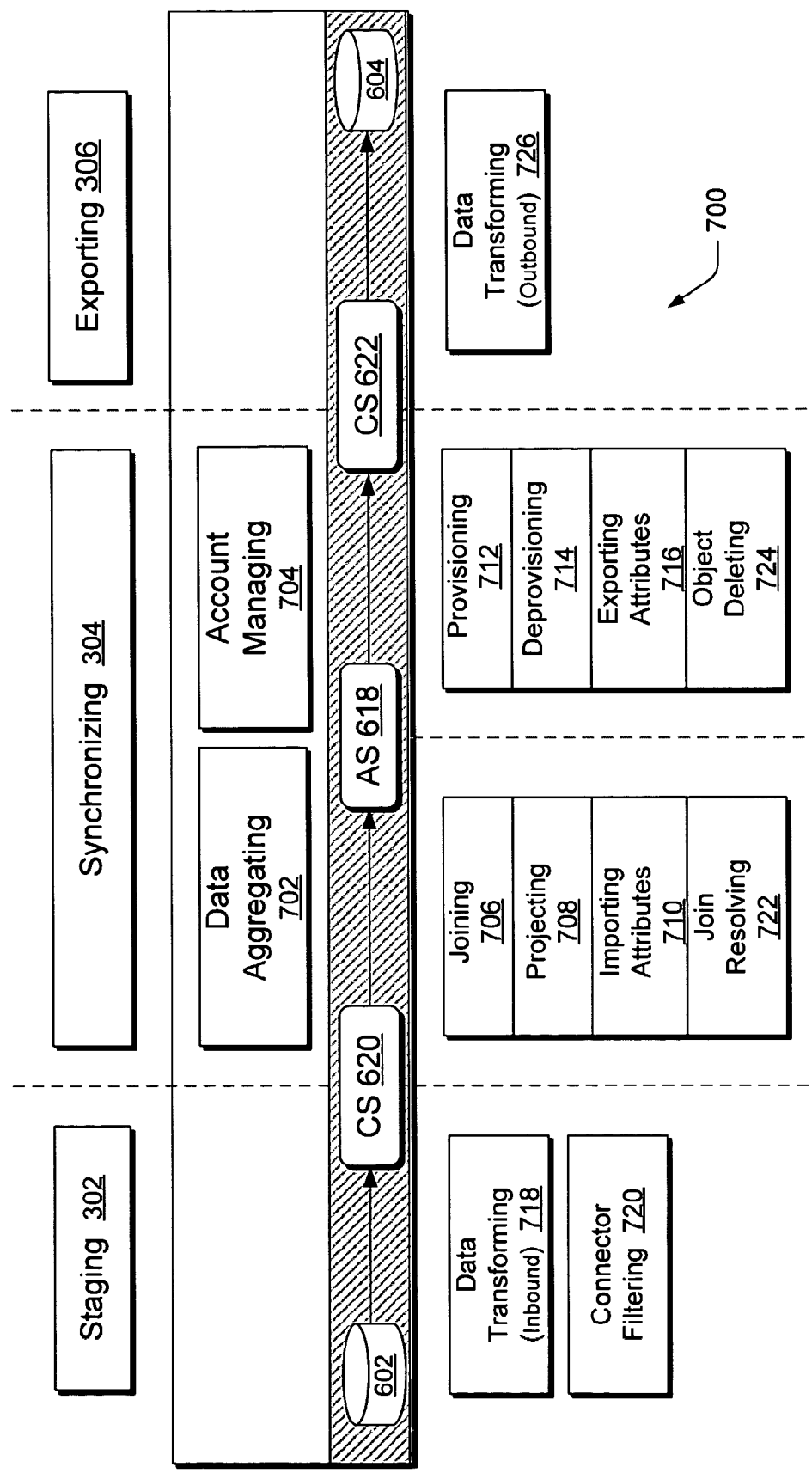
FIG. 7 shows a breakdown of exemplary different operations performed at different stages in the operation of the metadirectory system.

FIGS. 6 and 7 provide information regarding how the features described in FIGS. 1-5 operate. To begin with, FIG. 6 is a block diagram illustrating an exemplary environment 600 for use in a metadirectory scenario. The exemplary environment 600 includes a human resources (HR) remote directory (RD) 602, an information technology (IT) RD 604, and a telephone RD 606. The HR RD 602 is in operable communication with a first management agent (MA1) 608. The IT RD 604 is in operable communication with a second management agent (MA2) 610. The telephone RD 606 is in operable communication with a third management agent (MA3) 612.

MA1 608, MA2 610, and MA3 612 are in operable communication with storage 614. The storage 614 is an exemplary implementation of the storage layer 218, shown in FIG. 2. The exemplary storage 614 is partitioned, or otherwise divided, into a first namespace, called a connector space (CS) 616, and a second namespace, called an aggregated space (AS) 618. The CS 616 is an exemplary implementation of the metadirectory buffer 222, shown in FIG. 2. The AS 618 is an exemplary implementation of the metadirectory core 220, shown in FIG. 2.

The connector space 616 is partitioned, or otherwise divided, into one or more connector space regions that are used by the MA's. MA1 608 communicates with a first connector space region (CS1) 620. MA2 610 communicates with a second connector space region (CS2) 622. MA3 612 communicates with a second connector space region (CS3) 624.

Each of the MA's uses the MA's associated connector space regions to import, and otherwise process objects from the MA's associated RD. For example, MA1 imports objects from the HR RD 602 and populates CS1 620 with the imported objects. The MA's may import objects from the RDs at any time. For example, the MA's may import objects periodically, or upon the occurrence of a specified event, such as power-up, or user request. Each of the MA's may import objects independently from the other. In one exemplary implementation, MA2 610 imports objects from IT RD 604 whenever IT RD 604 powers up, while MA3 612 imports objects from telephone RD 606 once per day. In another exemplary implementation, a user may initiate a simultaneous import at MA1, MA2, and MA3.

Each of MA1 608, MA2 610, and MA3 612, has a schema, schema 626, schema 628, and schema 630, respectively, associated with the MA. The schemas each may have information, such as rules or data filters, that are specific to the MA associated with the schema. The exemplary schemas, 626, 628, and 630 may or may not be stored in the storage 614. In a particular implementation, the schemas are stored in a separate storage area that is accessible to the MA's and a synchronization engine.

To illustrate an exemplary metadirectory operation, an exemplary scenario is described. The exemplary HR RD 602 transmits one or more objects to the MA1 608. The MA1 608 populates the CS1 620 with the one or more HR objects 632 that the MA1 608 receives from the HR RD 602. The MA1 608 may transform, or otherwise format the one or more received HR objects 632 according to rules specified in the schema 626. Similarly, the exemplary IT RD 604 transmits one or more IT objects to the MA2 610. The MA2 610 populates the CS2 622 with the one or more IT objects 634 that the MA2 610 receives from the IT RD 604. The MA2 610 may transform, or otherwise format the one or more received IT objects 634 according to rules specified in the schema 628.

The exemplary HR objects 632 and the IT objects 634 may be aggregated into the aggregated space (AS) 618 during a synchronization process. For example, an HR object 636 may be joined with an exemplary aggregated objected 638, which corresponds to the HR object 636. The aggregated object 638 may correspond to the HR object 636 if the two objects are person objects, having the same "name" value for their "name" attributes.

Likewise, an IT object 640 and a Tele object 642 may be joined to the aggregated object 638. After the HR object 636, the IT object 640, and the Tele object 642 are joined to the aggregated object 638, attributes of the objects 636, 640, and 642 may be imported to the aggregated object 638. For example, the "name" attribute of the HR object 636 may be imported to the aggregated object 638, the "e-mail address" attribute of the IT object 640 may be imported to the aggregated object 638, and the "home telephone" attribute of the Tele object 642 may be imported to the aggregated object 638.

Attributes of the aggregated object 638 can be exported to joined objects in the connector space 616. For example, the "name" attribute of the aggregated object 638 may be exported to the IT object 640 and the Tele object 642. As another example, the "e-mail address" attribute of the aggregated object 638 may be exported to the HR object 636 and the Tele object 642. As a further example, the "home telephone" attribute of the aggregated object 638 may be exported to the IT object 640 and the HR object 636. After the attributes are exported, and the objects are synchronized, the HR objects, the IT objects, and the Tele objects may be transmitted to the HR RD 602, IT RD 604, and Tele RD 506, respectively.

FIG. 7 illustrates an exemplary "organizational information management process" (OIMP) 700 that can be implemented in an environment such as the environment shown in FIGS. 2-6. The exemplary OIMP 700 includes staging (e.g., staging 302 of FIG. 3) synchronizing (e.g., synchronizing 308 of FIG. 3), and exporting (e.g., exporting 306 of FIG. 3), as well as other data processing that facilitates data integrity across more than one connected information source.

Such additional processes include, for example, data aggregating 702, and account managing 704. Further, such additional processes may have sub-processes. For example, data aggregating 702 may include joining 706, projecting 708, importing attributes 710, and join resolving 722. Joining 706, for example, is a process that may involve establishing a service to determine whether an attribute of an object in the connector space 620 will be joined with an object in the aggregated space 618. Account managing 704 may include provisioning 712, deprovisioning 714, exporting attributes 716, and object deleting 724. Staging 302 includes a data forming process 718 and a connector filtering process 720. Exporting 306 includes a data transforming process 726.

In general, such processes and/or sub-processes may be carried out by any of a variety of modules described herein, including, one or more management agents (MA), a synchronization engine (SE), a rules engine (RE), or an MA controller. Any or all of such modules carry out the exemplary processes shown in FIG. 7 in accordance with rules and/or specifications. Such rules and/or specifications may be flexible and extensible and may be designed to ensure that the most valued, most correct, and/or user-selected data reside in the aggregated space 618 and in one or more connected information sources 604, as appropriate to the particular setting.

In some implementations of the exemplary metadirectory 202 the processes in the exemplary OIMP 700 are executed in a relatively well-defined sequence; that is to say, the various parts of the exemplary OIMP 700 are not performed at random, haphazardly, or in total separation from each other. Many of the processes performed with respect to the OIMP 700 are done as specified in rules, as discussed throughout.

B.2. Exemplary <mv-data> and <ma-data> Formats

The configuration information 136 identified in FIG. 1 can include an MV.XML file (that contains changes that affect the metaverse), and also can contain a number of management agent (MA) files that each represent one management agent (MA). The file name for each MA consists of the prefix "MA," followed by the MA's id. The lab system 108 can store these files with a read-only attribute so that they cannot be accidentally modified. The following excerpt identifies an exemplary listing of configuration files:

```
07/08/2003  08:23 AM          10,457 MA-{2EC39297-5D21-4CAE-
8191-9E29AB0DD482}.XML
07/08/2003  08:23 AM         283,447 MA-{BA581110-8A6F-4BA4-
8135-FA1684FB6D4F}.XML
07/08/2003  08:23 AM          20,651 MV.XML
```

However, before the details regarding the configuration process itself are disclosed, additional information is provided regarding the XML formats used in the XML files identified above. More specifically, the configuration of the production system 106 involves the creation and processing of two fragments: <ma-data> and <mv-data>. An exemplary composition of these fragments is set forth in the following sections.

The <mv-data> XML Element

The <mv-data> XML format can have the following exemplary high-level composition:

```
<mv-data>
    <format-version>1</format-version>
    Versioning information
    MV rule configuration
    Password sync configuration
</mv-data>
```

This format contains an element named "format-version" which provides the version of XML formatting of this element.

The above-referenced versioning information may include the following elements:

```
<version>5</version>
    <schema>
        ...
    </schema>
    <import-attribute-flow />
    <provisioning type="none" />
    <mv-deletion />
    <extension />
    <password-change-history-size />
```

The version information generally conveys the version of the MV configuration. Higher numbers indicate later versions of the MV configuration. When the configuration logic 142 updates the MV, the old version number that the edit is based on is passed in. If this number is less than the current version stored in the metadirectory database 116, then the modification will fail. This behavior is designed to ensure that plural users that are concurrently editing the MV will not conflict with each other.

The schema element referred to above contains the schema of the metaverse. The schema can be implemented in DSML with extensions. The schema defines all attributes referred to by elements, such as import-attribute.

The import-attribute-flow element specifies the import attribute flow rules that govern how attributes of connector space (CS) objects are transferred to MV objects during import.

The provisioning element calls a provisioning script to handle object creation and deletion in all CD's. If the tag is missing or if the type attribute is "none," it means that no provisioning is specified for the installation of the metadirectory system.

The mv-deletion element specifies the import attribute flow rules that govern how attributes of connector space (CS) objects are transferred to Mv objects during import.

The extension element provides details regarding how to run an MV extension. Application protection can have two states: a "high" state denotes out-of-proc and a "low" state denotes in-proc. If enable debugger is set to "true," a script exception will result in launching a debugger; otherwise, the exception will be logged and the synchronization will continue. The complete exemplary format for this XML element is:

```
<extension>
    <assembly-name>DLL name (string)</assembly-name>
    <application-protection> low | high </application-protection>
    <enable-debugger> true | false </enable-debugger>
    <timeout> integer value </timeout>
</extension>
```

The <timeout> tag referred to above contains an integer specifying the number of seconds for the timeout. If set to 0, the timeout is disabled.

The password-change-history-size element specifies the number of the password management operations that can be saved in the metadirectory database 116. In one exemplary implementation, the default value is 24.

The <ma-data> XML Element

An exemplary high level overview of the <ma-data> XML format is as follows:

```
<ma-data>
    <format-version>1</format-version>
    Naming information
    Versioning information
    Generic MA rule configuration
    Controller configuration
    Password sync configuration
    UI configuration
    Private configuration
    Encrypted attribute configuration
    Partition configuration
    Run Profile configuration
</ma-data>
```

The <format-version> element has the same meaning as described in the above <mv-data> section. The remainder of the sub-elements are described in the following sections.

Naming Information

In the above format, the naming information refers to a grouping of elements that provide the highest level information about the MA. In one exemplary implementation, all elements in this grouping should be specified to the DCOM interface when an MA is created. The following excerpt provides an example of the naming information.

```
<id>{3F5AA741-626E-483F-BB2D-EE0F5E73CE02}</id>
    <name>Ad Shadow</name>
    <category>AD</category>
```

The id element refers to a GUID that uniquely defines the MA in the metadirectory system. It should be provided to the production system 106 on all calls involving creation or modification of an MA. Once the MA is created this id never changes. Some considerations applicable to the naming information are as follows. (1) When an MA is exported via an "Export Management Agent" or "Export Server Configuration" processes, a GUID corresponding to the MA is saved to the configuration file. (2) When a new MA is created using a "Create" process provided by the configuration logic 142, the configuration logic 142 generates a new GUID and includes this new GUID when it sends the XML to the metadirectory system through DCOM. (3) When a new MA is created using an "Import Management Agent" process provided by the configuration logic 142, the configuration logic 142 generates a new GUID and uses this new GUID instead of whatever GUID may be in the exported configuration file when the XML is sent to the metadirectory system. This allows the exported MA configurations to be used as MA templates. (4) When a new MA is created as part of an "update MA From File" process or the "Import Server Configuration" process, the GUID in the export file is passed to the metadirectory system. This allows the production system 106 to update the existing design of the MA.

The "name" element refers to a non-empty string that provides the UI display name of an MA in the metadirectory system. The metadirectory system forces this string to be unique. The metadirectory system also places restrictions on the characters appearing in the name and the length of the name. This is because the metadirectory system uses this name as the name of a file system directory on the production system 106, and therefore it should meet certain requirements in connection therewith. In one exemplary implementation, the length limit is 80 characters. The name can be modified by the user, and if so, will be included in the MA XML on modify calls. If it is not being modified, it does not need to be included in the XML on modification calls.

The category information refers to "MA type" as shown by the user interface functionality of the metadirectory system. In one implementation, this type cannot be changed once the MA has been created. In one exemplary implementation, supported types include: LDAP types (e.g., AD, ADAM, AD GAL, iPlanet, Exchange, Exchange GAL, eDirectory, etc.); File types (e.g., FIXED, DELIMITED, AVP, LDIF, DSML, etc.); and various other types (e.g., MSSQL, Oracle, NT, Notes, etc.).

Versioning Information

The versioning information refers to a grouping of elements that provides versioning information regarding the MA design. All elements in this grouping are read-only and are returned by the production system 106 for informational purposes. An example of the versioning information is listed below:

```
<creation-time>2002-07-23 17:12:23.699</creation-time>
<last-modification-time>2002-07-23 19:21:17.699</last-
modification-time>
<version>5</version>
```

In this excerpt, the element creation-time refers to the time (e.g., in GMT) when the MA was created on the metadirectory system.

The last-modification-time refers to the time (e.g., in GMT) when the design of the MA was last modified on the metadirectory system.

The version information indicates the version of the MA configuration. Higher numbers indicate later versions of the MA's configuration. When the configuration logic 142 updates an MA, the old version number that the edit is based on is passed in. If this number is less than the current version stored in the metadirectory system database 116, the modification will fail. This behavior is designed to prevent multiple users who may be editing the same MA from negatively impacting each other.

Generic MA Rule Configuration Information

The generic MA rule configuration information refers to a grouping of elements that convey the MA rule configuration that the user has configured for the MA in generic MA configuration pages. It also includes the schema and attribute inclusion which may be defaulted or obtained from the MA depending on the type of MA. The following excerpt provides an example of how the generic MA rule configuration information would appear if the user did not do any configuration in the generic MA configuration pages.

```
<schema>
    ...
</schema>
<attribute-inclusion>
    <attribute>description</attribute>
    <attribute>displayname</attribute>
    <attribute>givenname</attribute>
    <attribute>manager</attribute>
    <attribute>member</attribute>
    <attribute>samaccountname</attribute>
    <attribute>sn</attribute>
</attribute-inclusion>
<stay-disconnector />
<join />
<projection />
<export-attribute-flow />
<provisioning-cleanup type="declared">
    <action>make-explicit-disconnector</action>
</provisioning-cleanup>
<extension>
    <assembly-name>IFMA.dll</assembly-name>
    <application-protection>low</application-protection>
</extension>
```

The schema element referred to in the above-identified excerpt provides a description of the MA schema in DSML format. All attributes referred to by the elements which follow (attribute-inclusion, stay-disconnector, etc.) are defined in the schema. This schema is built up according to the following exemplary rules depending on the type of CD.

The following rules apply to LDAP types. (1) For AD and AD/AM types, the schema is discovered dynamically by the MA from the AD forest. The MA formats that schema into DSML (this formatting process can include special case logic). The configuration logic 142 queries the MA for this schema and includes an indication in the XML when the MA is imported. (2) For IPLANET types, the schema is discovered dynamically by the MA from the IPLANET server. The MA formats that schema into DSML (again, this formatting process can include special case logic). In the case of IPLANET 4.0, the configuration logic 142 will post-decorate the schema from the MA, marking the attributes involved in the anchor construction as immutable. (3) For EXCHANGE 5.5 and EXCHANGE 5.5. GAL types, the schema is discovered dynamically by the MA from the Exchange server. The MA formats that schema into DSML (again, this formatting process includes some special case logic). (4) For eDirectory types, the schema is discovered dynamically by the MA from the eDirectory server and the MA formats that schema into DSML (again this formatting process includes some special case logic).

The following rules apply to File types. For all file types, the configuration logic 142 generates the DSML schema based on discovery of the sample file data and annotation the user enters using a wizard. Attributes that make up the anchor are declared as immutable. For FIXED, DELIMITED, and AVP formats, attributes that are specified as the hierarchical DN, change type, or object class will not be included in the schema unless they are also declared to be part of the overall anchor or a per object type anchor.

The following rules apply to so-called other types. (1) For MSSQL and ORACLE types, the MA reports the underlying database schema (in a private XML non-DSML format) to the configuration logic 142. The configuration logic 142 generates the DSML representation based on user selection. This is because the user can select which attributes form the primary key (and thus the user needs to mark these attributes as immutable). Also, the user can indicate that certain attributes are reference attributes. (2) For NT types, the MA reports a fixed schema to the configuration logic 142 that models the NT 4.0 SAM database structure. (3) For Notes types, forms and sub-forms are used in Notes for the schema information. From version 5.0, Notes supports LDAP v3. The Notes system generates a schema50.nsf file to map the Notes-specific schema to an LDAP schema. The schema50.nsf contains all the schema information that is needed. Since it is an .nsf file, the same method used for import can be used to retrieve the information from the file. (Basically, this application reads each of the Notes in the .nsf file and gets all the field information). An extra step converts the output to DSML format.

The attributes-inclusion element lists attributes from the CD that the MA should import. Only attributes that appear in this list can be part of any of the sub-elements which follow (e.g., stay-disconnector, join, project, import attribute flow, export attribute flow, etc). This list applies to all partitions in the MA. If this section is missing or empty, deltas will only be imported with DN, anchor, and modification type.

The stay-disconnector element specifies whether a CS entry should stay as a disconnector in CS, or get passed in the metadirectory system sync cycle. Exemplary functionality and formats for this element are described in the appendix section of this disclosure.

The join element governs how the synchronization engine should search the MV for CS objects to join. Exemplary functionality and formats for this element are described in the appendix section of this disclosure.

The project element governs how (if any) CS objects are projected as new entries in the MV. Exemplary functionality and formats for this element are described in the appendix section of this disclosure.

The export-attribute-flow element governs how values of attributes of MV objects should be flown back to connected CS objects. Exemplary functionality and formats for this element are described in the appendix section of this disclosure.

The provisioning-cleanup rule or extension is called for a CS object when either (1) the MV provisioning script disconnects that object or (2) the MV object (CS object) it is joined to is deleted. The default behavior is to make an explicit disconnector based on the CS object. This rule will not be called if the object is disconnected by the Account Joiner or a delete on this object is imported from the CD. An exemplary complete format for this XML sub-element is:

```
<provisioning-cleanup type="declared | scripted">
    <action>
        delete-object |
        make-normal-disconnector |
        make-explicit-disconnector
    </action>
</provisioning-cleanup>
```

The extension element appears when one or more of the above sub-elements requires a .NET extension DLL for evaluation. It identifies the name of the assembly to use and indicates whether to run the extension within the metadirectory system process (application-protection=low) or outside the metadirectory system process (application-protection=high). A complete exemplary format for this XML sub-element is:

```
<extension>
    <assembly-name>DLL name (string)</assembly-name>
    <application-protection>high|low</application-protection>
</extension>
```

Controller Configuration Information

The controller configuration information controls how the controller should run the MA. An exemplary XML structure for this element is as follows:

```
<controller-configuration>
    <application-protection>low</application-protection>
    <impersonation>
        <domain>ntdev</domain>
        <user>maxb</user>
        <password>mypassword</password>
    </impersonation>
</controller-configuration>
```

The application-protection element in the above XML structure indicates whether the controller should run in a separate process ("high") or in the same process ("low") as the metadirectory NT service.

The impersonation element is present only if the controller should impersonate another identity whenever it makes calls into the MA DLL. This feature is a general controller feature that has been added to make it possible to run the DBMA with the SQLOLEDB or ORACLE provider using Windows Authentication as a different user identity than the metadirectory service.

More specifically, if this element is present, the <domain> and <user> sub-elements should both be present (omission of the <password> element indicates that there is no password). If no impersonation context needs to be configured, the entire <impersonation> context is omitted. When the <controller-configuration> element is fetched from the metadirectory service, the password element is not returned (for security reasons).

Password Sync Configuration Information

The password sync configuration information controls whether the MA calls of "set password" and "change password" can be used for this MA.

<password-sync-allowed>1|0</password-sync-allowed>

If the inner value is 1, the "set password" and "change password" calls will be allowed (subject to whether this is supported by this MA type and normal security). If the inner value is 0, the calls will fail accompanied by a diagnostic error. The default value is 0.

UI Configuration Information

The UI configuration information refers to a grouping of sub-elements that saves information that is used by the UI. This information is ignored by both the production system 106 server and the MA DLL. An example of the UI configuration element follows:

```
<description>My description</description>
<ma-ui-settings>
    <account-joiner-queries>
        ...
    </account-joiner-queries>
</ma-ui-settings>
```

In this example, the description element refers to a text description used to record any information about an MA that a user may wish to record. This description is shown on a first page of the MA property pages.

The ma-ui-settings element is used by the UI to describe per-MA settings made by the user. For instance, a setting can be recorded for an account joiner page. For reference, the inner XML contains the following sub-elements:

"Attributes" records the columns configured for the upper grid of CS objects and the lower grid of MV objects.

```
<attributes>
    <cs>
        <attribute name="DN" header="DN" size="100" />
        <attribute name="objectType" header="objectType" size="100" />
        <attribute name="displayname" header="displayname" size="100" />
    </cs>
    <mv>
        <attribute name="displayName" header="displayName"
            size="100" />
    </mv>
</attributes>
```

"Filters" records the filter used for searching for the MV objects which match the selected CS object.

```
<filters max_mv_search_results=" ">
    <filter name="Filter 1"
        collation="SQL_Latin1_General_CP1_CI_AS"
        searchscope="person">
            <element cdattribute="displayname"
        mvattribute="displayName" mvtextflag="true"
        elementoperator="exact" />
    </filter>
</filters>
```

The reason that this information is stored with the MA instead of in a file on the local client machine is because this strategy allows the administrator to set up the display columns and filter criteria so that these can be used by persons using the account joiner screen.

In contrast, the MV and CS search settings are stored per machine. The users of MV and CS search are likely individual users with administrator privilege who each have their own personal search preferences.

Private Configuration Information

The private configuration information refers to the private configuration of the MA, as specified by the <private-configuration> element. Within this element, the format is MA-specific and is generally information that is shared between the MA UI and MA DLL.

The following examples apply to LDAP types. To begin with, the following provides an example of AD private configuration:

```
<private-configuration>
    <adma-configuration>
        <forest-guid>...</forest-guid>
        <forest-name>mms-sh1-corp.nttest.microsoft.com</forest-name>
        <forest-login-domain>mms-sh1-corp</forest-login-domain>
        <forest-login-user>administrator</forest-login-user>
    </adma-configuration>
</private-configuration>
```

The following provides an example of AD/AM private configuration:

```
<private-configuration>
    <adma-configuration>
        <forest-name>mms-sh1-corp.nttest.microsoft.com</forest-name>
        <forest-port>389</forest-port>
        <forest-login-domain>mms-sh1-corp</forest-login-domain>
        <forest-login-user>administrator</forest-login-user>
        <sign-and-seal>1| 0</sign-and-seal>
        <ssl-bind>1| 0</ssl-bind>
    </adma-configuration>
</private-configuration
```

The following provides an example for iPlanet 5.x and iPlanet 4.x private configuration:

```
<private-configuration>
    <ipma-configuration>
        <default-server>mms-ip5-bvt</default-server>
        <default-login-user>cn=Directory Manager</default-login-user>
        <default-port>389</default-port>
        <default-ssl-bind>0</default-ssl-bind>
        <ui-data>
            <session>{107D1AA1-49C6-4AA0-BC59-
                CC0DAC930311}</session>
            <server-type>SERVER_TYPE_IPLANET5</server-type>
            <supportchangelog>1</supportchangelog>
        </ui-data>
    </ipma-configuration>
</private-configuration>
<private-configuration>
    <ipma-configuration>
        <default-server>nt4-riplanet</default-server>
        <default-login-user>cn=Directory Manager</default-login-user>
        <default-port>389</default-port>
        <default-ssl-bind>0</default-ssl-bind>
        <ui-data>
            <session></session>
            <server-type>SERVER_TYPE_IPLANET4</server-type>
            <supportchangelog>1</supportchangelog>
        </ui-data>
```

-continued

```
        <anchor-attributes>
            <anchor-attribute>
                <name>cn</name>
                <object-type>person</object-type>
            </anchor-attribute>
        </anchor-attributes>
    </ipma-configuration>
</private-configuration>
```

The following provides an example of private configuration for EXCHANGE 5.5. GAL:

```
<private-configuration>
    <exma-configuration>
        <default-server>default server name for OU, schema,
            and server discovery</default-server>
        <default-login-domain>domain</default-login-domain>
        <default-login-user>user</default-login-user>
    </exma-configuration>
</private-configuration>
```

The following provides an example of private configuration for eDirectory:

```
<private-configuration>
    <edma-configuration>
        <default-server>mms-edirectory3</default-server>
        <default-login-user>cn=admin, o=mmstest</default-login-user>
        <default-ssl-bind>0</default-ssl-bind>
        <default-port>389</default-port>
    </edma-configuration>
</private-configuration>
```

The following examples apply to so-called other types. To begin with, the following provides an example of SQLOLEDB private configuration:

```
<private-configuration>
    <oledbma-configuration>
        <connection-info>
            <authentication>integrated</authentication>
            <provider>SQLOLEDB</provider>
            <server>....</server>
            <databasename>....</databasename>
            <tablename>....</tablename>
            <delta-tablename>....</delta-tablename>
        </connection-info>
        <mms-info>
            <column-info>
                <column>
                    <name>id</name>
                    <data-type>DBTYPE_STR</data-type>
                    <length>11</length>
                    <isnullable>0</isnullable>
                    <isreadonly>0</isreadonly>
                    <mms-type>String</mms-type>
                </column>
                <column>
                    <name>manager</name>
                    <data-type>DBTYPE_STR</data-type>
                    <length>40</length>
                    <isnullable>0</isnullable>
                    <isreadonly>0</isreadonly>
                    <mms-type dn='1'>String</mms-type>
                </column>
                ...
            </column-info>
```

```
            <delta-info>
                <extra-columns> ... </extra-columns>
                <change-column> ... </change-column>
                <add> ... </add>
                <update> ... </update>
                <delete> ... </delete>
            </delta-info>
            <anchor>
                <attribute>au_id</attribute>
            </anchor>
            <object-type>person</object-type>
        </mms-info>
    </oledbma-configuration>
</private-configuration>
```

In the above example, note that "delta-tablename" is only included when deltas are configured. When deltas are configured, the "delta-info" element should also be included. The "extra-columns" element is only used by the configuration logic UI; it indicates the columns not in the main table that can be displayed in the change column picker.

The following provides an example of ORACLE private configuration:

```
<private-configuration>
    <oledbma-configuration>
        <connection-info>
            <authentication>integrated</authentication>
            <provider>MSDAORA</provider>
            <datasource>....</datasource>
            <tablename>....</tablename>
            <delta-tablename>....</delta-tablename>
        </connection-info>
        <mms-info>
            <column-info>
                <column>
                    <name>id</name>
                    <data-type>DBTYPE_STR</data-type>
                    <length>11</length>
                    <isnullable>0</isnullable>
                    <isreadonly>0</isreadonly>
                    <mms-type>String</mms-type>
                </column>
                <column>
                    <name>manager</name>
                    <data-type>DBTYPE_STR</data-type>
                    <length>40</length>
                    <isnullable>0</isnullable>
                    <isreadonly>0</isreadonly>
                    <mms-type dn='1'>String</mms-type>
                </column>
                ...
            </column-info>
            <delta-info>
                <extra-columns> ... </extra-columns>
                <change-column> ... </change-column>
                <add> ... </add>
                <update> ... </update>
                <delete> ... </delete>
            </delta-info>
            <anchor>
                <attribute>au_id</attribute>
            </anchor>
            <object-type>person</object-type>
        </mms-info>
    </oledbma-configuration>
</private-configuration>
```

The configuration format for ORACLE is very similar to SQLOLEDB except for the connection information.

The following provides an example of NT private configuration:

```
<private-configuration>
    <ntma-configuration>
        <domain>ntma1</domain>
        <login-user>administrator</login-user>
        <login-domain>ntma1</login-domain>
    </ntma-configuration>
</private-configuration>
```

The following provides an example of NOTES private configuration:

```
<private-configuration>
    <lnma-configuration>
        <server>mms-domino4/Redmond</server>
        <userid>C:\mmsbvt\Notes4Admin.id</userid>
        <cookie>PL1/ABJtJQg=</cookie>
        <ou-list>
            <item>
                <nab>names.nsf</nab>
                <ou>0=Redmond</ou>
                <certifier-path>C:\mmsbvt\Notes4RCert.id</certifier-path>
            </item>
        </ou-list>
    </lnma-configuration>
</private-configuration>
```

Encrypted Attributed Configuration Information

The encrypted attribute configuration information servers two purposes: (1) It is used by the configuration logic UI to convey password information from the MA UI to the metadirectory system when creating or updating MA credential information; (2) It is used by the metadirectory system to pass the MA DLL credentials information at the start of each run.

The basic exemplary format of this information is:

```
<encrypted-attributes>
    <attribute name="foo" partition="bar">value</attribute>
    <attribute name="foo" partition="bar">value</attribute>
    ...
</encrypted-attributes>
```

The production system server implements the semantics when the UI submits a <encrypted-attributes> element. In connection therewith, each <attribute> element with a name/partition value combination which is different from what is currently stored for the MA and has a non-empty value is added to the list of attribute> elements stored for the MA. Further, if an <attribute> element matches an existing element by name and partition and the value is nonempty, then the existing element's value is replaced with the one submitted. Further, if an <attribute> element matches an existing element by name and partition but its value is empty, then the existing element is removed from the list of encrypted attributes stored for the MA.

The meanings of the "name" and "partition" attributes are MA-specific, and indeed, the partition attribute is not even required. Generally, "name" represents the name of the attribute that needs to be encrypted and the partition is the name of the partition that this attribute is associated with.

For AD LDAP types, one <attribute> element with name="password" and no partition attribute is stored to record the credentials information for the forest.

For AD/AM LDAP types, one <attribute> element with name="password" and no partition attribute is stored to record the credentials information for the production system server.

For SQLOLEDB and ORACLE (other types), when using SQL or ORACLE security mode, there will be one <attribute> element with name="password" and no partition attribute. This represents the database password of the account sent to the production system server.

Partition Configuration Information

The following section describes the "partitions" of the MA. MA's consist of one or more partitions, each partition having a specified container/object type filter criteria associated with it. By definition, the filter criteria of different partitions are required to be disjoint.

The overall exemplary format for this element is:

```
<ma-partition-data>
    <partition>...</partition>
    <partition>...</partition>
    ...
</ma-partition-data>
```

The format for storing the configuration of a partition mimics the storage of the configuration of an MA on a whole in some ways:

```
<partition>
    Naming information
    Versioning information
    Partition details
</partition>
```

The above-identified partition naming information refers to a grouping of sub-elements that describes the highest level information regarding the partition. All sub-elements in this grouping should be specified when the partition is created through DCOM. The following shows how the naming information appears according to one implementation:

```
<id>{3F5AA741-626E-483F-BB2D-EE0F5E73CE02}</id>
<name>DC=africa,DC=mms-sh1-corp,DC=nttest,
DC=microsoft,DC=com</name>
```

In this excerpt, the id refers to a GUID that uniquely defines the partition in the system. It should be given to the production system server on all calls involving creation or modification of an MA partition. Once a partition is created, this id does not change. The following additional considerations apply to this topic: (1) When an MA is exported via the "Export To File" or "Save Server Configuration" processes, the id for each partition is saved to the file. (2) When a new MA is created using the "Create" process from the configuration logic UI, the metadirectory system administrative client generates a new GUI) and includes it when it sends the XML to the metadirectory system through a DCOM call. (3) When a new MA is created using the "Import Management Agent" process from the configuration logic UI, the metadirectory system administrative client generates new GUID's for each of the partitions and uses these instead of the GUID's in the export file when it sends the XML to the metadirectory system. The reason for this is to enable the exported MA configurations to be used as MA templates. (4) When a new MA is created as part of the "Update MA from File" or the "Import Server Configuration" processes, the GUID in the export file is passed to the metadirectory system. This allows the server to match up the partitions in the file with those in the MA on the target production system.

The name element refers to a non-empty string that the configuration logic UI displays for the partition. In one exemplary implementation, the length limit can be 400 characters and characters '<', '>', '&', '\', '\"', and "]" are disallowed in the name. The configuration logic UI chooses the name according to the following rules:

The following rules apply to LDAP types. For AD or AD/AM, a partition corresponds to a DNC or NDNC. The name is the DN of the DNC or NDNC in AD. For IPLANET, a partition corresponds to an iPlanet server partition. The name is the DN of the partition on the server. For EXCHANGE 5.5, a partition corresponds to an Exchange "site." The name is the X.500 DN of the OU. For EXCHANGE 5.5. GAL, this MA has exactly one partition named "default." For eDirectory, this MA has exactly one partition named "default."

As to all File types, most users will have only one partition which is named "default," but users can create additional partitions for different object types.

For all other types, these MA's each have exactly one partition named "default."

The partition version information refers to a grouping of sub-elements that provides versioning information about the partition configuration. All sub-elements in this grouping are read-only and are returned by the server for informational purposes. The following provides an example of the structure of such information:

```
<creation-time>2002-07-23 17:12:23.699</creation-time>
  <last-modification-time>2002-07-23 19:21:17.699</last-modification-time>
    <version>5</version>
```

The creation-time element refers to the time (in GMT) when the partition was created on the metadirectory system. The last-modification-time element refers to the time (in GMT) when the partition configuration was last modified on the metadirectory system. The version element indicates the version of the partition configuration. Higher numbers indicate later versions of the configuration. When a partition is updated, the old version number the edit is based on is passed in. If this number is less than the current version stored in the metadirectory system database 116, the modification will fail.

The partition details information refers to a grouping of elements that specifies the actual configuration of the partition. An exemplary structure for this element is as follows:

```
<selected>0</selected>
    <filter>
        <object-classes>
            <object-class>contact</object-class>
            <object-class>container</object-class>
            <object-class>group</object-class>
            <object-class>user</object-class>
        </object-classes>
        <containers>
        <exclusions/>
            <inclusions>
            <inclusion>DC=africa,DC=mms-sh1-
                corp,DC=nttest,DC=microsoft,DC=com</inclusion>
```

-continued

```
            </inclusions>
        </containers>
    </filter>
    <custom-data>
        ...
    </custom-data>
```

In the above structure, the selected element provides a bit value (1 or 0) indicating whether the partition has been selected by the user in the configuration logic UI for configuration. The following breakdown indicates MA specific information about this bit:

For AD, AD/AM, IPLANET, and Exchange 5.5 LDAP types, this bit corresponds to whether the partition has been "checked" in the configuration logic UI.

For EXCHANGE 5.5. GAL LDAP types, the single partition is marked selected.

For all file types, all partitions are marked as selected.

For all other types, the single partition is marked selected.

As can seen from the above breakdown, this bit is really only of interest in the case of LDAP MA's such as AD, iPlanet, and Exchange 5.5, which have multiple partitions which the user can either configure or leave unconfigured. Runs against unconfigured (that is, unselected) partitions are expected to fail, and the configuration logic UI should not allow configuration of the partition (or creating run profiles) with unselected partitions.

The filter element is used by the MA to determine which objects to import into the CS. The metadirectory system architecture allows MA's to filter on both object types and containers (DN). Consequently, there are two elements to this XML format: "object-classes" and "containers."

In the "object-classes" section, a user can specify what object type to participate in the synchronization process (inclusion). In the "containers" section, the user can specify which container to include as well as which to exclude (both inclusion and exclusion). During filtering, for each DN, the inclusion/exclusion list is searched to find the longest ancestor. If the longest ancestor is included, the DN is included, if the longest ancestor is excluded, the DN is excluded.

The following breakdown provides the MA-specific semantics related to filtering for LDAP types (e.g., for AD, AD/AM, IPLANET, Exchange 5.5, EXCHANGE 5.5. GAL, and eDirectory). Regarding object type inclusion, these MA's support a single object type inclusion filter that applies to all partitions. Even though the object type filter is specified for each partition, a properly configured MA of this type will have the same object type configuration for each of its partitions. Regarding container filtering, container filtering is per partition. The users can use the container picker to select the desired containers to import from. The MA-specific UI generates inclusion/exclusion rules corresponding to the container picker selections. The MA adds in exclusion filter conditions to ensure there is no overlap between parent and child domains.

For all file types, there is no container filtering support. Partitions are defined exactly by what object types they contain.

The following considerations apply to so-called other types. For MSSQL and ORACLE, there is no filtering support. If users want a filtered view of the table they are expected to define a view and configure their MA to operate off that view. For NT 4.0, there is no container filtering support, but users can filter on object classes. For NOTES, there is no container filtering support, but users can filter on object classes.

The custom-data element refers to an MA-specific XML format to record additional information about the partition.

The following excerpt shows custom data for an AD partition:

```
<custom-data>
    <adma-partition-data>
        <dn>DC=africa,DC=mms-sh1-corp,DC=nttest,
        DC=microsoft,DC=com</dn>
        <name>africa.mms-sh1-corp.nttest.microsoft.com</name>
        <guid>{BA84A62C-504E-44B9-9FFE-CF52028B4A36}</guid>
        <is-domain>1</is-domain>
        <sign-and-seal>1</sign-and-seal>
        <preferred-dcs>
            <preferred-dc>...</preferred-dc>
            <preferred-dc>...</preferred-dc>
            ...
        </preferred-dcs>
        <dc-failover>1</dc-failover>
    </adma-partition-data>
</custom-data>
```

In this example, "dn" refers to the DN of AD naming context, "name" refers to the NetBIOS name of the naming context, "GUID" refers to the AD's GUID (unchanging id) for the naming context, "is-domain" indicates whether it is a DNC or NDNC, "sign-and-seal" indicates whether the user has checked the sign-and-seal option in the UI, "preferred-dcs" is the list of preferred DC's to use when connecting to this naming context in priority order, "dc-failover" indicates whether the user wants the MA to failover to DC's not specified in the preferred DC list, "last-dc" is the last DC used for a run on this partition (which is only present if MA has been run on this partition), "cookie" refers to the current watermark from DirSync from last import run (which is only present if MA has been run on this partition), "login-domain" refers to a domain that, if the customer has configured specific credentials for this partition, then this gives the domain, "login-user" refers to an account that, if the customer has configured specific credentials for this partition, then this gives the account.

The following provides an example of the custom data for an IPLANET partition:

```
<custom-data>
    <ipma-partition-data>
        <dn>o=bvts</dn>
        <port>389</port>
        <ssl-bind>0</ssl-bind>
        <last-change-number>10315</last-change-number>
    </ipma-partition-data>
</custom-data>
```

The following example provides custom data for EXCHANGE 5.5. GAL:

```
<custom-data>
    <exma-partition-data>
        <dn>partition DN</dn>
        <last-server>server</last-server>
        <preferred-servers>
            <server>preferred server</server>
            ...
        </preferred-servers>
        <available-servers>
            <server>available server</server>
            ...
        </available-servers>
        <server-failover>1 or 0</server-failover>
        <use-ssl>1 or 0</use-ssl>
        <highest-usn>primary watermark value</highest-usn>
        <highest-timestamp>secondary watermark value</highest-timestamp>
    </exma-partition-data>
</custom-data>
```

The following example provides custom data for AD/AM:

```
<custom-data>
    <adma-partition-data>
        <dn>CN=ADAM-BVTs</dn>
        <name>CN=ADAM-BVTs<name>
        <guid>{F08F99E2-B823-4AB5-9725-57F9949C251E}</guid>
        <sign-and-seal>1</sign-and-seal>
        <is-domain>1</is-domain>
        <dc-failover>1</dc-failover>
    </adma-partition-data>
</custom-data>
```

The allowed-operations element refers to a completely internal read-only element that is used by the production system server to convey information to the configuration logic UI regarding what MA runs should bring up warnings or be disallowed. It is never emitted into files that customers can view. It is a DWORD with values:

| | |
|---|---|
| BFALLOWED_DELTA_IMPORT | = BIT( 0 ), |
| BFALLOWED_DELTA_NO_MA_CONFIG_CHANGED | = BIT( 1 ), |
| BFALLOWED_DELTA_NO_MV_CONFIG_CHANGED | = BIT( 2 ), |
| BFALLOWED_DELTA_NO_MV_DLL_CHANGED | = BIT( 3 ), |
| BFALLOWED_DELTA_NO_MA_DLL_CHANGED | = BIT( 4 ), |
| BFALLOWED_SUPPRESS_WARNINGS | = BIT( 29 ), |
| BFALLOWED_NO_OPERATION_RUN | = BIT( 30 ), |

Run Profile Configuration Information

The run profile configuration information describes the "run profiles" defined for the MA. The overall format for this element is:

```
<ma-run-data>
    <run-configuration>...</run-configuration>
    <run-configuration>...</run-configuration>
    ...
</ma-run-data>
```

An exemplary format for the <run-configuration> element can be found in the appendix of this disclosure.

C. Exemplary Techniques and Systems for Configuring a Metadirectory System

Having described an exemplary implementation of a multidirectory system in Section B, the following section presents details regarding a process for configuring such a system. The specific information imparted herein is exemplary. Other processes can be developed based on the principles described herein for other kinds of directory management systems that differ from the process described below in various respects.

C.1. Overview of Export/Import Processes

Figure 8:
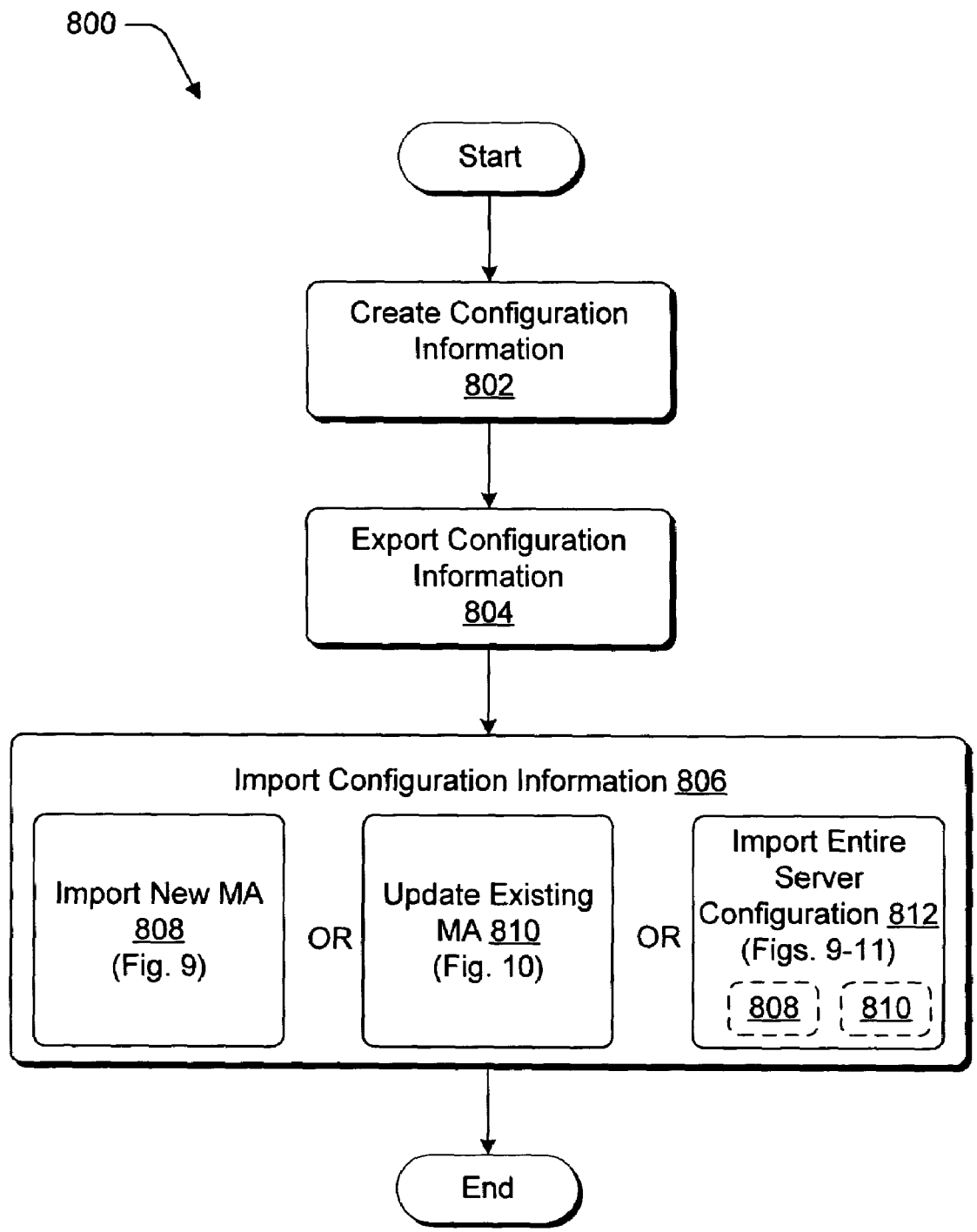
FIG. 8 shows an overview of a method for configuring the metadirectory system.

To begin with, FIG. 8 shows a general method 800 for moving configuration files from the lab production environment 102 to the production environment 104. Reference is made to the individual steps in FIG. 8 in tandem with the features described in FIG. 1.

In step 802, a user (such as user 132 or 140) creates configuration information 136 that may comprise one or more configuration files. More specifically, this act of creation may constitute the generation of an MA that prompts the generation of an entirely new MA file. Alternatively, this act of creation may constitute the modification of an existing MA file that prompts the modification of an existing MA. Still alternatively, this act of creation may constitute the creation of an entire suite of MA files and an associated MV file for configuring the entire production system 106 (or multiple parts thereof).

Whatever the case, in step 804, the user exports the configuration information 136 to the storage location 138. For instance, the user can use file management UI functionality to identify a location in a directory that stores the configuration information 136. As stated, this storage 138 location can be physically associated with the lab environment 104, the production environment 102, or some other location.

In step 806, a user associated with the production environment 102 imports the configuration information 136 stored at the storage location 138 into the production system 106. The production system 106 thus assumes the role of a "target" system by receiving the configuration information, and is alternatively referred to in this section as the target production system 106. Step 806 involves different processes depending on the nature of the configuration task specified in the configuration information 136. In a first case (808), the configuration logic 142 employs the process shown in FIG. 10 to import a new MA. In a second case (810), the configuration logic 142 employs the process shown in FIG. 11 to update an existing MA. That is, in this case (810), the production system 106 already stores an MA associated with the MA identified in the configuration information 136. The goal in this case is to modify or amend the existing MA in accordance with the information contained in the configuration information 136 (based on a comparison of the configuration of the existing MA and the configuration information 136). In this context, the existing MA in the production system 106 assumes the role of a "target" MA. Finally, in a third case (812), the configuration logic 142 employs the process shown in FIG. 12 to import configuration files that define the configuration of the entire production system 106. Such a configuration task can involve adding one or more new MA's, as well as updating one or more existing MA's, and therefore, this process draws from the first and second processes (808, 810) discussed above. This is illustrated in FIG. 8 by showing flow boxes labeled 808 and 810 within flow box 812.

The following sections describe the export and import processes in greater detail.

C.2. Export Processes

Exporting an MA

A user (e.g., user 132 or 140) can use the user interface functionality, a command line utility, or some other functionality to save a created MA file to the storage location 138. In one implementation, the import process does not involve the transfer of any extension files referenced in the created MA file, such as DLLs. The user should therefore make special provisions to transfer these files. In other implementations, the export process can incorporate functionality for automatically transferring such extension files.

In one exemplary implementation, the lab system 108 produces an output MA file having the following form:

```
<export-ma server='name of server' export-date='date'>
<!--WARNING>
!!!!!!!!!!!!!!!!!!!!!!!!!!!!!!!!!!!!!!!!!!!!!!!!!!!!!!!!!!!!!
!!
!! The contents of this file should not be edited.
!! Any such modifications to this file may result in errors during
!! import.
!!
!!!!!!!!!!!!!!!!!!!!!!!!!!!!!!!!!!!!!!!!!!!!!!!!!!!!!!!!!!!!!
</WARNING -->
  <ma-data>
    . . .
  </ma-data>
  <mv-data>
    <import-attribute-flow>
    . . .
    </import-attribute-flow>
  </mv-data>
</export-ma>
```

The <ma-data> element and the <import-attribute-flow> element have formats described in the previous section. In one implementation, the configuration logic 142 generates the outer elements of the file format described above. Other aspects of the production system 106 generate the inner elements of the file format, namely, the <ma-data> and <mv-data> and elements.

Exporting a System Configuration

The user can also create and export information that specifies the configuration of the entire production system 106, which may have multiple MA's associated therewith. As in the case of a single MA file, the user can use the user interface functionality, a command line utility, or some other functionality to export the server configuration information 136 to the storage location 138. In one implementation, the user should independently transfer any extension files or functionality associated with the server configuration information 136.

The server configuration information 136 can include a suite of server configuration files, including a file called "MV.XML." The MV.XML file specifies the server-wide metaverse configuration of the production system 106. The following excerpt provides an exemplary high-level listing of an MV.XML file:

```
<saved-mv-configuration server='MAXBDESK2' export-date=
    '2002-07-30 15:00:39.000'>
<!--WARNING>
!!!!!!!!!!!!!!!!!!!!!!!!!!!!!!!!!!!!!!!!!!!!!!!!!!!!!!!!!!!!!
!!
!! The contents of this file should not be edited.
!! Any such modifications to this file may result in errors during
!! import.
!!
!!!!!!!!!!!!!!!!!!!!!!!!!!!!!!!!!!!!!!!!!!!!!!!!!!!!!!!!!!!!!
</WARNING-->
<mv-data>
  <format-version>1</format-version>
  <version>2</version>
  <schema>
    . . .
  </schema>
  <import-attribute-flow>
    . . .
```

-continued

```
    </import-attribute-flow>
  </mv-data>
</saved-mv-configurations>
```

Again, Section B above describes the exemplary composition of the elements within the body the MV.XML file.

In addition to the MV.XML file, the server configuration information 136 can include multiple MA files. These files are respectively associated with each of the MA's in the production environment 102. These files are identified as MA.XML files. The export process generates the name of these files based on the id's of the respective MA's. The following excerpt identifies an exemplary format for an MA.XML file generated upon the export of the server configuration information 136.

```
<saved-ma-configuration server='name of server' export-date='date'>
<!--WARNING>
!!!!!!!!!!!!!!!!!!!!!!!!!!!!!!!!!!!!!!!!!!!!!!!!!!!!!!!!!!!!!!!!!!!!!!!!
!!
!! The contents of this file should not be edited.
!! Any such modifications to this file may result in errors during
!! import.
!!
!!!!!!!!!!!!!!!!!!!!!!!!!!!!!!!!!!!!!!!!!!!!!!!!!!!!!!!!!!!!!!!!!!!!!!!!
</WARNING-->
    <ma-data>
       ...
    </ma-data>
</ saved-ma-configuration >
```

Earlier sections describe the exemplary format of the <ma-data> element. Note that, unlike the format used for exporting a single MA file, the above-listed format omits an "import-attribute-flow" element.

In one implementation, the configuration logic 142 generates the outer elements of the file format described above. Other aspects of the production system 106 generate the inner elements of the file format, namely, the <ma-data> and <mv-data> elements.

C.3. Import Processes

Importing an MA

Figure 9:
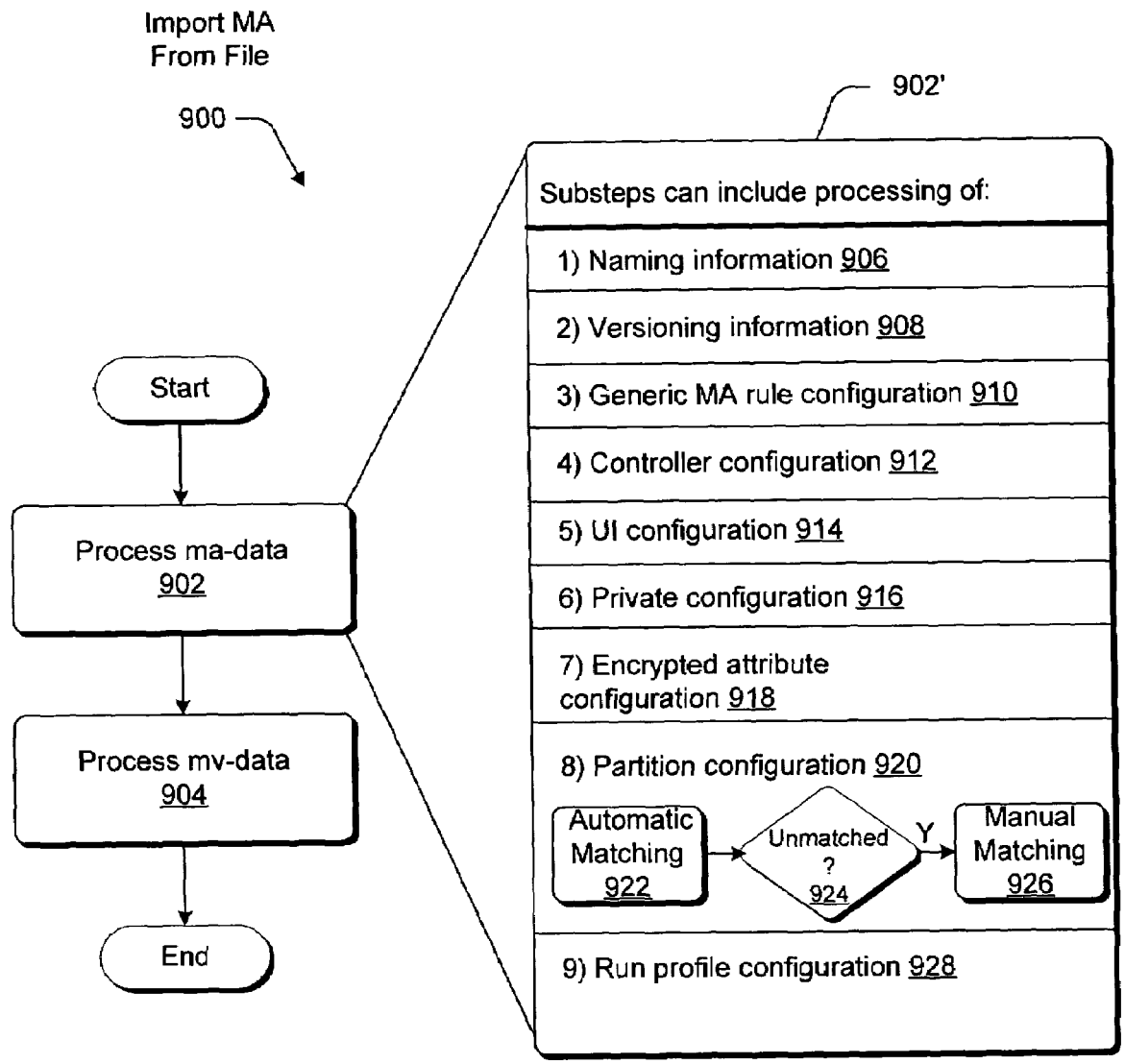
FIG. 9 shows a process for configuring the metadirectory system by importing a new management agent.

FIG. 9 describes a process 900 for creating a new MA using a file produced by exporting an MA from the lab environment 104 (and, if appropriate, from any saved DLL extensions associated with the file). The process 900 generally includes step 902 of processing ma-data in the configuration file and step 904 of processing mv-data in the configuration file.

The step 902 of processing ma-data includes multiple sub-processes to handle individual parts of the ma-data. That is, as previously described, the ma-data includes at least the following parts: naming information; versioning information; generic MA rule configuration information; controller configuration information; password sync configuration information; UI configuration information; private configuration information; encrypted attribute configuration information; partition configuration information; and run profile configuration information. Step 902 is expanded in the right side of FIG. 9 to yield box 902' that shows processing associated with each of these parts. Each of these parts is described below in turn.

Substep 906 involves processing naming information provided by the ma-data. As explained in Section B, the naming information includes elements <id>, <name>, and <category>. As to the <id> element, the configuration logic 142 generates a new GUID at the time of import (thus ignoring the GUID in the configuration file). By ignoring the GUID in the configuration file, the configuration logic 142 provides "create from template" functionality. As to the <name> element, the configuration logic 142 uses the name provided in the file as the name of the MA. If an MA with this name exists in the production system 106, then the configuration logic 142 will prompt the user to enter a new name. As to the <category> element, the configuration logic 142 accepts the category identified in the configuration file as the type of MA to be created.

Substep 908 involves processing versioning information provided in the ma-data. As explained in Section B, the versioning information includes elements <creation-time>, <last-modification-time>, and <version>. As to the <creation-time> element, the configuration logic 142 ignores the time specified in the configuration file. The configuration logic 142 sets this time to the time when the new MA is created. As to the <last-modification-time>, the configuration logic 142 likewise ignores the time specified in the configuration file. The configuration logic 142 initially sets this time to be the time when the new MA is created. As to the <version> element, the configuration logic 142 ignores the version specified in the file. The configuration logic 142 sets the version of the new MA to 1.

Substep 910 involves processing generic configuration information provided in the ma-data. As explained in Section B, the generic configuration information includes a schema> element. The configuration logic 142 determines an "authoritative schema," that is, a schema that is saved with the MA, according to the following considerations. (1) For call-based MA's other than MSSQL and ORACLE MA's, the configuration logic 142 will call the MA's GetSchema method to get an authoritative schema. (2) For File MA's, the configuration logic 142 takes the schema found in the file as authoritative. (3) For MSSQL and ORACLE MA's, the configuration logic 142 calls the MA to get the schema in the CD and compares it with the schema in the file. In this case, the configuration logic 142 builds the schema from the CD, but if the same column appears in both the CD schema and the file schema, then the configuration logic 142 applies the following logic: (a) if that column is declared to be a "reference" in the file and has a type that permits it to be a reference attribute, then the configuration logic 142 makes it a reference; and (b) if that column is part of the primary key in the file, it will be part of the primary key in the final schema (and marked immutable). The configuration logic 142 defines other rule elements according to the contents of the configuration file. The configuration logic 142 will perform property page validation of these settings against the contents of the authoritative schema and allow the user to correct any mismatches.

Substep 912 involves processing controller configuration information provided in the ma-data. The configuration logic 142 uses the controller configuration specified in the file. If the file contains an impersonation element, the configuration logic 142 will bring up the property pages to prompt the user to enter a password. If the file does not include an impersonation element, the configuration logic 142 will assume that application protection is "low" and that there is no impersonation.

Substep 914 involves processing UI configuration information provided in the configuration file. For this piece of information, the configuration logic 142 uses the <description> and <ma-ui-settings> present in the file.

Substep 916 involves processing private configuration information provided in the configuration file. Generally the configuration logic 142 uses the private configuration information specified in the configuration file. For IPLANET and the FILE MA types, which allow per object anchor configuration, the configuration logic 142 will be run through a property page validation routine. This routine ensures that the attributes in the anchor are defined in the schema and that they are declared as immutable.

Substep 918 involves processing encrypted attribute configuration information. In one implementation, this information is omitted from the configuration file.

Substep 920 involves processing of partition configuration information in the configuration file. Generally, the configuration logic 142 handles partition information in an MA-specific manner. For LDAP MA's, the following considerations apply to the processing of the configuration file. (1) The configuration logic 142 discovers the actual partitions present in the CD. These partitions will form the list of actual partitions in the final configuration. The configuration logic 142 initially marks all of these CD partitions as UNSELECTED. (2) First, in the case of an AD, the configuration logic 142 tries to definitively match each SELECTED partition contained in the configuration file with a single CD partition. In the case of AD, the configuration logic 142 performs this task using the AD GUID of the partition. If this match occurs, the configuration logic 142 copies the information from the file partition to the CD partition: (a) selected (set to 1); (b) filter; and (c) custom-data (for AD, the configuration logic 142 copies sign-and-seal, preferred-dcs, dc-failover, login-domain, and login-user). (3) If the CD still has partitions that have not been matched up, the configuration logic 142 brings up a dialog interface that allows users to manually match up unmatched SELECTED partitions in the configuration file with unmatched CD partitions. In this matching process, the configuration logic 142 will pre-match by partition name (if provided) to assist the user. The user can undo these approximate matches or accept them and match other pairs as well. (FIG. 9 illustrates this procedure by showing a step 922 of automatic matching, a step 924 of assessing whether there are any unmatched partitions, and a step 926 of manually matching any assessed unmatched partitions.) (4) For the matches that the user finally decides on, MA-specific configuration logic 142 will propagate partition details from the configuration file partition to the CD partition. These details can include: selected (set to 1); filter (where it is assumed that the container structure is the same on the test forest as the production forest; since the domain DN's may differ, the configuration logic 142 will manage the inclusion/exclusion lists appropriately); custom-data (for AD, if there is exact domain-to-domain match-up, the configuration logic 142 copies sign-and-seal, preferred-dcs, dc-failover, login-domain, and login-user; for iPlanet, the configuration logic 122 copies ssl-bind, providing similar behavior for Exchange). (5) The user need not match all the partitions in the file. If the user cancels a matching session, the configuration logic 142 will ask the user whether the user wants to quit creating the MA or wants to go on ignoring the unmatched partitions in the file.

For File MA's, the configuration logic 142 copies all File MA partitions to the new MA and marks these as SELECTED.

For other MA's, the configuration logic 142 should have a single default partition in the file as well as in the new MA. The configuration logic 142 copies the filter element of the file to the CD partition.

In general, in all cases, the configuration logic 142 generates a new GUID for the id of the partition in the new MA. In one implementation, it never reuses the partition id's found in the configuration file.

Finally, substep 928 involves processing run profile configuration information provided in the ma-data. The following considerations apply to the execution of this substep. (1) The configuration logic 142 scans the run profiles in the configuration file which only refer to MATCHED, SELECTED file partitions. It copies those run profiles to the new MA configuration, making appropriate modifications based on information obtained from the matching CD partition. For instance, configuration logic 142 will change the partition name specified in the file to the partition name of the associated CD partition. (2) The configuration logic 142 does not copy run profiles from the file which refer to either UNMATCHED or UNSELECTED file partitions. (3) In one implementation, in all cases, the configuration logic 142 generates a new GUID for the id of a run profile propagated to the new MA. It does not reuse the run profile id's found in the file.

Having completed the processing of the ma-data, the process 900 advances to the processing of the mv-data in step 904. The following considerations apply to the processing performed in this step (904). (1) If any of the import attribute flow rules are incompatible with the MA or MV schema, the configuration logic 142 will bring up the import attribute flow property page so that the user can manually address the problem. (2) The configuration logic 142 appends the import attribute flow rules in the file to the import attribute flow configuration of the production system 106. If any of these rules flow into the same MV attribute as an existing import attribute flow rule for another MA, the configuration logic 142 assigns these lower precedence.

Updating an MA

Figure 10:
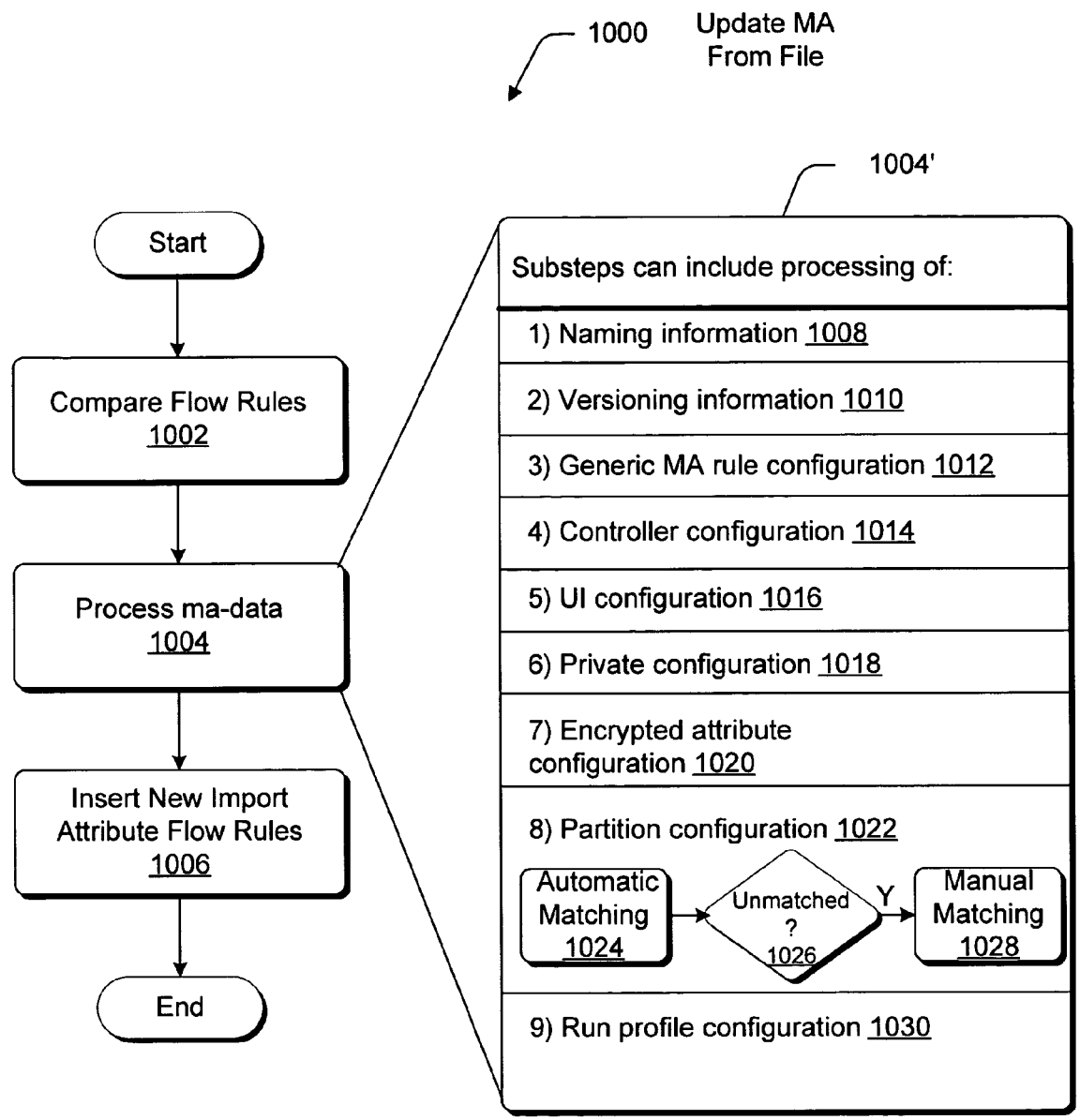
FIG. 10 shows a process for configuring the metadirectory system by updating an existing management agent already provided by the metadirectory system.
Figure 11:
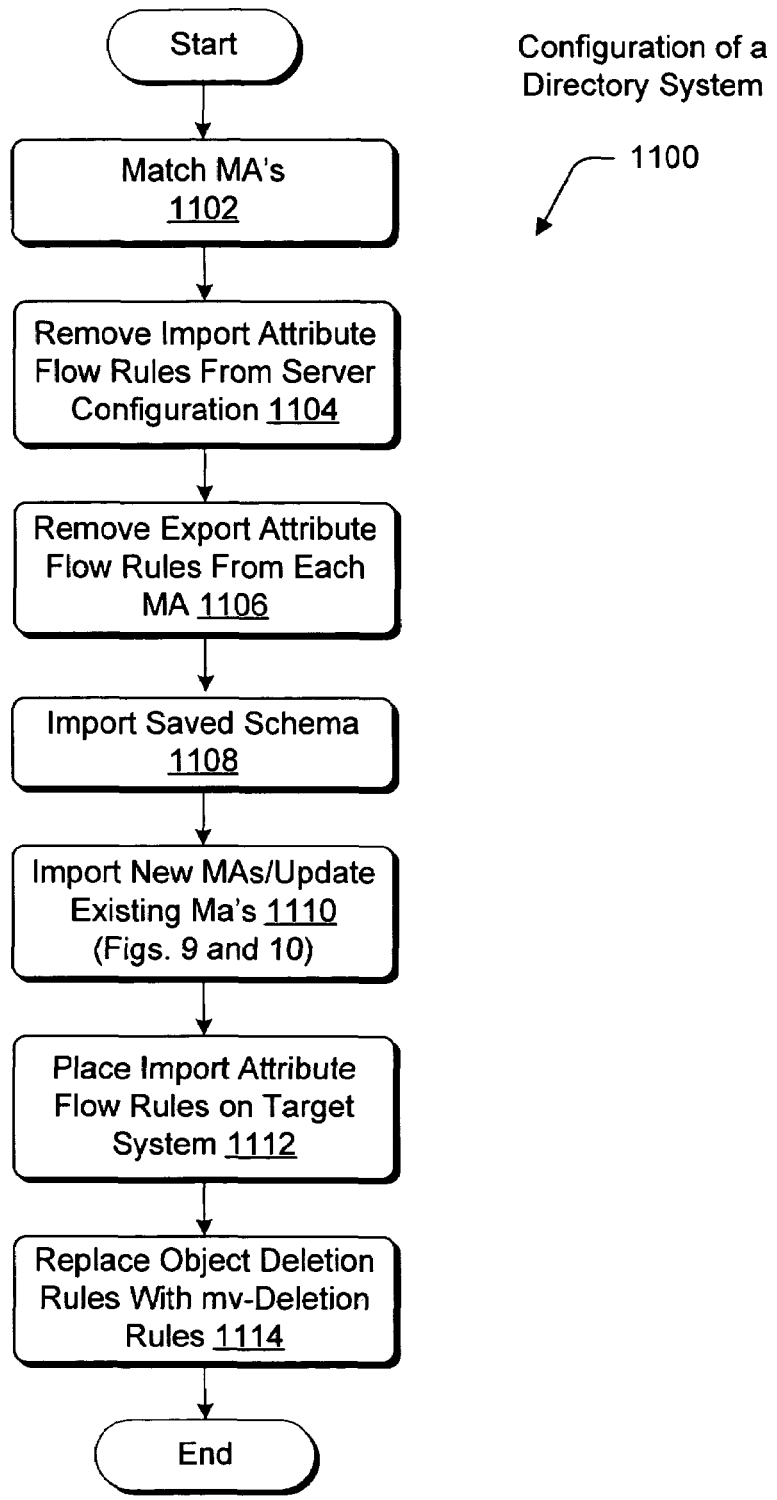
FIG. 11 shows a process for configuring the metadirectory system by making changes to plural management agents.

FIG. 10 describes a process 1000 for updating a new version of an MA design using a file produced by exporting an MA from the lab environment 104. This allows users to iteratively make changes in the lab environment 104 to a single MA, test these changes, and then transfer the changes to the MA on the target production system 106.

In one implementation, the user applies the process 1000 to a specific MA identified by the user. That is, in this implementation, the configuration logic 142 does not automatically perform a search to match information in the configuration file with an MA in the system 106 (although, in another implementation, matching can be performed). In using this process 1000, there is an expectation that the Mv schema elements referred to by the exported configured file agree with the MV schema of the target production system 106. Errors may be produced if this assumption does not hold true; for instance, the update of an MA may fail halfway through without restoring the original design of the MA. The user should in general perform a full new import/reevaluate rules run when the user updates a new version of the MA design, but the process need not require deletion of connector space to execute the process.

By way of overview, the process 1000 involves replacing the configuration of the existing MA with information provided in the configuration file. As shown in FIG. 10, the process 1000 includes the general steps of comparing flow rules 1002, processing ma-data 1004, and inserting new import attribute flow rules 1006. The following discussion clarifies the purpose of each of these steps.

In step 1002, the configuration logic 142 compares the import attribute flow rules specified in the file with those rules currently applied to the MA in the target production system 106. For the MA under consideration, the configuration logic 142 removes any flow rule present in the target production system 106 that differs from a counterpart rule in the configuration file (except for precedence). This process leaves a subset of rules specified in the configuration file (the "new"

rules) that do not match any rule in the target production system. The configuration logic 142 reserves these non-matching rules so that they can be added in a later stage in the process.

The step 1004 of processing ma-data includes multiple subprocesses to handle individual parts of the ma-data: naming information; versioning information; generic MA rule configuration information; controller configuration information; UI configuration information; private configuration information; encrypted attribute configuration information; partition configuration information; and run profile configuration information. As in the case of FIG. 9, in FIG. 10, step 1004 is expanded in the right side of FIG. 10 to yield box 1004' that shows processing associated with each of these parts. Each of these parts is described below in turn.

Substep 1008 involves processing naming information provided by the ma-data. As explained in Section B, the naming information includes elements <id>, <name>, and <category>. As to the <id> element, the configuration logic 142 ignores the id information provided in the configuration file. As to the <name> element, the configuration logic 142 determines whether the name identified in the configuration file differs from the name of the MA in the target production system 106. If so, the configuration logic 142 uses the name from the configuration file as the name of the MA. However, if another MA has the same name in the target production system 106, the configuration logic 142 will prompt the user to enter a new name for the MA under consideration. As to the <category> element, in one implementation, the configuration logic 142 requires that the category in the configuration file match the category of the selected MA; otherwise the update will fail.

Substep 1010 involves processing version information provided by the ma-data. As explained in Section B, the version information includes the elements of <creation-time>, <last-modification-time>, and <version>. As to the creation-time> element, the configuration logic 142 ignores the time specified in the configuration file. As to the <last-modification-time> element, the configuration logic 142 again ignores the time specified in the configuration file. The configuration logic 142 updates the modification time to a prevailing current time when the update completes. As to the <version> element, the configuration file ignores the version information specified in the file. The configuration logic 142 will update the version number when the update completes.

Substep 1012 involves processing MA rule configuration information provided in the ma-data. As to the <schema> element associated with the MA rule configuration information, the configuration logic 142 determines the "authoritative" schema (e.g., a schema that will be saved with the MA) based on the following considerations. (1) For call-based MA's other than database MA's, the configuration logic 142 regards the schema saved with the MA in the target production system 106 as authoritative. That is, in this case, the configuration logic 142 ignores the contents of the configuration file. (2) For File MA's, the configuration logic 142 takes the schema found in the file as authoritative. (3) For MSSQL and ORACLE MA's, the configuration logic 142 calls the MA to get the schema in the CD and compares it with the schema in the configuration file. In this case, the configuration logic 142 builds the schema from the CD, but if the same column appears in both the CD schema and the file schema, then the configuration logic 142 applies the following logic: (a) if that column is declared to be a "reference" in the configuration file and has a type that permits it to be a reference attribute, the configuration logic 142 will make it a reference; (b) if that column is part of the primary key in the configuration file, it will be part of the primary key in the final schema (and marked as immutable). The configuration logic 142 defines other rule elements from what appears in the configuration file and uses this information to replace counterpart information associated with the MA in the target production system 106. The configuration logic 142 will validate these settings against the contents of the authoritative schema and allow the user to correct any mismatches.

Substep 1014 involves processing controller configuration information. The configuration logic 142 uses the controller configuration information specified in the configuration file, overwriting the corresponding existing MA information stored in the target production system 106. If the configuration file omits the controller configuration information, the configuration logic 142 assumes that the application protection is "low" and there is no impersonation. The configuration logic 142 applies an MA-specific check to obtain this information. The database MA will check whether it is operating in Windows® operating system authentication mode. If so, it will compare the user/domain information in the configuration file with the stored information currently associated with the MA. If they differ, the configuration logic 142 can bring up a dialog to obtain the password from the user and call a DBMA support routine to validate the credentials.

Substep 1016 involves processing UI configuration information. The configuration logic 142 uses the <description> and <ma-ui-settings> from the configuration file, overwriting the corresponding MA information stored in the target production system 106. In another implementation, the <ma-ui-settings> element settings stored on the target production system 106 are regarded as authoritative.

Substep 1018 involves processing private configuration information. The configuration logic 142 generally uses the private configuration information specified in the configuration file. For IPLANET and the File MA types, which allow per object anchor configuration, the configuration logic 142 should validate that the attributes in the anchor are defined in the schema and that they are declared immutable. MA-specific callouts should check each pair of credentials (such as "user" for SQL, "security" on DBMA, or "domain/user" for AD forest or partition) to see if the credentials differ from that specified in the configuration file and the CD. If so, the configuration logic 142 can bring up password dialogs to prompt the user to enter a password and then call MA-specific validation routines to make sure the password they enter is correct.

Substep 1020 involves processing encrypted attribute configuration information. In one implementation, this information is omitted from the configuration file.

Substep 1024 involves the processing of partition configuration information in the configuration file. Generally, the configuration logic 142 handles partition information in an MA-specific manner. For LDAP MA's, the following considerations apply to the processing of the configuration file. (1) In the update case, the configuration logic 142 considers the list of saved partitions associated with the MA on the target production system 106 to be the authoritative list of CD partitions. (That is, the configuration logic 142 performs no discovery of the actual partitions present in the CD during update MA. If changes in partitions have occurred, the user should have previously performed the discovery.) The configuration logic 142 initially resets each of these partitions to UNSELECTED. Through automatic and manual means, the user attempts to match SELECTED partitions in the file with the CD partitions. When match-ups occur, the configuration logic 142 copies the following information from the file partition to the CD partition: (a) selected (set to 1); (b) filter (it is assumed that the container structure is the same on the test forest as the production forest; since the domain DN's may be different, the configuration logic 142 will manage the inclusion/exclusion lists appropriately); and (c) custom-data (for AD, the configuration logic 142 copies sign-and-seal, preferred-dcs, dc-failover, login-domain, and login-user; for iPlanet, the configuration logic 142 copies ssl-bind). (2) The configuration logic 142 does not necessarily require that all the SELECTED file partitions get matched to CD partitions and vice versa. The file configuration logic 142 drops file partitions that do not get matched to CD partitions. The configuration logic 142 marks CD partitions that do not get matched as UNSELECTED, but these partitions will nevertheless be saved with the MA.

For File MA's, configuration logic 142 regards the partitions in the file as authoritative. One reason not to simply remove all the partitions in the CD is to avoid deleting the CS objects in connector space. Once again, these partitions are generally processed by matching the partitions in the configuration file with those in the CD. In the event that a file partition is matched up with a CD partition, the configuration logic 142 copies over the filter criteria (note that if the filter changes then the configuration logic 142 should mark this partition as needing full import). The configuration logic 142 creates a new partition for any configuration file partition that does not match up. The configuration logic 142 deletes any CD partition that does not match up. This deletion operation may involve bringing up a progress dialog while all the CS objects under it are deleted.

Other MA's should have a single default partition in the configuration file as well as in the new MA. This should make matching easy. The filter information associated with the file partition should overwrite the MA filter information. If the filter actually changes, the configuration logic 142 should mark the partition as requiring full import.

A partly generic and partly MA-specific technique is used to perform matching between file partitions. The following considerations apply to the process. (1) First, the configuration logic 142 attempts to definitely match up partitions in the file with partitions in the CD by id. This represents an MA-independent matching, but it only works if a user first stores a server configuration on a first server, stores this configuration on another server, changes an MA, and then brings back an export of the modified MA to the first server. (For example, this situation applies when a user first transferred a server configuration from the lab system 108 to the production system 106 using the export and import operations. Then, the user modified one of the MA's on the lab system 108 and transferred this MA to the production system 106 using the export and import operations. In this case, the GUID's identifying the partitions would be the same on the lab system 108 as on the production system 106; as a result, it is possible to match the partitions by their GUID's without user intervention.) For all matches found, the configuration logic 142 copies information from the file partition to the CD partition. (2) In the case of an AD using the AD partition GUID, the configuration logic 142 performs an MA-specific match to definitely match each SELECTED partition contained in the file with a single CD partition. (3) If unmatched partitions remain in the CD, the configuration logic 142 brings up a dialog that allows users to manually match up unmatched SELECTED partitions in the configuration file with unmatched CD partitions. The configuration logic 142 will pre-match by partition name (if any) to assist the user. The user can undo these suggested matches or accept these suggestions and match other pairs as well. (FIG. 10 illustrates this procedure by showing a step 1024 of automatic matching, a step 1026 of assessing whether there are any unmatched partitions, and a step 1028 of manually matching any assessed unmatched partitions.) (4) The configuration logic 142 permits the user to not match all the partitions in the file. If the user cancels a matching session in progress, the user will be asked whether the user wants to quit creating the MA or wants to continue.

In one implementation, in all cases, when the configuration logic 142 creates a new partition in the MA, it generates a new GUID for the id of the partition in the new MA. It does not reuse the partition id's found in the configuration file.

Substep 1030 involves the processing of run profile configuration information. The following considerations apply to the processing of this information. (1) The configuration logic 142 scans the run profiles in the configuration file to identify the ones which refer to MATCHED, SELECTED file partitions. The configuration logic 142 automatically matches by id these run profiles in the configuration file with counterpart profiles that already exist in the MA. As a fall-back, the configuration logic 142 attempts to match by name. For each pair that match, the configuration logic 142 propagates the information from the file version to the existing MA. The configuration logic 142 creates new run profiles for any run profiles in the configuration file that do not match up. (2) The configuration logic 142 does not copy run profiles from the configuration file which refer to either UNMATCHED or UNSELECTED file partitions. (3) Note that the exemplary technique described above does not remove run profiles currently associated with the MA; the technique creates new run profiles or modifies existing run profiles.

After processing the ma-data, the configuration logic 142 advances to step 1006. In this step, configuration logic 142 inserts the "new" import attribute flow rules with lowest precedence into the system configuration. The MA update will fail at this point with the updates from steps 1002 and 1004 if any of the import attribute flow rules are incompatible with the MA or MV schema.

Importing a System Configuration

FIGS. 9 and 10 pertain to the importing or updating of individual MA's. In contrast, FIG. 11 pertains to a process 1100 for configuring the entire system 106. The system 106 may include multiple MA's associated therewith, collectively governed by a metaverse schema. Because configuring the entire system 106 will involve importing and/or updating individual MA's, the technique described in FIG. 11 draws upon the processes in FIGS. 9 and 10 as component parts thereof. In one implementation, interrupting the configuration of the system 106 midway through may result in an unreliable configuration state; in this case, the user should retry the process 1100 shown in FIG. 11.

In one exemplary implementation, the process 1100 includes seven principal steps. Step 1102 involves matching up the management agents in the configuration files with those stored on the target production system 106 using id (e.g., GUID). The process 1100 fails if the configuration logic 142 determines that the target production system includes any management agent that is missing from the configuration files. However, the configuration logic 142 permits the case where the configuration files specify additional management agents that are not included in the target production system 106.

In step 1104, the configuration logic 142 removes the import attribute flow rules from the server configuration.

In step 1106, the configuration logic 142 removes the export attribute flow rules from each MA in the target production system.

In step 1108, the configuration logic 142 imports the saved schema specified in the file MV.XML. This operation functions in a non-data-destructive manner like the standalone schema import feature provided by the configuration logic 142 (e.g., for an individual MA). The following considerations apply to the processing provided by step 1108. (1) Object types on the target production system 106 that do not appear in the configuration files are not removed. Object types that appear in the configuration file but do not appear on the target production system are added. (2) Attributes belonging to an object type that do not appear in the file are not removed. Attributes of an object type that appear in the configuration file but not on the target production system 106 are added. (3) If there are simple indexing changes (e.g., whether an indexable attribute is marked "indexed" or "unique-indexed"), the configuration file's specification of the indexing state is applied to the target production system 106. This step will fail if an attribute in the configuration file has any other schema differences (such as a different type, e.g., when one version is indexable while another is not).

In step 1110, the configuration logic 142 applies the following procedure for each MA file in the saved configuration. (1) The configuration logic 142 takes the id of the MA stored in the configuration file and looks for an MA on the system with the same id. (2) If no such MA is found, then the configuration logic 142 creates a new MA using the configuration specified in the configuration file. Processing of ma-data proceeds according to the procedure described above with respect to FIG. 9 ("Importing an MA From File"). However, in this case, the configuration logic 142 creates the MA in the target production system 106 using the id in the configuration file. Further, when the configuration logic 142 creates a partition or run profile that matches with an MA in the configuration file, it should reuse the corresponding id's that are found in the file. (3) On the other hand, if the configuration logic 142 finds a matching MA, then it processes the "ma-data" in the same manner described above with respect to FIG. 10 ("updating MA From File"). However, in this case, when the configuration logic 142 adds a new partition or run profile that matches with one in the configuration file, the configuration logic 142 should reuse the corresponding id's that are found in the configuration file.

In step 1112, the configuration logic 142 places the import attribute flow rules from the configuration file onto the target production system.

In step 1114, the configuration logic 142 replaces the object deletion rules (also as known as metaverse or mv deletion rules) on the target production system 106 with the mv-deletion rules in the configuration files.

In one exemplary implementation, the process 1100 does not handle DLL extensions. To fully complete the configuration, the user should copy relevant DLLs into an Extensions directory on the target production system.

C.4. UI Functionality

FIGS. 12-16 shows details regarding an exemplary series of user interface (UI) presentations provided by the administrative logic 512 to facilitate the execution of the procedures described above. These user interface presentations can be displayed on a computer monitor display in a conventional manner. A user can interact with the administrative logic 512 also in a conventional manner, e.g., by entering commands using a keyboard, mouse-type input mechanism, touch screen input mechanism, joy stick, or other input mechanism. This UI functionality provided by the administrative logic 512 can be provided on both the production (target) system 106 and the lab system 108, or on either one of these systems.

Figure 12:
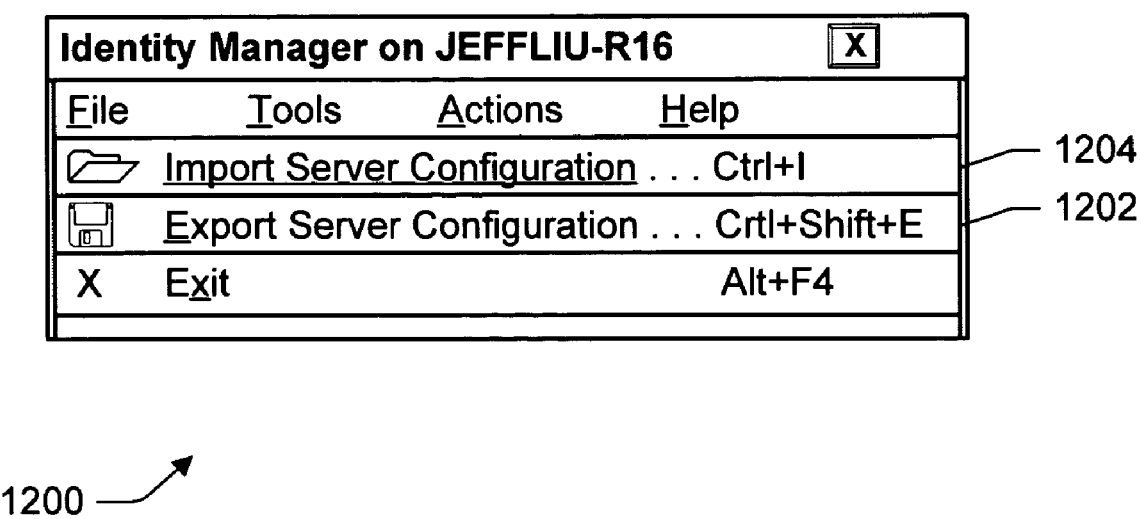
FIGS. 12-16 show different user interface (UI) presentations for allowing a user to interact with the metadirectory system for the purpose of configuring it.

The first UI presentation 1200 shown in FIG. 12 allows the user to enter commands that initiate various stages of the configuration procedure. Namely, a first command field 1202 prompts the configuration logic 142 to initiate the export procedure described above. In the export procedure, one or more files are transferred from the lab system 108 to the storage location 138 specified by the user. Accordingly, in one implementation, the UI presentation 1200 can be presented on a computer monitor (not shown) associated with the lab system 108, allowing a user who is interacting with that system 108 to transport one or more configuration files to the storage location 138. However, a user at a remote station, such as the production system 106, can also use the UI presentation 1200 to remotely command the transfer of configuration files from the lab system 108 to the storage location 138.

A second command field 1204 allows a user to transfer the files from the storage location 138 into the production system 106 where they are incorporated into the relevant databases of the production system 106. The user that initiates the import command can be the same user that initiated the export command, or a different user.

Figure 13:
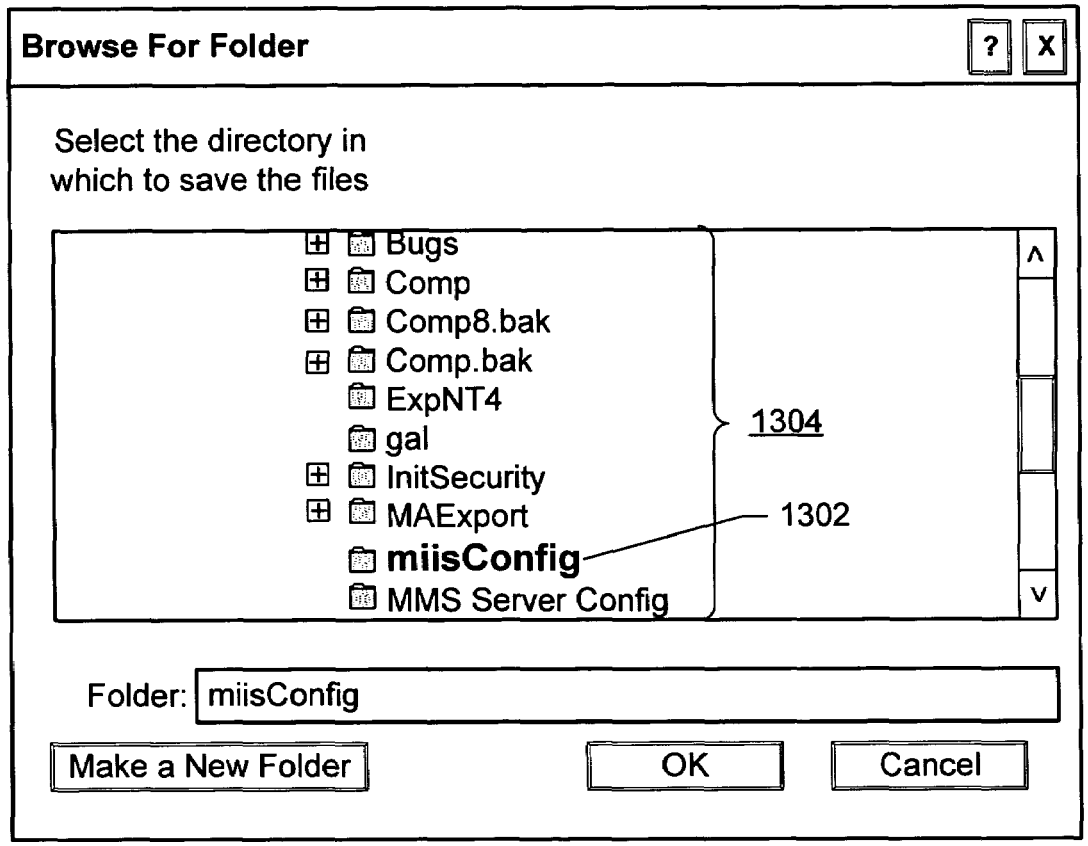

Another UI presentation 1300 shown in FIG. 13 allows the user to specify a directory location that can be used to implement the storage location 138. More specifically, the UI presentation 1300 can be used to initially specify the directory location where one or more configuration files are to be stored in the course of an export operation. Also, the UI presentation 1300 can be used to inform the import process of the directory location that already stores one or more configuration files provided by the export process. In the exemplary case shown in FIG. 13, a folder 1302 within a directory of folders 1304 is used to store the configuration files.

Figure 14:
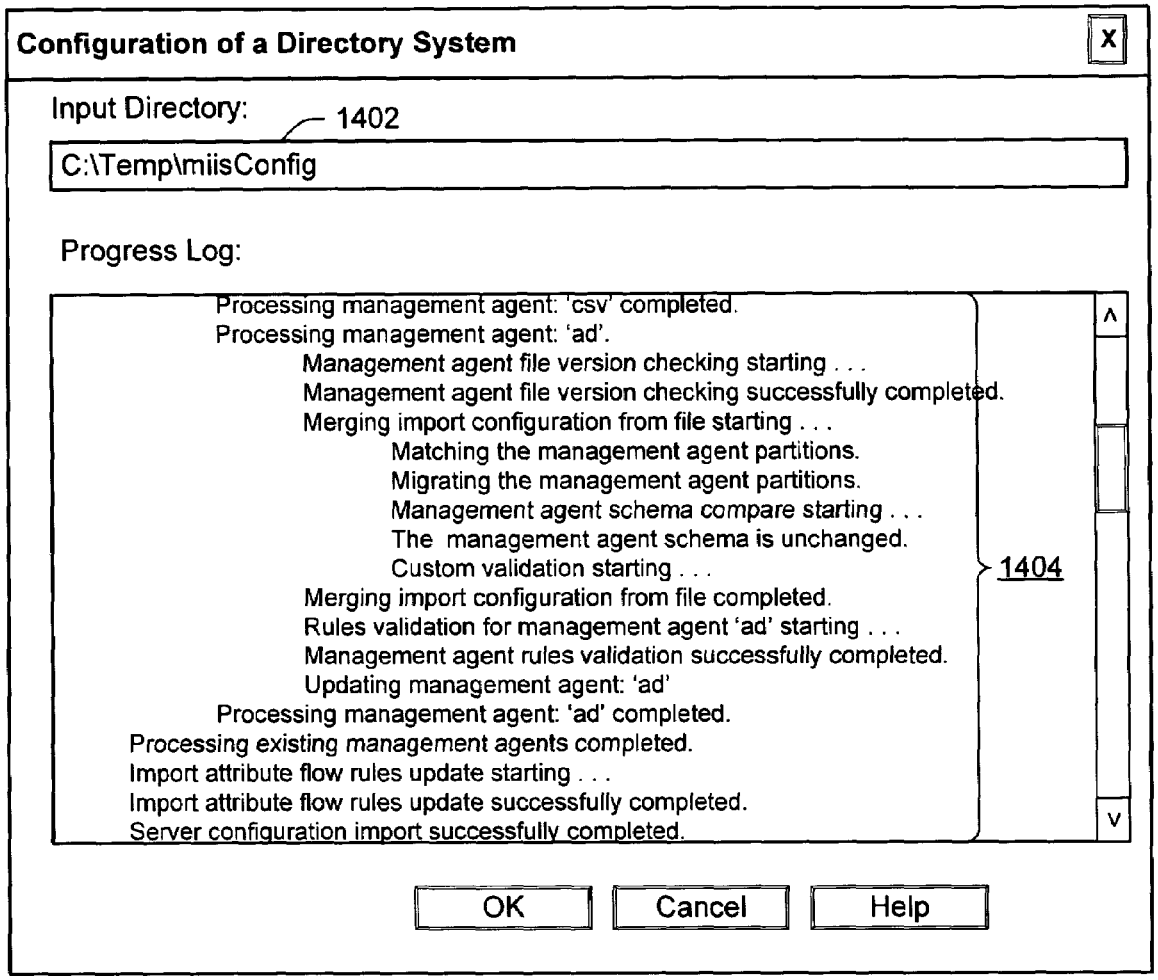

Once the import procedure is underway, another UI presentation 1400 shown in FIG. 14 can be used to monitor the progress of the configuration process. Namely, an input directory field 1402 identifies the location of the configuration files that are driving the configuration process. A progress field 1404 presents real time feedback regarding the progress of the configuration process. Namely, the configuration logic 142 forwards notifications regarding when it has commenced and finished different parts of the configuration process. The progress log receives these notifications and displays the names of the parts that have commenced or finished. The user can be kept apprised of the progress of the configuration of the production system 106 by monitoring the progress field 1404. In the event of an error that halts the configuration of the production system 106, the progress field 1404 provides information that can quickly pinpoint the part of the configuration task that may have caused the error.

Figure 15:
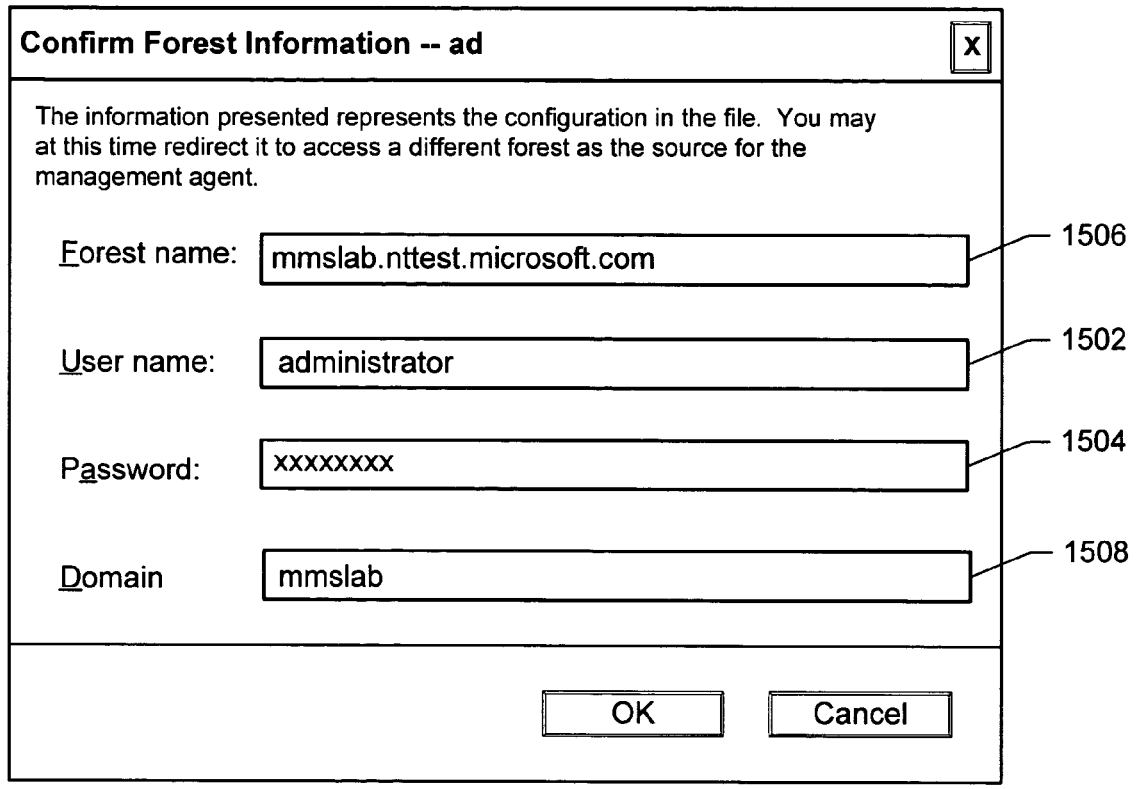

The UI presentation 1500 shown in FIG. 15 prompts the user to enter credential information. This UI presentation 1500 may come into play at different junctures in the configuration procedure. In one case, the configuration logic 142 may prompt the user to enter credential information to implement the creation of a specific new MA. More specifically, consider the case in which the user imports an MA (or the configuration logic 142 determines that a new MA needs to be created in the course of performing the import server configuration process). In this case, the configuration logic 142 will need to connect to the CD that the MA interacts with in order to determine the partitions that this CD employs. To perform this function, the configuration logic 142 requires the credentials used to connect to the associated CD. The UI presentation 1500 is used to obtain such credentials, which are subsequently used to access the CD. These credentials are also saved along with the configuration of the new MA. After configuration of the MA, these stored credentials can be used in importing and exporting data to and from the MA during the normal use of the metadirectory service.

The above-identified credential information can include a user name (provided in field 1502) and a password (provided in field 1504). A forest name (provided in field 1506) and a domain name (provided in field 1508) provide other identifying information used in granting a user permission to a CD.

Figure 16:
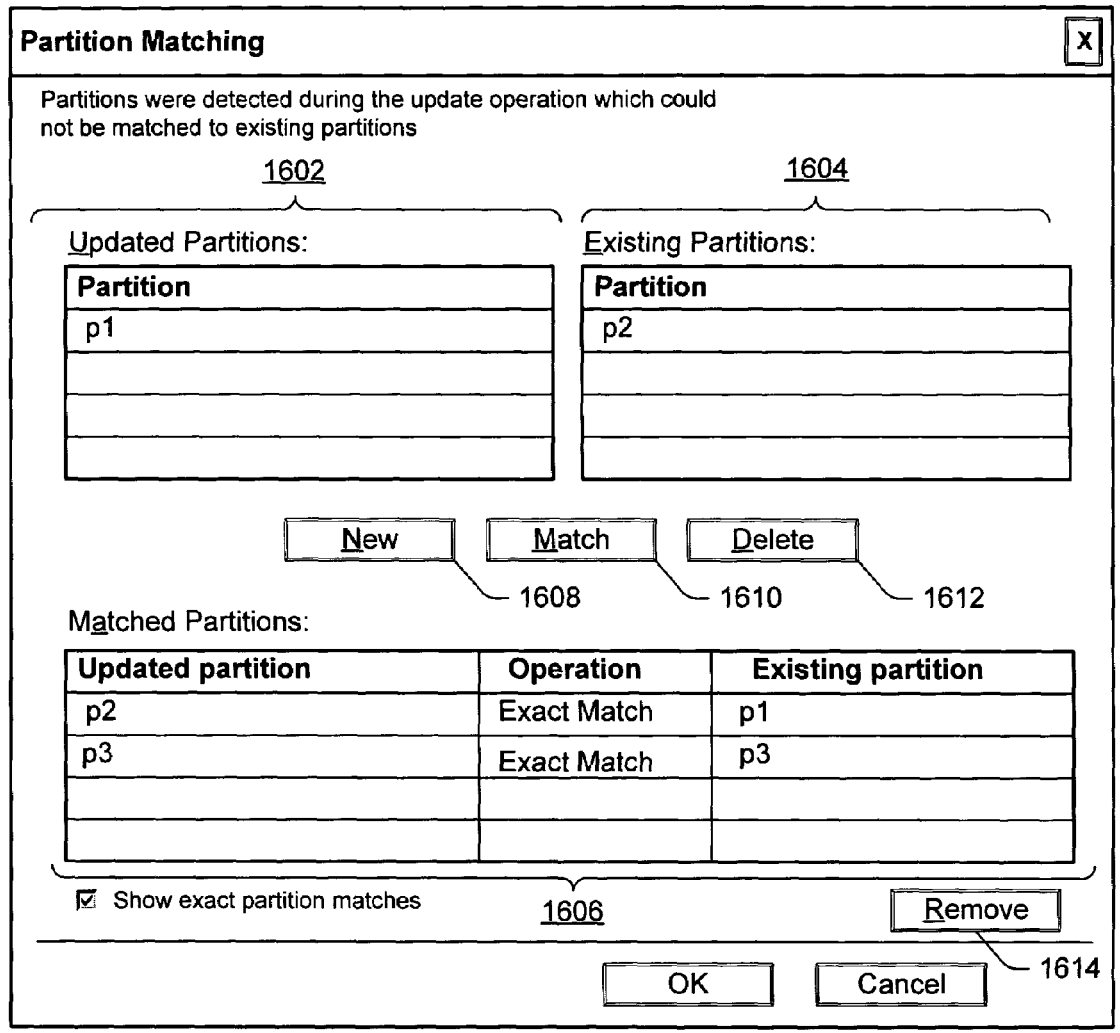

The UI presentation 1600 shown in FIG. 16 provides a mechanism for matching partitions. That is, during the import or updating of an MA, the configuration logic 142 attempts to match partitions specified in the configuration information 136 with partitions that already exist (e.g., as reflected by information associated with the existing MA provided on the production system 106 or actual partitions used in the associated connected directory source (CD). The configuration logic 142 may be able to automatically match some of the partitions specified in the configuration information 136 with existing partitions (e.g., by id, name, and/or on some other basis). However, the configuration logic 142 may be unsuccessful in matching other partitions specified in the configuration information 136. The UI presentation 1600 displays these file-specified and existing partitions and allows a user to manipulate these partitions and the associations between these partitions.

More specifically, field 1602 shows unmatched partitions as specified in the configuration information 136. Field 1604 shows unmatched partitions reflected in the existing MA. Field 1606 shows the association between file-specified and existing partitions. (If the checkbox beneath the field 1606 is checked, then the field 1606 only presents pairs of partitions that have been automatically matched by the configuration logic 142, reflected by the operational label of "Exact Match" that appears in a column of this field.) Command button 1608, 1610, and 1612 allow a user to modify the designations of partitions and/or modify the association between partitions. For example, the "New" command button 1608 allows a user to designate a partition in field 1602 as new, to indicate that this partition is not present in the existing set of partitions. The result of designating a file-specified partition as "new" can be reflected in the field 1606 by showing this new partition with the operational label of "Sew." The "Match" command button 1610 allows a user to add a selected pair of partitions that appear in fields 1602 and 1604 to the field 1606 as manually matched partitions. The result of manually matching a selected pair in fields 1602 and 1604 can be reflected in the field 1606 by showing the manually matched pair with the operational label of "Manual Match." The "Delete" command button 1612 allows a user to delete/deselect a partition in the exiting partitions field 1604 (because, for instance, it describes a partition that will no longer exist after the configuration operation has completed). The result of designating an existing partition as deleted can be reflected in the field 1606 by showing this deleted partition with the operational label of "Deleted." The "Remove" command button 1614 allows a user to undo the effects of any of the command buttons 1608, 1610, or 1612. Further, the configuration logic 142 may have erroneously matched a file-specified partition with an existing partition. In this case, the user can undo this automatic match using the "Remove" command button 1614, whereupon this pair of partitions will appear in fields 1602 and 1604 to be processed by the user in manual fashion. Generally, the user can select partitions and actuate command buttons in conventional fashion by using a graphical input device, such as a mouse, or some other input device.

D. Exemplary Computer Environment for Implementing the Configuration Techniques

FIG. 17 shows an exemplary computer environment 1700 that can be used to implement the metadirectory system and/or the configuration logic 142. The computing environment 1700 includes the general purpose computer 1702 and display device 1704. However, the computing environment 1700 can include other kinds of computer and network architectures. For example, although not shown, the computer environment 1700 can include hand-held or laptop devices, set top boxes, programmable consumer electronics, mainframe computers, gaming consoles, etc. Further, FIG. 17 shows objects of the computer environment 1700 grouped together to facilitate discussion. However, the computing environment 1700 can employ a distributed processing configuration. In a distributed computing environment, computing resources can be physically dispersed throughout the environment.

Exemplary computer 1702 includes one or more processors or processing units 1706, a system memory 1708, and a bus 1710. The bus 1710 connects various system components together. For instance, the bus 1710 connects the processor 1706 to the system memory 1708. The bus 1710 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1702 can also include a variety of computer readable media, including a variety of types of volatile and non-volatile media, each of which can be removable or non-removable. For example, system memory 1708 includes computer readable media in the form of volatile memory, such as random access memory (RAM) 1712, and non-volatile memory, such as read only memory (ROM) 1714. ROM 1714 includes an input/output system (BIOS) 1716 that contains the basic routines that help to transfer information between objects within computer 1702, such as during start-up. RAM 1712 typically contains data and/or program modules in a form that can be quickly accessed by processing unit 1706.

Other kinds of computer storage media include a hard disk drive 1716 for reading from and writing to a non-removable, non-volatile magnetic media, a magnetic disk drive 1718 for reading from and writing to a removable, non-volatile magnetic disk 1720 (e.g., a "floppy disk"), and an optical disk drive 1720 for reading from and/or writing to a removable, non-volatile optical disk 1724 such as a CD-ROM, DVD-ROM, or other optical media. The hard disk drive 1716, magnetic disk drive 1718, and optical disk drive 1722 are each connected to the system bus 1710 by one or more data media interfaces 1726. Alternatively, the hard disk drive 1716, magnetic disk drive 1718, and optical disk drive 1722 can be connected to the system bus 1710 by a SCSI interface (not shown), or other coupling mechanism. Although not shown, the computer 1702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1702. For instance, the readable media can store the operating system 1728, one or more application programs 1730, other program modules 1732, and program data 1734.

The computer environment 1700 can include a variety of input devices. For instance, the computer environment 1700 includes the keyboard 1736 and a pointing device 1738 (e.g., a "mouse") for entering commands and information into computer 1702. The computer environment 1700 can include other input devices (not illustrated), such as a microphone, joystick, game pad, satellite dish, serial port, scanner, card reading devices, digital or video camera, etc. Input/output interfaces 1740 couple the input devices to the processing unit 1706. More generally, input devices can be coupled to the computer 1702 through any kind of interface and bus structures, such as a parallel port, serial port, game port, universal serial bus (USB) port, etc.

The computer environment 1700 also includes the display device 1704. A video adapter 1742 couples the display device 1704 to the bus 1710. In addition to the display device 1704, the computer environment 1700 can include other output peripheral devices, such as speakers (not shown), a printer (not shown), etc.

Computer 1702 can operate in a networked environment using logical connections to one or more remote computers, such as a remote computing device 1744. The remote computing device 1744 can comprise any kind of computer equipment, including a general purpose personal computer, portable computer, a server, a router, a network computer, a peer device or other common network node, etc. Remote computing device 1744 can include all of the features discussed above with respect to computer 1702, or some subset thereof.

Any type of network can be used to couple the computer 1702 with remote computing device 1744, such as a local area network (LAN) 1746, or a wide area network (WAN) 1748 (such as the Internet). When implemented in a LAN networking environment, the computer 1702 connects to local network 1746 via a network interface or adapter 1750. When implemented in a WAN networking environment, the computer 1702 can connect to the WAN 1748 via a modem 1752 or other connection strategy. The modem 1752 can be located internal or external to computer 1702, and can be connected to the bus 1710 via serial I/O interfaces 1754 other appropriate coupling mechanism. Although not illustrated, the computing environment 1700 can provide wireless communication functionality for connecting computer 1702 with remote computing device 1744 (e.g., via modulated radio signals, modulated infrared signals, etc.).

In a networked environment, the computer 1702 can draw from program modules stored in a remote memory storage device 1756. Generally, the depiction of program modules as discrete blocks in FIG. 17 serves only to facilitate discussion; in actuality, the programs modules can be distributed over the computing environment 1700, and this distribution can change in a dynamic fashion as the modules are executed by the processing unit 1706.

Wherever physically stored, one or more memory modules 1708, 1720, 1724, etc. can be provided to store the various rules, objects, schemas, etc. described above.

E. Appendix: Exemplary Schemas and Rules

The following appendix, which forms an integral part of this specification, provides various rules and schemas used in the metadirectory service.

E.1. Join Rules

Referring to the generic MA rule configuration schema shown above, the <join> sub-element governs how a metadirectory synchronization engine should join an object in the metadirectory buffer to an object in the metadirectory core. In one implementation, a join operation involves searching the metadirectory core for an object that corresponds to an object in the metadirectory buffer, and then linking the corresponding objects.

In one implementation, joining two objects involves establishing a link between the two objects that enables subsequent attribute flow to occur between the two objects. Until a metadirectory buffer object is joined to a metadirectory core object, the metadirectory buffer object does not affect the metadirectory core because no relationship to the metadirectory core exists. After a metadirectory buffer object is joined to a metadirectory core object, the buffer object can affect the core object (and vice versa) in various ways, examples of which are discussed in more detail herein.

In one implementation, when an object is received by the metadirectory buffer, an attempt is made to join the metadirectory buffer object to an object in the metadirectory core. If an object exists in the core that corresponds to the buffer object, the two objects will be joined. In cases where no corresponding object can be found in the metadirectory core, a new core object is projected (if enabled by the core projection rules and the run configuration rules) and the metadirectory buffer object is automatically joined to the new core object. The join rules are also applied during "apply rules runs" that apply to pending updates to the metadirectory core when a disconnector object in the metadirectory buffer is changed to a connector object.

Maintenance processing may be employed to re-evaluate all existing joins against the defined join rules, as well as to evaluate normal disconnectors for potential joining. During both updating and maintenance processing, explicit disconnectors (those created with account joiner or buffer deprovisioning rules) are not evaluated for joining and will remain as disconnectors. In one implementation, whenever a normal disconnector object is run through the connector filter the object will be projected and/or joined to a core object if the disconnector object passes the filter.

A join is performed for a metadirectory buffer object by initiating a search for objects in the metadirectory core that match defined search criterion. Any join candidates found during the search are then passed to a resolution handler to perform validation of the result (in the case of a single join candidate) or to identify a single join target (in the case of multiple join candidates). After a metadirectory core object has been identified as the join target, the metadirectory core object is joined to the metadirectory buffer object. In one implementation, the join rules specify the search criterion, the method of join resolution/validation, handling of ambiguous results, and scoping of join rules by CD object types.

Exemplary join rules for an MA are expressed in XML and specify criterion for joining two objects. In one implementation, the user defines the join rules through a UI that will create and store these rules in XML on the metadirectory server. The rules engine will employ these stored rules in the course of executing join actions initiated by either a MA run or by account joiner. Exemplary join rules for an MA can be defined in a declarative manner, with provision for programmatic rules via a user-written script where complexity requires it. Exemplary XML Join rules schema is shown below:

```
<join>
    <join-profile cd-object-type="cdObjectType">
        <join-criterion id="GUID1">joinCriterion1</join-criterion>
        <join-criterion id="GUID2">joinCriterion2</join-criterion>
```

-continued

```
        <join-criterion id="GUID3">joinCriterion3</join-criterion>
        ...
    </join-profile>
    ...
</join>
```

The <join> element can encapsulate multiple <join-profile> elements. Each <join-profile> specifies the join search criterion that are specific to a particular object type. Users, for example, might be configured with one <join-profile>, whereas contacts might be configured with a different profile.

Each <join-profile> specifies the object type to which it applies to by means of a "cd-object-type" attribute. In a particular implementation, only one <join-profile> is allowed with the same "cd-object-type." Within each <join-profile>, multiple <join-criterion> elements can be configured with an implicit priority order (i.e., a prioritized "or" exists between each <join-criterion>). An exemplary join process evaluates each <join-criterion> in priority sequence in search of a join target until either a single join target is identified or the search is exhausted and no join target has been identified.

Within a <join-profile> element, the <join_criterion> element is responsible for configuring the search criterion as well as the method of join resolution. In a particular implementation, each <join-criterion> operates independently as there is no relationship between <join-criterion> searches. The following exemplary <join_criterion> schema illustrates join criterion:

```
<join-criterion id="GUID">
    <collation-order>CollationOrder string</collation-order>
    <search mv-object-type="mvObjectType">
            <attribute-mapping
                    intrinsisc-attribute=(true | false)
                    mv-attribute="mvAttributeName">
                attributeMapping
            </attribute-mapping>
            ...
    </search>
    <resolution type=(none | scripted)>
            <script-context>contextString</script-context>
    </resolution>
</join-criterion>
```

In the <join-criterion> schema above, the "id" for <join-criterion> is a GUID that uniquely identifies the join criterion rule (e.g., "{934A9523-A3CA4BC5-ADA0-D6D95D979429}"). In one implementation of the metadirectory, the UI will generate a GUID) and set it as an attribute of the join-criteria element when a new one is added.

The exemplary <collation-order> element specifies how any string comparisons that need to be done by the search should be performed by an SQL Server. For each locale id there is generally more than one collation order that the user can choose, allowing the user to choose whether to be case insensitive, accent insensitive, and the like. The <collation-order> tag is optional and defaults to the default SQL Server collation for an exemplary metadirectory database.

The exemplary <search> element specifies a set of AND-ed conditions on the values of the metadirectory core object being searched for. Each condition is specified by an attribute-mapping> element. The exemplary content of the <attribute-mapping> element, "attributeMapping," may be a direct or scripted attribute mapping fragment such as:

```
<direct-mapping>
        <src-attribute>cdAttributeName</src-attribute>
</direct-mapping>
    or
<scripted-mapping>
        <src-attribute>cdAttributeName</src-attribute>
        ...
        <script-context>contextString</script-context>
</scripted-mapping>
```

Although these mappings have the same syntax as used in attribute flow, the semantic meaning is different. Each mapping means that a value(s) from the metadirectory buffer attribute (direct-mapping) or a calculated value(s) (script-mapping) is compared to the metadirectory core attribute given by "mv-attribute" according to the table below. There is an optional Boolean attribute "intrinsic-attribute" used to signify that the metadirectory core attribute designated by the "mv-attribute" attribute is an "intrinsic" metadirectory attribute (not an attribute in the schema, but metadata exposed by metadirectory for an object). The default value for the "intrinsic-attribute" attribute is "false."

Table 1 illustrates exemplary actions to take in response to successful comparisons of attributes in objects from remote repositories to attributes from objects in the metadirectory core.

TABLE 1

| Remote Repository Attribute | Core object attribute | Successful comparison |
|---|---|---|
| Direct mapping of single valued attribute in RR | Single valued core attribute | RR attribute value equals the core attribute value |
| Direct mapping of multi-valued attribute in RR | Single valued core attribute | One of RR attribute values equal to the core attribute value |
| Direct mapping of single valued attribute in RR | Multi-valued core attribute | RR attribute value equal to one of the core attribute values |
| Direct mapping of multi-valued attribute in RR | Multi-valued core attribute | One of RR attribute values equal to one of the core attribute values |
| Scripted mapping generates a single value | Single valued core attribute | Scripted value equals the core attribute value |
| Scripted mapping generates multiple values | Single value core attribute | One of scripted values equals the core attribute value |
| Scripted mapping generates a single value | Multi-valued core attribute | Scripted value equals one of the core attribute values |
| Scripted mapping generates multiple values | Multi-valued core attributes | One of the scripted values equals one of the core attribute values |

In this implementation, "equality" includes different conditions, depending on the types of values being compared. As an example, equality of strings is based on the collation-order set for the criterion, whereas binary and integer comparisons test for exact value matches.

In an exemplary implementation, the object search can be further scoped by specifying an "mv-object-type." The "mv-object-type" attribute is optional. If it is omitted, then the object type will match all core object types. The search element includes one or more mapping sub-elements. The <resolution> sub-element is used when the "tpe" attribute is "scripted." The <resolution> sub-element indicates that a user-written script entry point should be called to validate a single result or pick between multiple search results coming back from the search. The actual script will be defined in the scripting object for the MA. The user-defined <script-context> string allows the script to determine the context in which it has been invoked (i.e., from which <join-criterion> element). The callout to the script will return a BOOL to indicate whether the join target has been successfully resolved. It will also be possible to return a new object type for the metadirectory core object in the case of successful comparison. If the script is unable to resolve the join target because of further ambiguous results, then an exception may be issued.

In one implementation, the <resolution> element is mandatory. The <resolution> element may specify a desired resolution script, or the <resolution> element may be left empty with "type" set to "none." An exemplary resolution script has the following parameter list:

IN: buffer object to join

IN: join criterion context string so the script knows how it is being invoked

IN: array of core join candidates

OUT: index of the resolved join target in the core join candidates array

OUT: optional authoritative core object type to be updated on join target

The optional core object type parameter is employed when the resolution script has the ability to determine updates to the object type of the core join target object. This ability might be beneficial in interforest-type scenarios where temporary placeholder objects (e.g., a "contact") may be initially imported into the core from a non-authoritative source, and it may be desirable to have the authoritative source override the object type when joining to it (e.g., change a "contact" to a "user").

When a resolution script indicates that the object type of the core object must change, the connector object in the buffer is joined to the core object. Subsequently, all attribute values contributed by the metadirectory buffer objects joined to a core object, will be recalled, the object type of the core object will be changed, and attributes will be re-imported from all the buffer objects joined to the core object. After doing so, provisioning and export flow processes are performed.

An ambiguous result may occur if multiple potential join candidate objects are found during the join search and a single join target object cannot be identified. In one implementation, if the <join-criterion> ends with such ambiguous results, or no results, the join process will advance to the next <join-criterion>.

To further illustrate the join rules schema, another detailed exemplary join rules schema is shown below:

```
<join>
    <join-profile cd-object-type="user">
        <join-criterion id="{934A9523-A3CA-4BC5-ADA0-D6D95D979429}">
            <search mv-object-type="user">
                <attribute-mapping mv-attribute="uid">
                    <direct-mapping>
                        <src-attribute>empId</src-attribute>
                    </direct-mapping>
                </attribute-mapping>
                <attribute-mapping mv-attribute="company">
                    <constant-mapping>
                        <constant-value>Microsoft</constant-value>
                    </constant-mapping>
                </attribute-mapping>
```

-continued

```
            </search>
            <resolution type="scripted">
                <script-context>Criterion1</script-context>
            </resolution>
        </join-criterion>
        <join-criterion id="{534A9523-A3CA-4BC5-ADA0-D6D95D979425}">
            <search mv-object-type="user">
                <attribute-mapping mv-attribute="mail">
                    <direct-mapping">
                        <src-attribute>alias</src-attribute>
                    </direct-mapping>
                </attribute-mapping>
            </search>
            <resolution type="scripted">
                <script-context>Criterion2</script-context>
            </resolution>
        </join-criterion>
    </join-profile>
    <join-profile cd-object-type="prov-user">
        <join-criterion id="{5C875108-D0CD-471a-9D9C-BC3E9C2C4A12}">
            <search mv-object-type="user">
                <attribute-mapping intrinsic-attribute="true" mv-attribute="object-id">
                    <direct-mapping>
                        <src-attribute>mv-object-id</src-attribute>
                    </direct-mapping>
                </attribute-mapping>
            </search>
            <resolution type="none"/>
        </join-criterion>
    </join-profile>
    <join-profile cd-object-type="contact">
        <join-criterion id="{134A9523-A3CA-4BC5-ADA0-D6D95D979421}">
            <search mv-object-type="user">
                <attribute-mapping intrinsic-attribute="false" mv-attribute="mail">
                    <direct-mapping>
                        <src-attribute>mail</src-attribute>
                    </direct-mapping>
                </attribute-mapping>
            </search>
            <resolution type="none"/>
        </join-criterion>
    </join-profile>
</join>
```

E.2. Projection Rules

The projection rules schema specifies how metadirectory buffer objects, if any, are projected as new entries in the core. As described herein, an exemplary metadirectory includes a core synchronization engine and a rules engine for employing the projection rules. Such an implementation provides for separation of the rules logic from the synchronization duties, thereby dividing up tasks among distinct modules that specialize in those tasks.

In an exemplary metadirectory implementation, a set of projection rules is associated with an MA. Projection rules specify the manner in which metadirectory buffer objects are projected into the metadirectory core. Projections rules may be defined either in a declarative manner, or programmatically via a user-written script. When the user defines the rules declaratively the mappings may be specified by the user in the configuration UI.

In a particular implementation, the projection rules specify enabling and/or disabling projection of buffer space objects into the core space, declaratively mapping of remote repository objects into core space object types, and/or programmatically projecting objects via user-written script(s).

In a particular implementation, two properties are set when creating a new metadirectory core object: a distinguished name (DN) and an object type. In this implementation, the DN may be a persistent system generated GUID. The projection rules may specify whether an object is to be projected from a remote repository into the metadirectory core, and, if so, the appropriate object type to employ for the projection of objects from. Exemplary object type mappings (discussed further below) specify types which indicate whether a mapping is prohibited, scripted, or declarative. Thus, the projection rules are an exemplary mechanism by which object type mappings can be specified.

Declarative mappings allow a user to specify types of metadirectory core objects that should be created when a given remote repository object type is to be projected. Each declarative mapping is an object type pair that identifies both a source remote repository object type and a destination metadirectory core object type. Such declarative mappings may be one-to-one mappings or many-to-one mappings. An example of a many-to-one mapping is a mapping of both "employee" object types and "contact" object types to a "user" object type in the core. A many-to-one mapping may be accomplished by employing two distinct mappings (e.g., one mapping for "employee" to "user," and another for mapping "contact" to "user").

A user-written script can be used in scenarios where simple declarative mappings are not sufficient to determine the metadirectory core object type. An exemplary implementation of a mapping script accepts a metadirectory buffer object as input and, based on the object type and/or attributes, the script determines an appropriate metadirectory core object type. The mapping script may also selectively determine whether or not to project a buffer object into the core.

The following exemplary pseudo-schema outlines how the projection rules may be configured in XML:

```
<projection>
    <class-mapping id="GUID" cd-object-type="cdClass"
        type={"none"|"declared"|"scripted"}>
        <mv-object-type>mvClass</mv-object-type>
    </class-mapping>
    ... additional <class-mapping> elements ...
</projection>
```

A particular implementation of a projection rule schema includes an ID GUID associated with the mapping rule, <class-mapping>. The GUID may be used to identify lineage properties on the associated object for object change tracking purposes. The UI randomly generates these GUIDs as the user modifies/creates the projection rules.

If the type is "scripted" then a user-written script determines whether to project and, if so, the appropriate object type to employ. Note that the name of the script method is not specified in the schema shown above. However, in a particular implementation, there may be a specified naming convention (e.g., method named Project( ), etc.) that a customer may follow when authoring a script. An exemplary script has the following parameter list:

IN: CS object to project
OUT: TRUE/FALSE projection status
OUT: MV object type if projected In exemplary projecting rules, if the type is "none" the imported objects will be staged in the metadirectory buffer as normal disconnectors, but will not be projected into metadirectory core.

To further illustrate the projection rules, the following exemplary detailed schema may be used to implement projection rules:

```
<projection>
    <class-mapping type="declared"
        id="{934A9523-A3CA-4BC5-ADA0-
            D6D95D979429}"
        cd-object-type="contact">
        <mv-object-type>user</mv-object-type>
    </class-mapping>
    <class-mapping type="declared"
        id="{734A9523-A3CA-4BC5-ADA0-
            D6D95D979427}"
        cd-object-type="user">
        <mv-object-type>user</mv-object-type>
    </class-mapping>
    <class-mapping type="declared"
        id="{534A9523-A3CA-4BC5-
            ADA0-D6D95D979425}"
        cd-object-type="group">
        <mv-object-type>group</mv-object-type>
    </class-mapping>
</projection>
```

The foregoing example demonstrates a many-to-one mapping where both the remote repository object types "contact" and "user" are mapped to the metadirectory core "user" object type. Additionally, the remote repository object type "group" is to be mapped to the metadirectory core object type "group."

The following provides an example of how a user-written script can be configured to control buffer to core projection:

```
<projection>
    <class-mapping type="scripted"
        id="{934A9523-A3CA-4BC5-ADA0-D6D95D97942A}"
        cd-object-type="contact">
    </class-mapping>
</projection>
```

In the above example case, the rules specify that a script should be called to project objects received from a remote repository that have a "contact" object type. Note that in the scripted case, the mv-object-type element is not specified.

The following provides an example of how to configure the projection rules to disable projection into the metadirectory core:

```
<projection>
    <class-mapping type="none"
        id="{934A9523-A3CA-4BC5-ADA0-D6D95D97942A}"
        cd-object-type="contact"/>
</projection>
```

In the above example, the rules specify that remote repository "contact" object type should not be projected into the metadirectory core.

E.3. Stay Disconnector Rules

This subsection describes an XML format of the stay disconnector rules. The stay disconnector (SD) rules describe a rules engine filter that is employed by the sync engine during the process of importing/exporting objects. The SD filter is scoped by object type and has the ability to express filtering conditions based on characteristics of the imported object.

The exemplary semantics of the SD rules are as defined by the following considerations: (1) When an object is first imported, it is evaluated against the SD filter before join/projection is attempted. If the object satisfies the filter, then the sync engine will mark that object as a normal disconnector and will not attempt to join/project the object. Conversely, if the object does not satisfy the filter, then the sync engine will pursue join/projection actions for the object. (2) As deltas to the object are imported, the SD filter will be reevaluated regardless of whether the object is currently a disconnector or a connector. If it is a normal connector, and it now satisfies the filter criteria, the join will be broken and it will be turned into a normal disconnector. If it is a normal disconnector and it no longer satisfies the criteria, it will be sent through the join/project rules for processing. (3) A reapply-rules run will apply the SD filter to all normal connectors and disconnectors, handling them as described in the preceding paragraph. (4) The SD filter is not applied to explicit connectors/disconnectors because their explicit status exempts them. (5) When any one of the following export scenarios occurs, the SD filter will be applied to the outgoing CS object before it is pushed out to the connected directory: a new object is provisioned; an object rename occurs; or export attribute flow is performed. If the CS object satisfies the SD filter, then an error will be generated and the transaction will be rolled back. This is done to maintain data consistency by avoiding the export of changes to a connected directory that would lead to subsequent disconnection when objects are re-imported.

The stay disconnector rules are encapsulated in a top-level <stay-disconnector> element which may contain multiple children <filter-set> elements, each of which specify filter conditions for specific CD object types.

The following provides the full XML format for these rules. Each portion will be discussed in detail individually in the sections that follow.

```
<stay-disconnector>
    <filter-set cd-object-type="cdObjectType" type=(declared | scripted) id="guid">
        <filter-alternative id="guid">
            <condition cd-attribute="attributeName"
                intrinsic-attribute=(true | false)
                operator=(equality |
                    inequality |
                    less-than |
                    less-than-or-equal |
                    greater-than |
                    greater-than-or-equal |
                    present |
                    not-present |
                    substring-start |
                    not-substring-start |
                    substring-end |
                    not-substring-end |
                    substring-any |
                    not-substring-any |
                    bit-on |
                    bit-off )>
                <value ui-radix="radix">operandValue</value>
            </condition>
            ...
        </filter-alternative>
        ...
    </filter-set>
    ...
</stay-disconnector>
```

The stay disconnector rules are configured within a top-level <stay-disconnector> element. The following provides a high-level outline of how these rules are structured in

```
<stay-disconnector>
    <filter-set cd-object-type="cdObjectType1" type=(declared |
```

-continued

```
            scripted) id="guid">
        <filter-alternative>filterConditions1</filter-alternative>
        <filter-alternative>filterConditions2</filter-alternative>
        <filter-alternative>filterConditions3</filter-alternative>
        ...
    </filter-set>
    <filter-set cd-object-type="cdObjectType2" type=(declared |
            scripted) id="guid">
        ...
    </filter-set>
    ...
</stay-disconnector>
```

The <stay-disconnector> element may encapsulate multiple <filter-set> child elements. An undefined filter or an empty <stay-disconnector> element (e.g., one with no children) means that no filtering is configured and that join/projection is attempted on all imported objects.

Each <filter-set> element describes filtering conditions for a specific CD object type as configured by the attribute "cd-object-type." Each <filter-set> should be configured as either declarative or scripted by setting the attribute "e" to either "declared" or "scripted," respectively. The "id" attribute is optional and its presence depends on the configured "type" as described below.

A declarative <filter-set> is configured with one or more <filter-alternative> child elements and, in one exemplary implementation, should have no "id" attribute (instead, it is specified within each child <filter-alternative> for declarative). Each <filter-alternative> defines a series of conditions involving the DN and/or attributes of an imported object. An object is said to satisfy a <filter-alternative> if the object's DN and attributes meet all the defined conditions. An implicit "or" exists between all <filter-alternative> elements, such that an object need only satisfy one alternative in order to satisfy the filter.

A scripted <filter-set> is used in scenarios where simple declarative rules are insufficient to describe the filtering requirements and is expressed as an empty <filter-set> element (i.e., it does not have any <filter-alternative> child nodes). A scripted <filter-set> should specify an "id" attribute that uniquely identifies the rule and its value should be a GUID in brace format (e.g., "{534A9523-A3CA-4BC5-ADA0-D6D95D979425}"). The user-written script will take a CS object as input and will determine if the object satisfies the filter based on the CD properties of the object. The script will have this parameter list:

IN: CS object

OUT: Boolean status indicating whether the filter was satisfied.

The filtering process will apply the appropriate <filter-set> based on the object type of the imported object. If no applicable <filter-set> is found, then no filtering is performed on the object and the sync engine will proceed to attempt join/projection. However, if an appropriate <filter-set> has been identified then the imported object is either evaluated against each <filter-alternative> (if declarative), or passed to the user-written script for evaluation (if scripted). If the imported object satisfies the filter, then the sync engine will mark the object in the CS as a normal disconnector without attempting join/projection. Conversely, if the filter is not satisfied, then the normal join/projection process will be attempted for the object.

The <filter-alternative> element encapsulates a set of logical conditions expressed in XML that is used to evaluate the suitability of an object for processing based on its attribute values and/or DN. If the object satisfies every condition, then a TRUE result is yielded and the alternative is considered to have been satisfied.

These conditions are expressed in this exemplary format:

```
<filter-alternative id="guid">
    <condition cd-attribute="attributeName1 "
    operator="operation">attrValue1</condition>
    <condition cd-attribute="attributeName2 "
    operator="operation">attrValue2</condition>
    <condition cd-attribute="attributeName3 "
    operator="operation">attrValue3</condition>
    ...
</filter-alternative>
```

The "id" attribute uniquely identifies the filter alternative and its value should be a GUID in brace format (eg. "{534A9523-A3CA-4BC5-ADA0-D6D95D979425}"). No two filter alternatives may have the same value for the "id" attribute.

The application of an individual condition can yield a TRUE result if the object meets the condition, or a FALSE result if it does not. The condition expressions are effectively and'ed together in order to compute an overall result for the <filter-alternative>. That is, all child node conditions should resolve to TRUE in order for the <filter-alternative> to be satisfied.

Filter conditions are logical expressions that describe the attribute or DN requirements that an object should satisfy. If the object satisfies the requirements, then a TRUE result is yielded.

The filter conditions are expressed in the following exemplary format:

```
<condition cd-attribute="attributeName"
    intrinsic-attribute=(true | false)
    operator=(equality |
        inequality |
        less-than |
        less-than-or-equal |
        greater-than |
        greater-than-or-equal |
        present |
        not-present |
        substring-start |
        not-substring-start |
        substring-end |
        not-substring-end |
        substring-any |
        not-substring-any |
        bit-on |
        bit-off )>
    <value ui-radix="radix">operandValue</value>
</condition>
```

"cd-attribute" identifies the directory attribute to which the condition applies. Supported attribute types are string, reference-based*, numeric, and Boolean. "intrinsic-attribute" is set to "true" if "cd-attribute" identifies an MMS-intrinsic attribute, namely "dn." By default, "intrinsic-attribute" is "false." The "operator" attribute defines the operation to perform. The general purpose "equality" and "inequality" operators allow for direct comparison of the complete DN or attribute of an object against a specified value. They apply to both string and non-string attributes. The "less-than," "less-than-or-equal," "greater-than," and "greater-than-or-equal" operators apply to numeric attributes only and allow the attributes of an object to be compared against a specified value.

To test for the presence or absence of an attribute from an object, the respective "present" and "not-present" operators can be used. For these operators, the <value> element should be empty or unspecified.

If only a portion of a string attribute or the DN is of interest, then the "substring-start" or "substring-end" operators can be employed to check for equality at the start or end, respectively. To match any part of a string attribute, the "substring-any" operator can be employed for this purpose. Negative substring operators are also available, namely "not-substring-start," "not-substring-end," and "not-substring-any." All string comparisons are case insensitive and accent sensitive.

The bitwise operators "bit-on" and "bit-off" allow individual bits of a numeric attribute to be checked against a bit mask that is specified by the <value> element. In the case of the former, a TRUE condition is obtained if the attribute value "and"ed with the bit mask yields a result equal to the bit mask, whereas the latter operation is TRUE if the "and" operation yields 0.

In cases where the attribute value is absent in the imported object, a condition involving an "inequality" operator or any of the "not" prefixed operators will resolve to TRUE, whereas all other operators will resolve to FALSE.

The contents of the <value> element specify one of the operands employed in the comparison (the other operand is sourced from the object itself). When specifying a value for a numeric attribute type, the value should be expressed in hex format with a "0x" prefix. The "ui-radix" attribute allows the UI to preserve the radix in which user numeric data was originally entered. This is required so that the UI can redisplay the value to the user in the original radix because the actual value is stored internally in hex. When dealing with multi-valued attributes, the condition is interpreted as a test to determine if any value in the object matches that specified by the <value> element. For the "bit-on" and "bit-off" operators, the <value> element specifies the bit mask used in the operation.

The following provides an example of the <stay-disconnector> element.

```
<stay-disconnector>
    <filter-set cd-object-type="contact" type="declared">
        <filter-alternative id="{234A9523-A3CA-4BC5-
        ADA0-D6D95D979422}">
            <condition cd-attribute="employeeID"
            intrinsic-attribute="false" operator="not-present">
                <value/>
            </condition>
        </filter-alternative>
        <filter-alternative id="{334A9523-A3CA-4BC5-ADA0-
        D6D95D979423}">
            <condition cd-attribute="rdn" intrinsic-
            attribute="false" operator="equality">
                <value>Jane Doe</value>
            </condition>
        </filter-alternative>
        <filter-alternative id="{434A9523-A3CA-4BC5-ADA0-
        D6D95D979424}">
            <condition cd-attribute="dn" intrinsic-attribute=
            "true" operator="equality">
                <value>cn=Jane Doe,o=Microsoft</value>
            </condition>
        </filter-alternative>
    </filter-set>
    <filter-set cd-object-type="user" type="declared">
        <filter-alternative id="{534A9523-A3CA-4BC5-
```

```
                ADA0-D6D95D979425}">
                    <condition  cd-attribute="title" operator=
            "substring-start">
                        <value>administrator</value>
                    </condition>
                    <condition  cd-attribute="company"
            operator="equality">
                        <value>Microsoft</value>
                    </condition>
                </filter-alternative>
                <filter-alternative id="{634A9523-A3CA-4BC5-
                ADA0-D6D95D979426}">
                    <condition  cd-attribute="mail" operator= "equality">
                        <value>administrator@Microsoft.com</value>
                    </condition>
                </filter-alternative>
                <!-- filter out if not a normal account (0x200) -->
                <filter-alternative id="{734A9523-A3CA-4BC5-
                ADA0-D6D95D979427}">
                    <condition  cd-attribute="userAccountControl"
            operator="bit-off">
                        <value  ui-radix="16">0x200</value>
                    </condition>
                </filter-alternative>
                <!-- filter out if a disabled account (0x2) -->
                <filter-alternative  id="{834A9523-A3CA-4BC5-
                ADA0-D6D95D979428}">
                    <condition  cd-attribute="userAccountControl"
            operator="bit-on">
                        <value  ui-radix="10">0x2</value>
                    </condition>
                </filter-alternative>
            </filter-set>
            <filter-set cd-object-type="organization"
                type="scripted"
                id="{934A9523-A3CA-
                4BC5-ADA0-D6D95D979429}"/>
            <filter-set  cd-object-type="organizationalUnit"
                type="scripted"
                id="{A34A9523-
                A3CA-4BC5-ADA0-D6D95D97942A}"/>
    </stay-disconnector>
```

E.4. Import Attribute Flow XML Format and Runtime Behavior

An exemplary <import-attribute-flow> element includes rules or script, which govern how attributes on objects in the metadirectory buffer are imported to objects in the metadirectory core. Import attribute flow (IAF) rules describe how attribute values should flow from metadirectory buffer objects to linked metadirectory core objects. They are declared in metadirectory core-centric fashion, so that all import flows for all MAs may be defined in one document.

At the lowest level of exemplary IAF rules is a mapping, which describes how to generate a destination attribute value given a set of source attribute values. At the next level is a flow, which encapsulates the mapping, providing metadata (a unique ID) and criteria by source MA and source buffer object type (primary object class). Flows are then grouped and scoped by destination core attribute and, finally, groups of flows are then grouped into flow sets and defined by destination core object type. Thus, a flow ends up defining a relationship between a single destination core attribute and any number of source buffer attributes from a single object type. More details are given in the sections below.

An exemplary <import-attribute-flow> element specifies import attribute flow (IAF) rules. Within an exemplary <import-attribute-flow> are defined multiple flow sets, which describe the attribute flows or associations for a particular set of metadirectory buffer and metadirectory core object types. An exemplary <import-attribute-flow> element is given below:

```
<import-attribute-flow>
    <import-flow-set mv-object-type="object type">
        <import-flows mv-attribute="attribute name"
            type="ranked">
            <import-flow src-ma="guid" cd-object-type="object type"
                id="guid">
                <direct-mapping>
                    <src-attribute>attribute name</src-attribute>
                </direct-mapping>
            </import-flow>
            <import-flow src-ma="guid" cd-object-type="object type"
                id="guid">
                <direct-mapping>
                    <src-attribute intrinsic="true">dn</src attribute>
                </direct-mapping>
            </import-flow>
            <import-flow src-ma="guid" cd-object-type="object type"
                id="guid">
                <scripted-mapping>
                    <src-attribute>attribute name</src-attribute>
                    <src-attribute>attribute name</src-attribute>
                    <script-context>context string</script-context>
                </scripted-mapping>
            </import-flow>
            <import-flow src-ma="guid" cd-object-type="object type"
                id="guid">
                <constant-mapping>
                    <constant-value>value</constant-value>
                </constant-mapping>
            </import-flow>
            <import-flow src-ma="guid" cd-object-type="object type"
                id="guid">
                <dn-part-mapping>
                    <dn-part>part index</dn-part>
                </dn-part-mapping>
            </import-flow>
        </import-flows>
        <import-flows mv-attribute="attribute name"
            type="ranked">
            . . .
        </import-flows>
        . . .
    </import-flow-set>
    <import-flow-set mv-object-type="object type">
        . . .
    </import-flow-set>
    . . .
</import-attribute-flow>
```

In a particular implementation, IAF mappings describe how to generate a destination metadirectory core attribute value (or values) given a set of source metadirectory buffer attribute values. Four exemplary types of mappings are direct, scripted, constant, and Distinguished Name-part. Each type of mapping has an associated element type: <direct-mapping>, <scripted-mapping>, <constant-mapping>, and <dn-part-mapping>, respectively. Examples of such elements are shown below:

```
<direct-mapping>
    <src-attribute>attribute name</src-attribute>
</direct-mapping>
<direct-mapping>
    <src-attribute intrinsic="true">dn</src-attribute>
</direct-mapping>
<scripted-mapping>
    <src-attribute>attribute name</src-attribute>
    <src-attribute>attribute name</src-attribute>
    <src-attribute intrinsic="true">dn</src-attribute>
    <script-context>context string</script-context>
</scripted-mapping>
<constant-mapping>
```

```
        <constant-value>value</constant-value>
    </constant-mapping>
    <dn-part-mapping>
        <dn-part>part index</dn-part>
    </dn-part-mapping>
```

Exemplary flows encapsulate mappings, providing metadata (a unique ID) and scoping by source MA and source buffer object type. Flows are defined via the <import-flow> element, which should have exactly one mapping sub-element. An exemplary <import-flow> elements defines the attributes src-ma, cd-object-type, and id. Below is an example of an <import-flow> element:

```
<import-flow src-ma="guid" cd-object-type="object type" id="guid">
    <direct-mapping>
        <src-attribute>attribute name</src-attribute>
    </direct-mapping>
</import-flow>
```

Within the top-level <import-attribute-flow> element can be multiple <import-flow-set> elements, which themselves can contain multiple <import-flows> elements. The <import-flows> elements can then contain any number of <import-flow> elements. Taken together, the <import-flow-set> and <import-flows> elements define child flow declarations by destination core object type and destination core attribute. Exemplary <import-flow-set> and <import-flows> attribute elements are shown below:

```
<import-flow-set mv-object-type="object type">
    <import-flows mv-attribute="attribute name" type="ranked">
        <import-flow src-ma="guid" cd-object-type="object type"
            id="guid">
            ...
        </import-flow>
        ...
    </import-flows>
    ...
</import-flow-set>
```

E.5. Export Attribute Flow XML

The export-attribute-flow element may be used to specify how values of attributes on metadirectory core objects should be flown back to connected metadirectory buffer objects (i.e., be exported). Export attribute flow (EAF) rules describe how attribute values should flow from core objects to linked buffer objects. In one implementation, the EAF rules are declared in an MA-centric fashion, and thus, may be specified for each MA.

In an exemplary implementation, the EAF rules provide a mapping, which describes how to generate a destination attribute value given a set of source attribute values. The EAF rules may also provide a flow, which encapsulates the mapping, providing metadata (a unique ID and mapping configuration) and scoping based on the destination attribute. Attribute flows are grouped into flow sets, wherein the groups are based on source object type and destination object type. Thus, a flow can be used to define a relationship between a single destination attribute in the metadirectory buffer, and any number of source attributes from a single object type in the metadirectory core.

Exemplary export attribute flow (EAF) rules may be encapsulated in a top-level <export-attribute-flow> element. Multiple flow sets are defined within the <export-attribute-flow> element. The flow sets define how object types in the metadirectory buffer are related to object types in the metadirectory core. To illustrate and exemplary <export-attribute-flow> format, an XML schema is shown below:

```
<export-attribute-flow>
    <export-flow-set cd-object-type="object type"
    mv-object-type="object type">
        <export-flow cd-attribute="attribute name"
                id="guid"
                suppress-deletions="true">
            <direct-mapping>
                <src-attribute>attribute name</src-attribute>
            </direct-mapping>
        </export-flow>
        <export-flow cd-attribute="attribute name" id="guid">
            <direct-mapping>
                <src-attribute intrinsic="true">object-id</src-attribute>
            </direct-mapping>
        </export-flow>
        <export-flow cd-attribute="attribute name" id="guid">
            <scripted-mapping>
                <src-attribute>attribute name</src-attribute>
                <src-attribute>attribute name</src-attribute>
                <script-context>context string</script-context>
            </scripted-mapping>
        </export-flow>
        <export-flow cd-attribute="attribute name" id="guid">
            <constant-mapping>
                <constant-value>value</constant-value>
            </constant-mapping>
        </export-flow>
        ...
    </export-flow-set>
    <export-flow-set cd-object-type="object type"
    mv-object-type="object type">
        ...
    </export-flow-set>
    ...
</export-attribute-flow>
```

Exemplary <export-attribute-flow> mappings describe how to generate a destination metadirectory buffer attribute value (or values) given one or more source metadirectory core attribute values. Three exemplary types of mappings are shown: direct, scripted, and constant. Each type of mapping has an associated XML element: <direct-mapping>, <scripted-mapping>, and constant-mapping>, respectively. A general format for attribute mappings is illustrated in the following exemplary schemas:

```
<direct-mapping>
    <src-attribute>attribute name</src-attribute>
</direct-mapping>
<direct-mapping>
    <src-attribute intrinsic="true">object-id</src-attribute>
</direct-mapping>
<scripted-mapping>
    <src-attribute>attribute name</src-attribute>
    <src-attribute>attribute name</src-attribute>
    <src-attribute intrinsic="true">object-id</src-attribute>
    <script-context>context string</script-context>
</scripted-mapping>
<constant-mapping>
    <constant-value>value</constant-value>
</constant-mapping>
```

Flows encapsulate mappings, providing metadata (a unique ID and mapping configuration) and scoping by destination CS attribute. In one implementation, flows are defined via the <export-flow> element, which may have a mapping sub-element. Exemplary <export-flow> elements may define the attributes cd-attribute and id, and may optionally define the attribute suppress-deletions. Below is an example of an <export-flow> element XML.

```
<export-flow cd-attribute="attribute name" id="guid"
    suppress-deletions="false">
    <direct-mapping>
        <src-attribute>attribute name</src-attribute>
    </direct-mapping>
</export-flow>
```

The exemplary cd-attribute attribute provides scoping for the mapping sub-element by defining the mapping's destination metadirectory buffer attribute associated with the mapping. The value of cd-attribute may be the name of a schema-defined buffer attribute that is a member of the destination buffer object type (as defined by the <export-flow-set> element-see below) or an auxiliary class that can possibly be found associated with the destination buffer object type.

Associated with each exemplary mapping is metadata that may be used to identify and configure the mapping. A unique GUID ID associated with a mapping is defined by an id attribute whose value may be a GUID in normal brace format (i.e., "{66069022-6C8C-d90-A706-17B96A70A4F9}"). This mapping ID may be used when tracking rules contributions during preview mode runs.

In one implementation, a mapping configuration indicates whether or not deletions should be suppressed for the mapping; i.e., whether or not NULL values and deletions on source attributes are to be transferred to destination attributes as a delete or suppressed/ignored. This configuration option may be specified via the optional suppress-deletions attribute, which may take on the values "true" and "false," the default being "false." Exemplary actions taken based on mapping configurations are discussed in further detail below.

Within an exemplary top-level <export-attribute-flow> element can be one or more <export-flow-set> elements, each of which can contain one or more <export-flow> elements. The <export-flow-set> elements act to define child flow declarations by a source metadirectory core object type and destination metadirectory buffer object type. The following exemplary schema illustrate an exemplary <export-flow> element:

```
<export-flow-set cd-object-type="object type"
    mv-object-type="object type">
    <export-flow cd-attribute="attribute name" id="guid">
        ...
    </export-flow>
    ...
</export-flow-set>
```

Flow and mapping sub-elements of the <export-flow-set> element define flows or relationships between a metadirectory buffer object type and metadirectory core object type pair. More specifically, the exemplary <export-flow-set> element shown above defines cd-object-type and mv-object-type attributes that serve to define the scope of sub-elements by source metadirectory core object type and destination metadirectory buffer object type. In an exemplary implementation, the value of the cd-object-type attribute is the name of a buffer object type defined in a destination MA's schema, and the value of the mv-object-type attribute is the name of an object type defined in the core schema (described in further detail below). In one implementation, each flow set corresponds to one source core object type and one destination buffer object type. An exemplary <export-attribute-flow> element is shown below in XML:

```
<export-attribute-flow>
    <export-flow-set cd-object-type="User" mv-object-type="person">
        <export-flow cd-attribute="email"
            id="{9E691F4E-4301-4112-B964-CE7E8A\F7CAC}"
            suppress-deletions="true">
            <direct-mapping>
                <src-attribute>email</src-attribute>
            </direct-mapping>
        </export-flow>
        <export-flow cd-attribute="description"
            id="{8F15B855-0517-40f8-9AE9-0565600C0017}">
            <scripted-mapping>
                <src-attribute>email</src-attribute>
                <src-attribute>description</src-attribute>
                <script-context>contextString</script-context>
            </scripted-mapping>
        </export-flow>
        <export-flow cd-attribute="uid"
            id="{DCC92CCA-A2DA-4060-8605-78755F072616}">
            <direct-mapping>
                <src-attribute intrinsic="true">object-id</src-attribute>
            </direct-mapping>
        </export-flow>
    </export-flow-set>
    <export-flow-set cd-object-type="Contact" mv-object-type="person">
        <export-flow cd-attribute="linked"
            id="{A3D569E9-5DD9-4ece-8AB6-4A4BA4b5554A}">
            <constant-mapping>
                <constant-value>some value</constant-value>
            </constant-mapping>
        </export-flow>
    </export-flow-set>
</export-attribute-flow>
```

As discussed, mappings defined in the <export-attribute-flow> elements, a destination buffer attribute value (or values) may be generated, based on one or more source core attribute values. In one exemplary implementation, EAF mappings include a "suppress deletions" configuration option that can be used to keep NULL values and deletes from flowing from the core to the buffer. The behavior of this option is detailed below in the section entitled "EAF Operations." The EAF element may or may not be used to validate calculated destination values against a destination remote repository schema. For example, pending exports may be compared to objects/values in a remote repository schema by requesting a buffer object. A user can perform such a validation check if an object fails to export, to determine why the failure occurred.

A mapping in the <export-attribute-flow> may be a "direct mapping." More specifically, the intrinsic attribute core object ID may be declared as the source attribute for an EAF direct mapping. In an exemplary implementation, the core object ID is treated a string value that is directly mapped to the associated destination (i.e., buffer object) attribute. For example, individual bytes in a core (source) GUID of "{befa5fc6-1661-47b4-9c34-deff19525cda}" will be formatted as a string prior to being exported to the associated buffer space attribute.

Four exemplary operations related to EAF are described below. These exemplary operations include full synchronization, delta synchronization, reference synchronization, and "back-to-source" synchronization. These operations may be referred to as full sync, delta sync, ref sync or ref-retry, and "back-to-source" sync, respectively. In a particular implementation, the synchronization engine (SE) determines when to invoke any of the EAF operations.

Full sync may be called the first time a source core object is synchronized to a newly connected destination metadirectory buffer object. The full sync may also be run when running in re-evaluate rules mode. During full sync, all objects and attributes are exported from the metadirectory core to the metadirectory buffer.

Delta sync may be called when a source metadirectory core object has previously been synchronized to a destination metadirectory buffer object. During a delta sync, only values that have changed in the core object are exported to the corresponding object in the metadirectory buffer.

An attribute in a first object in the metadirectory core may reference a second metadirectory core object. If the second metadirectory core object is linked to or unlinked from a metadirectory buffer object, the attribute values (called reference attribute values) related to the first core object may be changed as a result. The ref sync operation may be called to export the reference attribute values to an object in the buffer that corresponds to the first object in the core.

Some SE operations that change metadirectory buffer objects (and/or attributes) can trigger another synchronization involving updating the core based on the change in the buffer, and again updating the buffer based on the update to the core. The "back-to-source" sync operation may be called when such a "re-synchronization" occurs. When executing a mapping, all values are flowed from core to metadirectory buffer.

The ref sync operation "reverts" updates imported attribute values to match attribute values calculated in the EAF process.

For a given source metadirectory core object and destination metadirectory buffer object, an EAF mapping is said to be "in-scope" if the mapping's source core object type (mv-object-type) and destination buffer object type (cd-object-type) match those of the core and buffer objects, respectively.

For a given source core object and destination buffer object, an EAF mapping is said to be "satisfied" if the core object has a value for at least one of the mapping's source attributes (src-attribute).

In general, sync operations take a source core object and a destination buffer object as input and attempt to execute in-scope, satisfied mappings to flow attributes from the core object to the buffer object. Each sync operation may differ from the other synch operations with regard to which attributes are considered when checking to determine if a mapping is satisfied, and which values are flowed when executing a direct mapping.

When determining which mappings are satisfied during a full sync, all source attributes are considered. When determining which mappings are satisfied during a delta sync, only those source attributes that have a changed value (have a pending delta) are considered. When determining which mappings are satisfied during a ref sync, only those to source attributes of reference type are considered.

"Export precedence" refers to calculations made to determine if an export flow that overlaps with an import flow will be allowed to execute. The calculation may be made by comparing the precedence of the overlapping import flow with the precedence of the import flow that supplied the values for the core attribute that is the source of the overlapping export flow. Only when the precedence of the source values is higher than that of the overlapping import flow will the export flow be allowed to execute.

In one implementation, an export flow and import flow are said to overlap if the export flow has exactly one source attribute which is also the destination attribute for the import flow and/or the destination attribute of the export flow is one of the source attributes of the import flow.

E.6. Run Configuration XML Format

An exemplary Run Profile Configuration Element in an MA schema section describes "run profiles" defined for the MA. The following schema illustrates an exemplary format for a Run Profile Configuration Element:

```
<ma-run-data>
    <run-configuration>...</run-configuration>
    <run-configuration>...</run-configuration>
    ...
</ma-run-data>
```

In a particular metadirectory implementation, the metadirectory server instantiates a MA run by passing a run configuration XML fragment parameter to an Execute( ) function in the MA. The XML fragment contains execution parameters describing how the MA should run.

An exemplary run configuration schema is shown in the following XML fragment:

```
<ma-run-data>
    <run-configuration>
        <id> guid </id>
        <name> string </name>
        <creation-time> time (read only) </creation-time>
        <last-modification-time> time (read only) </last-modification-time>
        <version> integer </version>
        <configuration>
        <step>
        <step-type type="full-import | delta-import | export | apply-rules">
        <import-subtype> to-file </import-subtype>
        <import-subtype> resume-from-file </import-subtype>
        <import-subtype> to-cs </import-subtype>
        <export-subtype> to-file </export-subtype>
        <export-subtype> resume-from-file </export-subtype>
        <apply-rules-subtype> apply-pending </apply-rules-subtype>
        <apply-rules-subtype> reevaluate-flow-connectors </apply-rules-subtype>
        </step-type>
        <dropfile-name> string </dropfile-name>
        <threshold>
        <object> integer </object>
        </threshold>
        <partition> string </partition>
        <custom-data> XML fragment </custom-data>
        <step>
        <step>
        ...
        </step>
        ...
        </configuration>
    </run-configuration>
    <run-configuration>
        ...
    </run-configuration>
</ma-run-data>
```

Exemplary sub-element <id> is a unique identifier (GUID) associated with the run configuration. Exemplary sub-element <name> is the display name for the run configuration. Exemplary sub-element creation-time is the time (e.g., GMT) at which the run profile was created. Exemplary sub-element last-modification-time is the time (e.g., GMT) when the run profile was last modified. Exemplary sub-element version is the version number (e.g., integer) of the run configuration.

Exemplary sub-element <step> include information about steps and types of steps in the MA run. The user can configure multiple "run profiles" for an MA. Each "run profile" consists of 1 or more steps. Each step may include of an operation involving import, synchronization, or export. Within the <step> sub-element are descriptions associated with one or more types of steps. In the exemplary <step-type> sub-element, possible step-types are "full-import," "delta-import," "export," and "apply rules." Each step-type can be further described in sub-elements for the particular type. Examples of the step-types and their associated values are given in Table 2, Table 3, and Table 4.

Table 2 illustrates exemplary values that may be used in <import-subtype> and <delta-subtype> sub-elements.

TABLE 2

| Import subtype(s) | Description |
| --- | --- |
| None | An import run without any subtype means that the synchronization is from remote repository all the way to the metadirectory core. |
| to-file | This subtype drops a file during import and stop without staging the import data in metadirectory buffer. With this sub-type, watermark will not be updated for delta import. |
| Resume-from-file | This subtype resumes an import run from a drop file. With this sub-type, watermark will not be updated for delta import. |
| to-file, resume-from-file | These subtypes drop an audit file and continue the import run without stopping. |
| to-cs | This subtype stages the import data in metadirectory buffer and stops the import run. |
| resume-from-file, to-cs | These subtypes resume an import run from a drop file, stage the import data in metadirectory buffer and stop the import run. With this sub-type, watermark will not be updated for delta import. |
| to-file, resume-from-file, to-cs | This drops an audit file during import, stages import data in metadirectory buffer and stop the import run. |

Table 3 illustrates exemplary values that may be used in <export-subtype> sub-elements.

TABLE 3

| Import subtype(s) | Description |
| --- | --- |
| None | An export run without any substep means that the synchronization is from metadirectory buffer all the way to the remote repository. |
| to-file | This will drop a file during export and stop. With this sub-type, export batch number will not be updated. |
| resume-from-file | This will resume an export run from a drop file. With this sub-type, export batch number will not be updated. |
| to-file, resume-from-file | This implies that we will drop an audit file but will not stop at the drop file during an export run. |

Table 4 illustrates exemplary values that may be used in <apply-rules-subtype> sub-elements.

TABLE 4

| Import subtype(s) | Description |
| --- | --- |
| apply-pending | It attempts to synchronize all connectors with staged pending imports and also attempts to join/project (and flow attributes) on all normal disconnectors even if they have failed to join during previous apply-pending runs. |
| reevaluate-flow-connectors | It attempts to reevaluate attribute flow for all connectors in metadirectory buffer under this MA. |

TABLE 4-continued

| Import subtype(s) | Description |
| --- | --- |
| Reevaluate-join-flow-all | Reevaluate join and attribute flow for all entries in CS (connectors an disconnectors). Explicit connectors/disconnectors will not be reevaluated (can only be changed using account joiner). |

An exemplary <dropfile-name> sub-element can be provided, whereby the user may specify the name of a drop file associated with the MA run. In a particular implementation, one file name may be provided per step.

An exemplary <threshold> sub-element is a sync engine threshold for all MAs. In a particular implementation, all of the specified thresholds are given in absolute numbers. Within a <threshold> sub-element, an <object sub-element specifies the number of objects to process for the run.

An exemplary <partition> sub-element identifies a partition associated with the associated run steps. In a particular implementation, the format of the partition is MA-specific.

An exemplary custom-data> sub-element contains MA-specific data for an associated step. Exemplary information that can be provided in the custom-data> sub-element are step custom data, ad-step-data, time-limit, page-size, batch-size, granular-security, bulk-export, and permissive-write.

To further illustrate an exemplary <ma-run-data> element, the following schema is provided. The schema contains a delta import of objects from an Active Directory® (AD) repository. The delta import data is dropped into a file for audit and then staged in the metadirectory buffer. Then, the run stops so the user can examine the metadirectory buffer to see what will be propagated to the metadirectory core before committing any changes to the core. In this particular example, the drop file path is "C:\temp\test.xml." Also, in this example two thresholds are set and the import run terminates if either one of the thresholds is reached.

```
<ma-run-data>
    <run-configuration>
        <name> My Typical Delta Import </name>
        <id> 934A9523-A3CA-4BC5-ADA0-D6D95D979421 </id>
        <version> 3 </version>
        <configuration>
        <step>
            <step-type type="delta-import">
                <import-subtype> to-file </import-subtype>
                <import-subtype> resume-from-file </import-subtype>
                <import-subtype> to-cs </import-subtype>
            </step-type>
            <dropfile-name> c:\temp\test.xml </dropfile-name>
            <threshold>
                <object> 100 </Object>
                <delete> 20 </Delete>
            </threshold>
            <partition> cn=ssiu1,ou=nttest,dc=Microsoft,dc=com
            </partition>
            <custom-data>
                <timeout>1000</timeout>
                500
            </custom-data>
        <step>
        </configuration>
    </run-configuration>
</ma-run-data>
```

Although some exemplary methods, exemplary devices, exemplary systems, and exemplary schemas have been illustrated in the accompanying Drawings and described in the foregoing Detailed Description, it will be understood that the methods, devices, systems, and schemas are not limited to the exemplary embodiments disclosed, but are capable of numerous rearrangements, modifications and substitutions without departing from the spirit set forth and defined by the following claims.

What is claimed is:

1. A method for configuring a data processing system that interacts with multiple data sources via a set of respective management agents, comprising:
   creating configuration information used for modifying the data processing system; and
   automatically applying the configuration information to modify the data processing system by making a change to the set of management agents by matching partitions specified in the configuration information with partitions associated with an existing management agent or data source, the matching comprising:
   automatically matching a first set of file-specified partitions with existing partitions, leaving a second set of file-specified partitions that are not automatically matched; and
   manually matching the second set of file-specified partitions with existing partitions.

2. The method according to claim 1, further comprising:
   after creating the configuration information, exporting the configuration information to a storage location; and
   importing the configuration information from the storage location to the data processing system were it is automatically applied.

3. The method according to claim 1, wherein the configuration information contains a configuration description that is used by the data processing system to add a new management agent to the set of management agents, and the applying modifies the data processing system by adding the new management agent.

4. The method according to claim 1, wherein the configuration information contains a configuration description that is used by the data processing system to update an existing management agent within the set of management agents, and the applying modifies the data processing system by updating the existing management agent.

5. The method according to claim 1, wherein the configuration information contains a configuration description that is used by the data processing system to configure plural management agents within the set of management agents, and the applying modifies the data processing system by configuring the plural management agents.

6. The method according to claim 1, wherein the data processing system includes a first rule set for governing the behavior of global aspects of the data processing system, and a second rule set for governing the behavior of individual management agents in the set of management agents, and wherein the configuration information contains a first part that contains a description used for modifying the first rule set and a second part that contains a description used for modifying the second rule set.

7. The method according to claim 1, wherein the data processing system includes a metadirectory system for managing directories associated with the data sources.

8. The method according to claim 7, wherein metadirectory system includes a core storage area for storing aggregate information collected from plural of the data sources.

9. The method according to claim 8, wherein the metadirectory system includes a first rule set for governing the behavior of the core storage area, and a second rule set for governing the behavior of individual management agents in the set of management agents, and wherein the configuration information contains a first part that contains a description used for modifying the first rule set and a second part that contains a description used for modifying the second rule set.

10. The method according to claim 1, wherein the configuration information is expressed declaratively using a mark-up language.

11. The method according to claim 1, wherein the configuration information includes a configuration description, and the applying involves comparing the configuration description with an existing configuration of the data processing system to provide a comparison result, and modifying the data processing system based on the comparison result.

12. The method according claim 1, wherein the applying employs different matching routines for different respective types of management agents.

13. The method according to claim 1, wherein the manual matching provides a UI presentation to assist the user in performing the manual matching of partitions.

14. The method according to claim 1, wherein the data processing system is employed in a production environment of an organization, and wherein the creating of the configuration information is performed in a lab system.

15. An infrastructure for updating a data processing system that interacts with multiple data sources via a set of respective management agents, comprising:
   a lab environment containing a lab system, the lab system including a computing device encoded with logic configured to create configuration information used for modifying the data processing system; and
   a production environment containing the data processing system, the data processing system including configuration logic that is configured to automatically apply the configuration information to modify the data processing system by making a change to the set of management agents by matching partitions specified in the configuration information with partitions associated with an existing management agent or data source, the matching comprising:
   automatically matching a first set of file-specified partitions with existing partitions, leaving a second set of file-specified partitions that are not automatically matched; and
   manually matching the second set of file-specified partitions with existing partitions.

16. The infrastructure according to claim 15, wherein the lab system further includes logic configured to export the created configuration information to a storage location, and the production system further includes logic configured to import the configuration information from the storage location to the data processing system.

17. The infrastructure according to claim 15, wherein the configuration information contains a configuration description that is used by the data processing system to add a new management agent to the set of management agents, and wherein the configuration logic is configured to modify the data processing system by adding the new management agent.

18. The infrastructure according to claim 15 wherein the configuration information contains a configuration description that is used by the data processing system to update an existing management agent within the set of management agents, and the configuration logic is configured to modify the data processing system by updating the existing management agent.

19. The infrastructure according to claim 15, wherein the configuration information contains a configuration description that is used by the data processing system to configure plural management agents within the set of management agents, and the configuration logic is configured to modify the data processing system by configuring the plural management agents.

20. The infrastructure according to claim 15, wherein the data processing system includes a first rule set for governing the behavior of global aspects of the data processing system, and a second rule set for governing the behavior of individual management agents in the set of management agents, and wherein the configuration information contains a first part that contains a description used for modifying the first rule set and a second part that contains a description used for modifying the second rule set.

21. The infrastructure according to claim 15, wherein the data processing system includes a metadirectory system for managing directories associated with the data sources.

22. The infrastructure according to claim 21, wherein the metadirectory system includes a core storage area for storing aggregate information collected from plural of the data sources.

23. The infrastructure according to claim 22, wherein the metadirectory system includes a first rule set for governing the behavior of the core storage area, and a second rule set for governing the behavior of individual management agents in the set of management agents, and wherein the configuration information contains a first part that contains a description used for modifying the first rule set and a second part that contains a description used for modifying the second rule set.

24. The infrastructure according to claim 15, wherein the configuration information is expressed declaratively using a mark-up language.

25. The infrastructure according to claim 15, wherein the configuration information includes a configuration description, and the configuration logic is configured to compare the configuration description with an existing configuration of the data processing system to provide a comparison result, and modify the data processing system based on the comparison result.

26. The infrastructure according to claim 15, wherein the configuration logic is configured to perform the applying by employing different matching routines for different respective types of management agents.

27. The infrastructure according to claim 15, wherein the configuration logic is configured to perform the manual matching by providing a UI presentation to assist the user in performing the manual matching of partitions.

* * * * *